(12) United States Patent
Abdelsamie

(10) Patent No.: US 12,125,049 B2
(45) Date of Patent: *Oct. 22, 2024

(54) SECURE METHODS AND SYSTEMS

(71) Applicant: Maher A Abdelsamie, Brooklyn, NY (US)

(72) Inventor: Maher A Abdelsamie, Brooklyn, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/223,631

(22) Filed: Jul. 19, 2023

(65) Prior Publication Data

US 2023/0394495 A1    Dec. 7, 2023

Related U.S. Application Data

(63) Continuation of application No. 17/177,198, filed on Feb. 16, 2021, now Pat. No. 11,775,985, which is a continuation-in-part of application No. 17/175,696, filed on Feb. 14, 2021, now abandoned, which is a continuation-in-part of application No. 16/391,228, filed on Apr. 22, 2019, now abandoned, which is a continuation of application No. 16/043,453, filed on Jul. 24, 2018, now Pat. No. 10,325,270.

(60) Provisional application No. 63/145,032, filed on Feb. 3, 2021.

(51) Int. Cl.
*G06Q 30/018* (2023.01)

(52) U.S. Cl.
CPC ................ *G06Q 30/018* (2013.01)

(58) Field of Classification Search
None
See application file for complete search history.

(56) References Cited

U.S. PATENT DOCUMENTS

| 10,325,270 B2* | 6/2019 | Abdelsamie | G06Q 30/018 |
|---|---|---|---|
| 11,775,985 B2* | 10/2023 | Abdelsamie | G06Q 30/018 |
| | | | 705/317 |
| 2013/0124269 A1* | 5/2013 | Dunning | G06Q 10/06393 |
| | | | 705/7.39 |
| 2014/0278260 A1* | 9/2014 | Gettings | G06F 11/3089 |
| | | | 702/189 |
| 2016/0063375 A1* | 3/2016 | Gilgert | G06Q 30/018 |
| | | | 706/46 |
| 2019/0026750 A1* | 1/2019 | Abdelsamie | G06Q 40/12 |

(Continued)

*Primary Examiner* — Kaveh Abrishamkar

(57) ABSTRACT

A method and system are provided for environmental credit scoring of a plurality of users, partners, and distributors comprising: registering the plurality of users, partners, distributors, and verifiers; receiving information from the registered users; receiving environmental activity records from partners, and distributors; assigning each activity an identification number; verifying the environmental activity records; calculating a score of each environmental activity; calculating an environmental credit score of the partners and distributors; receiving data from a point of service system; identifying the environmental activity records of users, partners and distributers, and crediting respective environmental activity records; calculating an environmental credit score for the users based on the environmental activities' data credited under the environmental activity record of the users; analyzing the environmental credit score of the users, partners, and distributors; and publishing the environmental credit scores.

20 Claims, 6 Drawing Sheets

(56) References Cited

U.S. PATENT DOCUMENTS

2019/0251574 A1\* 8/2019 Abdelsamie .......... G06Q 40/12
2020/0019821 A1\* 1/2020 Baracaldo-Angel ........................
                                                          H04L 63/1441

\* cited by examiner

SECURE METHODS AND SYSTEMS

CROSS-REFERENCE TO RELATED APPLICATION

This application claims priority from U.S. Utility patent application Ser. No. 16/043,453, filed on Jul. 24, 2018, entitled "METHODS AND SYSTEMS FOR ENVIRONMENTAL CREDIT SCORING", U.S. Utility Continuation patent application Ser. No. 16/391,228, filed on Apr. 22, 2019, entitled "METHODS AND SYSTEMS FOR ENVIRONMENTAL CREDIT SCORING", U.S. Utility Continuation in-part patent application Ser. No. 17/175,696, filed on Feb. 14, 2021, entitled "SECURE METHODS AND SYSTEMS FOR ENVIRONMENTAL CREDIT SCORING", and U.S. Utility Continuation in-part patent application Ser. No. 17/177,198, filed on Feb. 16, 2021, entitled "SECURE METHODS AND SYSTEMS FOR ENVIRONMENTAL CREDIT SCORING". Each of the above-stated applications is hereby incorporated herein by reference in its entirety.

TECHNICAL FIELD

The present invention relates generally to methods and systems for environmental credit scoring based on the verified activities of sites, users, partners, distributors, verifiers, and advertisement service providers

BACKGROUND

With the widespread use of the internet and the growth of computing systems, one area that has not achieved significant development is environmental rating techniques and systems. These techniques and systems have failed to get individuals, businesses, nonprofit organizations, and governmental entities to work together to effectively combat current environmental issues.

Currently, the earth is facing many environmental issues such as climate change, air pollution, ozone depletion, water pollution, deforestation, desertification, habitat destruction, toxic chemicals, natural resource extraction, light and noise pollution, acid rain, medical waste, and littering and landfills. Climate change and global warming are among the top serious environmental issues.

With the growing concerns over environmental issues, such as global warming and resource depletion, the type and number of certifications and green product standards have grown, and many green certifications developed for homes, schools, manufacturers, restaurants, hotels, cleaning companies, and so on have been expanded to include a wider range of environmental issues to determine the impact of their products in terms of manufacture, use, and reuse. A green certification provides confirmation that the goods or services meet mandatory or voluntary standards and offer an environmental benefit. The International Organization for Standardization (ISO) has developed three types of environmental product claims: Type I environmental labels based on ISO 14024, Type II self-declared environmental claims based on ISO 14021, and Type III environmental product declarations based on ISO 14025. The type III environmental product declaration is a standardized (ISO 14025) and life cycle assessment-based tool. To be published, type III environmental declarations require an independent agency, called a program operator, to supervise the full development process of the environmental product declaration. The environmental product declaration is a report that focuses on the ways in which a product or service affects the environment throughout its life cycle. This declaration is an internationally accepted, independently verified, registered, and published document.

Although there are currently hundreds of international green product certifications, including about 100 certifications in the United States, they have failed to get individuals, businesses, nonprofit organizations, and governmental entities to work together to effectively combat current environmental issues. In addition, their effectiveness in generating a significant increase in individual participation in environmental activities is limited. The greater the consumer demand for environmentally friendly products and services, the greater the incentive will be for product and service providers to enter the market. Therefore, establishing an environmental credit scoring system that rewards individuals based on their environmental activities and using an environmental credit score in decision making (e.g., university admission decisions, employment decisions) could increase the global demand for environmentally friendly products and services.

The verification of environmental activities of both individuals and product and service providers plays an important role in determining the credibility of the environmental impact of their environmental activities. As product and service providers can create environmental product declarations for their products and services and perform Life Cycle Assessment (LCA) studies by themselves (in-house LCA experts), the verification of the environmental product declarations by an independent verifier is the most crucial step in determining the credibility of the Life Cycle Assessment (LCA). Approving an environmental product declaration of a product or service based on an LCA with inaccurate or misleading results could increase the demand for the products and services that may harm the environment. Further, the verifier may seek out assignments and arrange contracts with product and service providers to verify the environmental product declarations of their products and services without the program operator's involvement. Hence, it's hard to ensure that the verifier or the verification firm's employee maintains independence. Therefore, there is a need to overcome the problems mentioned above.

Accordingly, methods and systems for environmental credit scoring based on the verified activities of participants are desired.

Various embodiments of the present invention are provided in the following detailed description and appended drawings. Without departing from the present invention, several details of the present invention may be capable of modifications in various respects, and the present invention is capable of various embodiments. Accordingly, the description and appended drawings of the present invention are provided as illustrations only, and they do not limit or define the scope of the invention being defined by the appended claims.

SUMMARY

In accordance with one or more embodiments, a method for environmental credit scoring of a plurality of users and partners is provided. The method comprises registering a plurality of sites, users, partners, and verifiers by assigning a unique user identifier. The method also comprises creating a plurality of request identifier for a plurality of combinations; receiving a plurality of request identifiers from each of the plurality of user devices, partners devices, verifier devices, and one or more site devices and point of service systems; matching each of the stored plurality of request identifiers with the received plurality of request identifiers to verify the plurality of request identifiers; generating one or more challenges; transmitting the one or more challenges to the each of the plurality of devices; receiving a plurality of unique device identifiers for each of the plurality of devices; receiving one or more data records comprising biometric data of each of the plurality of users, partners, and verifiers; receiving one or more data records comprising site images, videos, and/or live videos of each of the sites; receiving one or more data records comprising geographical location data of each site devices, point of service systems, user devices, partner devices, and verifier devices; extracting one or more features and biometric features from the one or more data records of each of the plurality of sites, users, partners, and verifiers; integrating the biometric features of each of the users, partners, and verifiers, the sites' images, videos, or live videos features of each of the sites, the unique device identifiers of each of the site devices, point of service systems, user devices, partner devices, and verifier devices, and geographical location data of each of the site devices, point of service systems, user devices, partner devices, and verifier devices based on a plurality of combinations; storing the generated templates resulted from the integration in the database of the server computer system; authenticating a plurality of sites, users, partners, and verifiers comprises; receiving one or more request identifiers from each of the site devices, point of service systems, user devices, partner devices, and verifier devices; verifying the received one or more request identifier; generating one or more challenges; transmitting one or more challenges to one or more site devices, user devices, partner devices, and verifier devices in real time; receiving one or more unique device identifiers, biometric data of the one or more users, partners, and verifiers, real time location data of the one or more devices, and sites' images, videos, and/or live videos of the one or more sites; extracting one or more biometric features from the received biometric data of the one or more users, partners, and verifiers according to the models stored in the database of the server computer system; extracting one or more site's images, videos, and/or live videos features of the one or more sites according to the models stored in the database of the server computer system; creating a template for comparison comprising the one or more biometric features, the one or more site's images, videos, and/or live videos features, the one or more unique device identifier, and the real-time geographical location data; retrieving the one or more initial templates created and stored in the database of the server computer system during the registration of the plurality of sites, users, partners, and verifiers; comparing the one or more templates created during the authentication against the one or more initial templates created and stored in the database of the server computer system during the registration of the plurality of sites, users, partners, and verifiers; receiving information from the registered users comprising personal information and information about one or more environmental activities completed by the registered users before becoming registered users; determining the environmental impact of each activity of the user's environmental activities completed by the user before becoming a registered user based on a verified environmental product declaration of the same environmental activity if the environmental product declaration is previously verified by a verifier of the verifiers and associated with a partner of the partners; receiving at least one environmental activity record from one or more devices of at least one of the plurality of partners in real-time; receiving at least one site activity record from one or more devices of at least one of the plurality of sites in real-time; receiving at least one verification activity record from one or more devices of at least one of the plurality of verifiers in real-time; receiving at least one environmental activity record from a point of service system of at least one of the plurality of partners in real-time; verifying one or more environmental law violations of one more partners, distributors, and users with at least one of the plurality of partners and/or one or more external systems of unregistered entities by communicating with one or more devices of partners and/or one or more external systems of unregistered; calculating a score of each environmental activity offered by each of the plurality of partners based on environmental impact information included in a verified environmental product declaration of a product and/or a service offered by each of the plurality of partners and the information included in verified environmental product declarations of products and services offered by other partners; calculating a score of each environmental law violation reported by the partners based on the environmental impact information of each environmental law violation; calculating an environmental credit score of the partners based on the calculated scores; matching the environmental activity records of at least one of the plurality of users and partners with the unique user identifier to identify the environmental activity records of the at least one of the plurality of users and partners associated with the unique user identifier for each of the environmental activities completed by the user, and crediting respective environmental activity records based on the environmental activities completed by the user; calculating an environmental credit score for the at least one of the plurality of users based on the environmental activities' data credited under the environmental activity records of the at least one of the plurality of users; analyzing the environmental credit score of the users to determine the one or more users with a high environmental credit score; publishing the environmental credit scores of the users and partners and notifying the users and partners; identifying one or more sites, partners, and verifiers associated with the site activity records collected by the or more components of the site devices; extracting data indicating real-time data related to an environmental product declaration of at least one of the plurality of partners for each site device; generating a display of a sensor listing for each site device; defining one or more alarm levels based on collected real-time data related to the environmental product declaration of an environmental activity offered by the at least one of the plurality of partners; and determining whether the collected data by the ore or more sensors of the one or more site devices includes real-time data that meet any of the defined alarm levels.

In accordance with one or more embodiments, a system for environmental credit scoring of a plurality of users and partners is provided. The system comprises a plurality of devices associated with a plurality of sites, users, partners, and verifiers, wherein the plurality of devices is communicatively coupled with a server computer system. The server computer system comprising a processor configured to register a plurality of sites, users, partners, and verifiers by assigning a unique user identifier; create a plurality of request identifier for a plurality of combinations of sites, users, partners, and verifiers and their associated site devices, user devices, partner device, and verifier devices respectively; receive a plurality of request identifiers from each of the plurality of user devices, partners devices, verifier devices, and one or more site devices and point of service systems; match each of the stored plurality of request identifiers with the received plurality of request identifiers to verify the plurality of request identifiers; generate one or more challenges; transmit the one or more challenges to the each of the plurality of devices; receive a plurality of unique device identifiers for each of the plurality of devices; receive one or more data records comprising biometric data of each of the plurality of users, partners, and verifiers; receive one or more data records comprising site images, videos, and/or live videos of each of the sites; receive one or more data records comprising geographical location data of each site devices, point of service systems, user devices, partner devices, and verifier devices; extract one or more features and biometric features from the one or more data records of each of the plurality of sites, users, partners, and verifiers; integrate the biometric features of each of the users, partners, and verifiers, the sites' images, videos, or live videos features of each of the sites, the unique device identifiers of each of the site devices, point of service systems, user devices, partner devices, and verifier devices, and geographical location data of each of the site devices, point of service systems, user devices, partner devices, and verifier devices based on a plurality of combinations; store the generated templates resulted from the integration in the database of the server computer system; authenticate a plurality of sites, users, partners, and verifiers; receiving one or more request identifiers from each of the site devices, point of service systems, user devices, partner devices, and verifier devices; verifying the received one or more request identifier; receive one or more unique device identifiers, biometric data of the one or more users, partners, and verifiers, real time location data of the one or more devices, and sites' images, videos, and/or live videos of the one or more sites; extract one or more biometric features from the received biometric data of the one or more users, partners, and verifiers according to the models stored in the database of the server computer system; extract one or more site's images, videos, and/or live videos features of the one or more sites according to the models stored in the database of the server computer system; create a template for comparison comprising the one or more biometric features, the one or more site's images, videos, and/or live videos features, the one or more unique device identifier, and the real-time geographical location data; retrieve the one or more initial templates created and stored in the database of the server computer system during the registration of the plurality of sites, users, partners, and verifiers; receive information from the registered users comprising personal information and information about one or more environmental activities completed by the registered users before becoming registered users; determine the environmental impact of each activity of the user's environmental activities completed by the user before becoming a registered user based on a verified environmental product declaration of the same environmental activity if the environmental product declaration is previously verified by a verifier of the verifiers and associated with a partner of the partners; receive at least one environmental activity record from one or more devices of at least one of the plurality of partners in real-time; receive at least one site activity record from one or more devices of at least one of the plurality of sites in real-time; receive at least one verification activity record from one or more devices of at least one of the plurality of verifiers in real-time; receive at least one environmental activity record from a point of service system of at least one of the plurality of partners in real-time; verify one or more environmental law violations of one more partners, distributors, and users with at least one of the plurality of partners and/or one or more external systems of unregistered entities by communicating with one or more devices of partners and/or one or more external systems of unregistered; calculate a score of each environmental activity offered by each of the plurality of partners based on environmental impact information included in a verified environmental product declaration of a product and/or a service offered by each of the plurality of partners and the information included in verified environmental product declarations of products and services offered by other partners; calculate an environmental credit score of the partners based on the calculated scores; match the environmental activity records of at least one of the plurality of users and partners with the unique user identifier to identify the environmental activity records of the at least one of the plurality of users and partners associated with the unique user identifier for each of the environmental activities completed by the user, and crediting respective environmental activity records based on the environmental activities completed by the user; calculate an environmental credit score for the at least one of the plurality of users based on the environmental activities' data credited under the environmental activity records of the at least one of the plurality of users; analyze the environmental credit score of the users to determine the one or more users with a high environmental credit score; publish the environmental credit scores of the users and partners and notifying the users and partners; identify one or more sites, partners, and verifiers associated with the site activity records collected by the or more components of the site devices; extract data indicating a real-time data related to an environmental product declaration of at least one of the plurality of partners for each site device; generate a display of a sensor listing for each site device; define one or more alarm levels based on collected real-time data related to the environmental product declaration of an environmental activity offered by the at least one of the plurality of partners; and determine whether the collected data by the ore or more sensors of the one or more site devices includes real-time data that meet any of the defined alarm levels.

Various embodiments of the present invention are provided in the following detailed description and appended drawings. Without departing from the present invention, several details of the present invention may be capable of modifications in various respects, and the present invention is capable of various embodiments. Accordingly, the description and appended drawings of the present invention are provided as illustrations only, and they do not limit or define the scope of the invention being defined by the appended claims.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following detailed description, which is to be read in association with the accompanying drawings, wherein.

The headings used herein are not meant to be used to limit the scope of the claims or description. The headings used herein are for organizational purposes only. To facilitate understanding, like reference numerals have been used, where possible, to designate like elements common to the figures.

DETAILED DESCRIPTION

Figure 1:
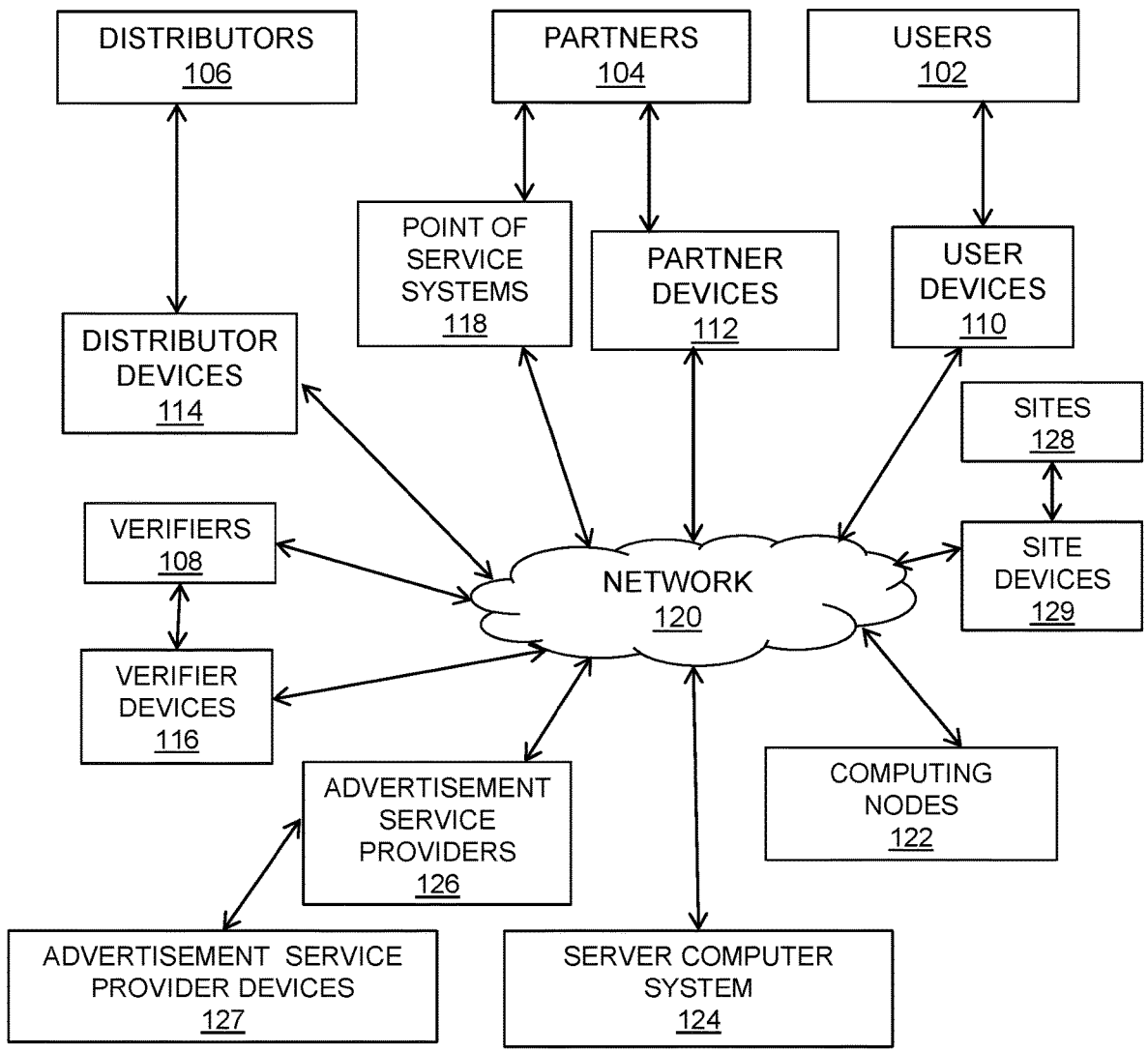
FIG. 1 is a block diagram illustrating an example of the overall system for environmental credit scoring in accordance with one or more embodiments.

The presently disclosed subject matter is described with specificity to meet statutory requirements. However, the description itself is not intended to limit the scope of this patent. Moreover, although the term "step" may be used herein to connote different aspects of methods employed, the term should not be interpreted as implying any particular order among or between various steps herein disclosed unless and except when the order of individual steps is explicitly described.

Reference throughout this specification to "one embodiment" or "an embodiment" means that a particular feature, structure, or characteristic described in connection with the embodiment is included in at least one embodiment of the disclosed subject matter. Thus, appearances of the phrases "in one embodiment" or "in an embodiment" in various places throughout this specification are not necessarily referring to the same embodiment.

As used in this specification and the appended claims, the singular forms "a," "an," and "the" include or otherwise refer to singular as well as plural referents, unless the content clearly dictates otherwise. As used in this specification and the appended claims, the term "or" is generally employed to include "and/or," unless the content clearly dictates otherwise.

The present invention relates generally to methods and systems comprising methods and systems for environmental credit scoring based on the verified activities of sites, users, partners, distributors, and verifiers, and advertisement service providers.

Glossary of Terms

Blockchain—A distributed decentralized public ledger that maintains a continuously-growing list of data records hardened against tampering and revision, called blocks that may be linked together to form a chain. A blockchain network may be comprised of one or more computing devices. A blockchain network may be configured to process and keep records of transactions as part of the block in the blockchain network. A block is added to the blockchain network when it is completed, and then the record of the transaction would be updated. Blockchain transactions may be created and stored in chronological order or may be created and stored in any other order that may be suitable for use by the blockchain network. In some configurations, blockchain recorded transactions may include information such as a currency amount and destination address. These pieces of information record the amount of currency attributed to a specific address. In some cases, blockchain transactions may contain additional or other pieces of information such as a timestamp, a source address, etc. A blockchain may include a secure transaction ledger database, where the transactions may be financial and others not financial. The secure transaction ledger database may be shared by parties participating in an established, distributed network of computing devices. In some embodiments, a blockchain may record any type of data as a form of transaction that occurs in the network (e.g., transfer of information or exchange) in a distributed database that maintains a continuously growing list of data records hardened against tampering and revision, even by participating parties or operators who share the database, thereby reducing or eliminating the need for trusted and/or centralized third parties. Blockchain transactions may be confirmed and validated by the blockchain network through verification techniques (consensus mechanisms) such as proof of work, proof of stake, and/or any other suitable consensus mechanisms.

As used herein, the term "environmental activities" may refer to activities, products, services, expenditures, and/or transactions whose primary purpose is environmental protection. The term "environmental activities" may also refer to all activities aimed at protecting the environment including but not limited to recycling; purchasing environmentally friendly products and services; and using renewable electricity, electric vehicles, and other environmentally friendly products and services. The term "environmental activities" may also refer to all activities classified under the classification of environmental activities and the classification of environmental protection activities (CEPA). The term "environmental activities" may also refer to all activities classified under the classification of environmental activities comprising (a) environmental protection activities and expenditures, (b) resource management activities and expenditures, and (c) resource use activities and expenditures.

As used herein, the term "module" may be hardware or software programmed to perform one or more processes and provides an output using a received input. Based on the present disclosure, the processes, output, and input performed by different modules will be apparent to one skilled in the art.

As used herein, the term "Biometrics" and "biometric information" refers to measurable biological characteristics of a user of the users 102, a partner of the partners 104, a distributor of the distributors 106, a verifier of the verifiers 108, and/or an advertisement service provider of the advertisement service providers 126 such as facial characteristics, voice characteristics, fingerprint characteristics, eye characteristics, and the like. The biometric information is obtained from one or more biometric sensors that scan or read the biometric characteristics of users 102, partners 104, distributors 106, verifiers 108, and advertisement service providers 126.

As used herein, the term "cryptocurrency" may refer to a digital currency in which the generation of units of currency and the verification of transfer of funds may be regulated by encryption techniques.

FIG. 1 is a schematic block diagram illustrating the overall system for environmental credit scoring based on the activities of a plurality of users 102, partners 104, distributors 106, verifiers 108, sites 128, and advertisement service providers 126 in accordance with one or more embodiments. FIG. 1 schematically illustrates a system 100 for environmental credit scoring.

System 100 includes a server computer system 124 that may communicate with a plurality of users 102, partners 104, distributors 106, verifiers 108, sites 128, and/or advertisement service providers 126 through user devices 110, partner devices 112, distributor devices 114, verifier devices 116, site devices 129, and/or advertisement service provider devices 127 respectively over a network 120. The server computer system 124 may also communicate with point of service systems 118, and computing nodes 122 over the network 120.

The user devices 110, partner devices 112, distributor devices 114, verifier devices 116, site devices 129, and/or advertisement service provider devices 127 may be communicatively connected to the server computer system 124 via a network 120.

A user from the users 102 may be an individual. A partner from the partners 104 may be an entity such as a business, a non-profit organization, a governmental agency, and/or any other entities. A distributor from the distributors 106 may be a business, a non-profit organization, a governmental agency, and/or any other entities including but not limited to a product maker, middle agency, or any entities that distribute services and/or products.

In system 100, a partner of the partners 104 may offer one or more environmental activities comprising a product and/or service to users 102 (e.g., an environmentally friendly product and/or a service). A distributor 106 may distribute one or more environmental activities comprising a product and/or service offered by a partner of the partners 104 to one or more partners 104. A user of the users 102 may complete or carry out one or more environmental activities offered by a partner of the partners 104 (e.g., purchasing an environmentally friendly product and/or a service, using renewable energy, using an electric vehicle that uses renewable energy). A partner of the partners 104 may transmit data relating to environmental activities carried out (e.g., purchased, used, completed) by one or more users 102 to the server computer system 124. A partner of the partners 104 may also be an entity (e.g., governmental agency) that reports users', partners', and distributors' environmental law violations and/or other information to the server computer system 124. An advertisement service provider from the advertisement service providers 126 may provide advertisement service for users 102, partners 104, distributors 106, verifiers 108, and/or unregistered third-party entities (e.g., individuals, universities, companies, organizations, governmental entities, etc.).

Network 120 may include one or more wireless and/or wired networks. For example, network 120 may include any network capable of communicating data between devices including but not limited to a public land mobile network (PLMN), a private network, the Internet, an ad hoc network, a local area network (LAN), a cloud computing network, a wide area network (WAN), a metropolitan area network (MAN), a cellular network, an intranet, a telephone network, a fiber optic-based network or the like, and/or a combination of these or other types of networks. In some embodiments, network 120 may include a short-range wireless network that may be one of a Bluetooth wireless, Bluetooth low energy, and/or near-field communication ("NFC") network.

As used herein the term "site" may refer to a spatial location where data may be collected by one or more site devices 129. A site device from the site devices 129 may be a combination of software and hardware to perform the functions of the one or more site devices 129 described herein. By way of non-limiting example, a site device of the site devices 129 may be the device 400 having a processor 406 and differently arranged components, fewer components, additional components, different components than those shown in FIG. 4. (e.g., communications infrastructure 410, memory 404, input component 414, output component 412, a storage component 402, communications interface 408) where the processor 406 is configured by software to perform one or more functions of a site device of the site devices 129 described herein.

According to various embodiments, a site device of the site devices 129 may be configured to (a) collect a variety of data using one or more sensors and/or devices of the input component 414 of the site device 129 and transmit the data to the server computer system 124, the data may comprise geographical location data (e.g., GPS/AGPS coordinates), identification data (e.g., site images, videos and/or live video information, device PUF, device identification information, account identifiers, blockchain identifier, public keys) of a site of the sites 128, a partner of the partners 104, and/or one or more verifiers 108, life cycle inventory data (e.g., onsite operations data, onsite material consumption data, onsite emissions data, onsite energy consumption data, and onsite waste data) of one or more products or services of a partner of the partners 104, and/or other data that may be collected by one or more site devices 129; (b) read information of one or more partners' and/or verifiers' identifying cards, QR codes, and/or devices using one or more devices of the input component 414 of the site devices 129 such as imaging device, barcode scanners, RFID and electronic tag readers and/or any other device that may be read by the site devices 129; (c) communicate with the server computer system 124 to authenticate one or more sites 128, partners 104, and/or verifiers 108; (d) provide processing power for updating and verifying a distributed ledger that may be shared between a group of site devices 129, point of service systems 118, computing nodes 122, site devices 129, user devices 110, partner devices 112, distributer devices 114, verifier devices 116, and/or advertisement service provider devices 127 (e.g., in embodiments where a blockchain may be utilized); and/or (e) perform the functions of the site devices 129 described herein.

As used herein, the term "point of service system" may refer to a computing system or computing device configured to perform the functions of the point of service system 118 described herein. A point of service system from the point of service systems 118 may be a physical device (e.g., a reverse vending machine, tablet computer, desktop computer, kiosk, smartphone, electric vehicle charging station, etc.). A point of service system 118 may be a combination of software and hardware to perform the functions of the point of service systems 118 described herein.

In embodiments where a blockchain may be utilized point of service systems 118, site devices 129, user devices 110, partner devices 112, distributor devices 114, and/or verifier devices 116 may provide processing power for updating and verifying a distributed ledger that may be shared between a group of point of service systems 118, site devices 129, computing nodes 122, user devices 110, partner devices 112, distributor devices 114, and/or verifier devices 116. The distributed ledger may be collectively updated and verified based on transactions made between the server computer system 124, computing nodes 122, point of service systems 118, site devices 129, user devices 110, partner devices 112, distributor devices 114, and/or verifier devices 116.

A point of service system 118 may be in various forms based on the type of environmental activities collected from users 102. A point of service system 118 may be a reverse vending machine, a website, a mobile application, and the like. By way of non-limiting example, a point of service system 118 of a partner 104 may be the device 400 having a processor 406 and differently arranged components, fewer components, additional components, different components than those shown in FIG. 4. (e.g., communications infrastructure 410, memory 404, input component 414, output component 412, a storage component 402, communications interface 408) where the processor 406 is configured by software to perform one or more functions of a point of service system 118 described herein. By way of non-limiting example, a point of service system 118 may be a reverse vending machine having a processor 406 and differently arranged components, fewer components, additional components, different components than those shown in FIG. 4. (e.g., communications infrastructure 410, memory 404, input component 414, output component 412, a storage component 402, communications interface 408) where the processor 406 is configured by software to perform one or more functions of a point of service system 118 described herein. By way of non-limiting example, a point of service system 118 of a partner 104 may be a website or a mobile application hosted by or associated with the server computer system 124 having a processor 406 and differently arranged components, fewer components, additional components, different components than those shown in FIG. 4. (e.g., communications infrastructure 410, memory 404, input component 414, output component 412, a storage component 402, communications interface 408) where the processor 406 is configured by software to perform one or more functions of a point of service system 118 described herein. By way of non-limiting example, a point of service system 118 of a partner 104 may be a device that may be installed virtually anywhere including public areas and having a processor 406 and differently arranged components, fewer components, additional components, different components than those shown in FIG. 4. (e.g., communications infrastructure 410, memory 404, input component 414, output component 412, a storage component 402, communications interface 408) where the processor 406 is configured by software to perform one or more functions of a point of service system 118 described herein. By way of non-limiting example, a point of service system of partner 104 may be a portable device having a processor 406 and differently arranged components, fewer components, additional components, different components than those shown in FIG. 4. (e.g., communications infrastructure 410, memory 404, input component 414, output component 412, a storage component 402, communications interface 408) where the processor 406 is configured by software to perform one or more functions of a point of service system 118 described herein. By way of non-limiting example, a point of service system 118 of partner 104 may be a point of sale (POS) that may be used by a partner of the partners 104 to confirm environmental activities carried out (e.g., purchased, used, completed) by users 102 (e.g., purchasing environmentally friendly products, and/or services offered by a partner 104). The hardware of a point of service system 118 may comprise any point of sale (POS) hardware having a processor 406 configured by software to perform one or more functions of a point of service system 118 described herein. By way of non-limiting example, the hardware of a point of service system 118 may comprise a point of sale (POS) hardware manufactured and/or sold by companies including, but not limited to Fujitsu, Ingenico, Datalogic, Honeywell Scanning and Mobility, Bitel, Keycorp, Vantiv, First Data, Wirecard, ATOS Worldline, Equinox, NCR, Castles Technology Spire Payments, Toast POS, and Square having a processor 406 configured by software to perform one or more functions of the point of service system 118 described herein. In some embodiments, a point of service system 118 may be located where environmental activities are confirmed.

In some embodiments, where the point of service systems 118 of a partner of the partners 104 (e.g., transportation company) may be installed in one or more vehicles (e.g., electric vehicles) of the partner. The transportation companies may include but are not limited to car rental companies and ride-hailing companies such as Uber and Lyft, and other ride-hailing and transportation network company platforms.

According to various embodiments, a point of service system 118 may be configured to (a) collect a variety of data by one or more sensors and/or devices (e.g., barcode scanners, RFID, electronic tag readers, biometric devices) such as identification data (e.g., account identifiers, biometric information, credential information, geographical location data, device PUF, device identification information, blockchain identifier, public keys) from one or more users 102; (b) transmit data to the server computer system 124, the data may include but not limited to information on the environmental activities (e.g., products and/or services) offered by a partner of the partners 104 (e.g., transportation company, electric vehicle charging station, renewable energy providers, and/or the like) and carried out (e.g., purchased, used, or completed) by one or more users 102 such as information on the service or product provided (e.g., renewable energy use (service units), the pickup point, distance, and/or drop off point), users' and/or partners' identification data (e.g., account identifiers, biometric information, credential information, geographical location data, device PUF, device identification information, blockchain identifier, public keys), information on the environmental product declaration of the products and/or services carried out by the one or more users 102 (e.g., environmental product declaration identification data), the geolocation data or the geographical location data (e.g., GPS/AGPS coordinates) of the point of service systems 118, and/or payment information; (c) provide processing power for updating and verifying a distributed ledger and to share the distributed ledger between a group of point of service systems 118, computing nodes 122, site devices 129, user devices 110, partner devices 112, distributer devices 114 and/or verifier devices 116; (d) enable offline transactions, where the point of service systems 118 may propagate their transactions once the point of service systems 118 reconnect to the network 120; (e) scan QR codes from one or more devices (e.g., user devices 110, partner devices 112), where QR codes may be identification information (e.g., identification numbers of products or services, environmental product declarations registration numbers) relating to environmental activities (e.g., products and/or services) and/or relating identification data of users and/or partners in the form of QR codes (e.g., account identifiers, biometric data, blockchain identifier, public keys); (f) provide one or more users 102 with a product and/or service offered by a partner 104 (e.g., renewable electricity from an electric vehicle charging station, renewable electricity from renewable energy providers, and/or the like), wherein the server computer system 124 may authenticate the one or more users 102 prior to providing the one or more users with the product and/or service; (g) access records of environmental activities of one or more users 102, partners 104, and distributors 106 by communicating with the server computer system 124; (h) confirm environmental activities of one or more users 102 and print a report, and/or (1) perform the functions of a point of service system 118 described herein.

In some embodiments, the server computer system 124 may determine using one or more algorithms the distance between the server computer system 124, point of service systems 118, computing nodes 122, site devices 129, user devices 110, partner devices 112, distributer devices 114, verifier devices 116, and/or advertisement service provider devices 127. For example, the server computer system 124 may determine using one or more algorithms the distance between two points associated with one or more environmental activities (e.g., transportation services) of the one or more users 102 based on the geolocation data or the geographical location data (e.g., GPS/AGPS coordinates) of the one or more user devices 110 and the point of service systems 118.

In some embodiments, the server computer system 124 may authenticate the one or more users 102, and/or a partner of the partners 104 (e.g., an employee of a partner) prior to storing transactions data (e.g., offline transactions data) in the storage component 402 and/or memory 404 of the server computer system 124 of the server computer system 124, wherein the authentication may be performed according to one-factor, two-factor, three-factor, or four-factor authentication methods.

In embodiments where the point of service systems 118 of a partner of the partners 104 (e.g., transportation company) may be installed in one or more vehicles (e.g., electric vehicles) of the partner, the server computer system 124 may use one or more algorithms, machine learning, and/or a trained neural network by means of deep learning to verify the geographical location of both users 102 and the point of service systems 118 while the user carrying out an environmental activity (e.g., transportation service) offered by a partner of the partners 104 (e.g., transportation company) based on the geolocation data or the geographical location data (e.g., GPS/AGPS coordinates) of the one or more user devices 110 and the point of service systems 118, wherein the server computer system 124 may not credit the accounts of the one or more users 102 with environmental activities, credits, points, currency, cryptocurrency and/or any rewards if the one or more user devices 110 are not located at the location of the point of service systems 118 or within a pre-defined distance.

In embodiments where the point of service systems 118 may be connected to the network 120, the data may be transmitted from the point of service systems 118 to the server computer system 124 in real-time. In embodiments where the point of service systems 118 may not be connected to the network 120, the point of service systems 118 may be configured to enable offline transactions, wherein the point of service systems 118 may propagate their transactions once the point of service systems 118 reconnect to the network 120. In some embodiments, the server computer system 124, point of service systems 118, computing nodes 122, site devices 129, user devices 110, partner devices 112, distributer devices 114, verifier devices 116, and/or advertisement service provider devices 127 may communicate via network 120 and may be configured to enable offline transactions and to propagate their transactions once they reconnect to the network, wherein network 120 may comprise Wireless Mesh Network (WMN).

The users 102, partners 104, distributors 106, verifiers 108, sites 128, and advertisement service providers 126 may communicate with the server computer system 124 using user devices 110, partner devices 112, distributor devices 114, verifier devices 116, site devices 129, and advertisement service provider devices 127 respectively. Device 400 may correspond to a device from the user devices 110, partner devices 112, distributor devices 114, and verifier devices 116, server computer system 124, site devices 129, computing nodes 122, and/or point of service systems 118. In some implementations, a device from the user devices 110, partner devices 112, distributor devices 114, and verifier devices 116, server computer system 124, computing nodes 122, site devices 129, and/or point of service systems 118 may include one or more devices 400 and/or one or more components of device 400 (e.g., communications infrastructure 410, memory 404, input component 414, output component 412, a storage component 402, communications interface 408).

A device from the user devices 110, partner devices 112, distributor devices 114, verifier devices 116, server computer system 124, computing nodes 122, site devices 129, and/or point of service systems 118 may be a computing and/or communication device (e.g., mobile phone, workstation, cell phone, personal computer, gaming device, smartphone, tablet computer, laptop computer, smartwatch, server computer, or any other type of computing apparatus capable of communicating with the server computer system 124). Partners 104 may communicate with the server computer system 124 using a point of server systems 118.

The users 102, partners 104, distributors 106, and/or verifiers 108 may communicate with the server computer system 124 through a user interface using user devices 110, partners devices 112, distributor devices 114, verifier devices 116, and advertisement service providers devices 127. In some embodiments, the server computer system 124 may include a web server hosting one or more websites that are accessible by distributors 106, partners 104, users 102, verifiers 108, and advertisement service providers 126 over a network 120 (e.g., the Internet).

Figure 4:
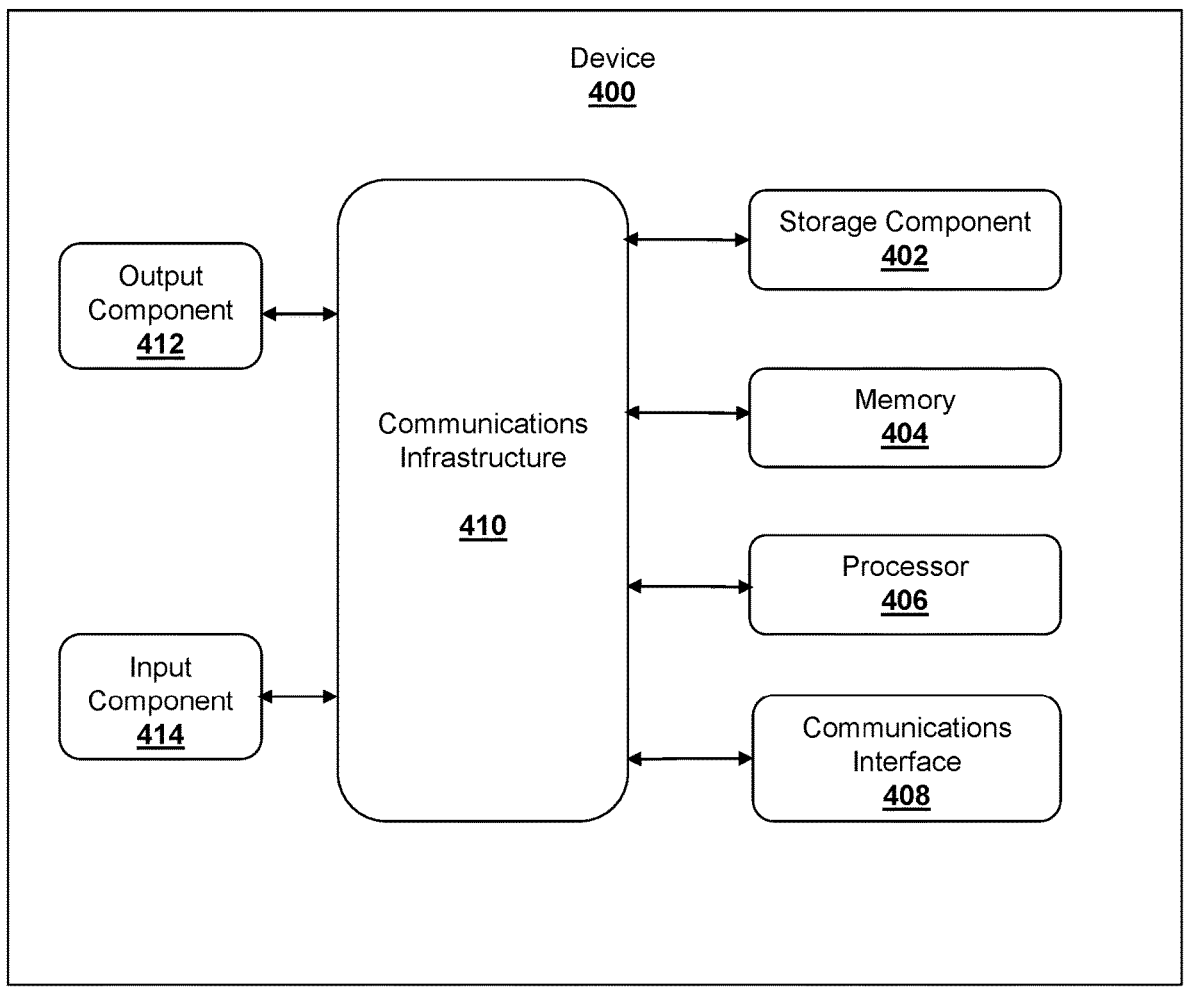
FIG. 4 is a diagram of example components of one or more devices of FIG. 1.

The server computer system 124 may correspond to the device 400 with a processor 406 and differently arranged components, additional components, different components, fewer components than those shown in FIG. 4. (e.g., communications infrastructure 410, memory 404, input component 414, output component 412, a storage component 402, communications interface 408), where a computer program or multiple computer programs may be stored on the memory 404 and/or storage component 402 and having executable instructions for performing the functions of the server computer system 124 described herein.

In some embodiments, the server computer system 124 may be configured to use a blockchain for the storage of data used herein. A blockchain may be operated by a plurality of computing nodes 122, a plurality of site devices 129, a plurality of advertisement service provider devices 127, a plurality of point of service systems 118, a plurality of user devices 110, a plurality of partner devices 112, a plurality of distributor devices 114, and/or a plurality of verifier devices 116 comprising a blockchain network. In some embodiments, the computing nodes 122 may comprise systems associated with users 102, partners 104, distributors 106, and/or verifiers 108. A blockchain may be comprised of a plurality of blocks, where each block in the blockchain may include one or more data values and a block header. The blocks of the blockchain may be secured from tampering and revision. The block header of each block in the blockchain may include at least a block reference value, a timestamp, and a data reference value. The block reference value may be a reference to the prior block added to the blockchain and the data reference value may be a reference to the one or more data values included in the respective block. In an exemplary embodiment, one or more hashing algorithms (e.g., cryptographic hashing algorithms, cryptographic hash function) may be applied to the block reference value and data reference value. The application of one or more hashing algorithms to the block reference value and data reference value may generate hash values, such that it would be necessary to regenerate the reference value if the corresponding data is modified. This may make the blockchain immutable as the propagation of any modification through the rest of the blocks in the blockchain would be necessary. Each node in a blockchain network may store an entire copy, or a portion thereof, of a blockchain. As such, tampering with the blockchain may be near impossible as any modification would have to be performed on the blockchain in every node in the blockchain network prior to the addition of a new block to the blockchain. As such, the blocks of the blockchain may be secured from tampering and revision.

The data values included in each block in the blockchain may include data stored for use by the server computer system 124, a plurality of computing nodes 122, a plurality of user devices 110, a plurality of partner devices 112, a plurality of distributor devices 114, a plurality of verifier devices 116, a plurality of site devices 129, a plurality of advertisement service provider devices 127, and/or other entities or systems. For instance, in some cases, a blockchain may be used to store activity data (e.g., an environmental activity carried out by a user of users 102, an environmental activity reported or confirmed by a partner of the partners 104, an environmental activity distributed by a distributor of the distributors 106, a verification activity carried out by a verifier of the verifiers 108, advertisement activity carried out by an advertisement service provider of the advertisement service providers 126, site activity reported by a site device of the site devices 129), each activity may comprise transfer or exchange of information. In such cases, each data value may include but not limited to the identification data (e.g., account identifiers, biometric data, blockchain identifier, public keys, data acquired by the imaging device comprising images, videos, and/or live videos for identification purposes) of one or more users 102, partners 104, distributors 106, verifiers 108, sites 128, and/or advertisement service providers 126 and activity data associated therewith for activity comprise transfer or exchange of information between the server computer system 124, a plurality of users 102, a plurality of partners 104, a plurality of distributors 106, a plurality of verifiers 108, a plurality of sites 128, a plurality of advertisement service providers 126, and/or other entities or systems., where there may be a single blockchain for all activities of the users 102, partners 104, distributors 106, verifiers 108, sites 128, and/or advertisement service provides 126, or a separate blockchain for each account of the users' 102, partners' 104, distributors' 106, verifiers' 108, sites' 128, and/or advertisement service provides' 126 accounts.

In embodiments where a blockchain may be a permissioned blockchain (access-controlled), processor 406 of the server computer system 124, a plurality of computing nodes 122, a plurality of user devices 110, a plurality of partner devices 112, a plurality of distributor devices 114, a plurality of verifier devices 116, a plurality of site devices 129, and/or a plurality of advertisement service provider devices 127 may be configured to execute the one or more sets of computer-readable instructions (software instructions) stored on storage component 402 and/or memory 404 in a trusted execution environment (a secure area of a processor).

In embodiments where a blockchain may be utilized, the blockchain may be a permissioned blockchain, public blockchain, or private blockchain. In embodiments where a blockchain may be a permissioned blockchain, the blockchain can only be accessed by participants who are allowed to access the blockchain, where the access may be controlled (e.g., verifying or validating transactions, viewing data on the blockchain network may require permission).

In some cases, a blockchain may be used to store the verifiers' 108 activities data relating to the verification activities of one or more environmental product declarations of one or more products and/or services of one or more partners 104. In such cases, each data value included in each block in the blockchain may include but not limited to one or more verifiers' 108, and/or partners' 104 identification data (e.g., account identifiers, biometric data, blockchain identifier, public keys, data acquired by the imaging device comprising images, videos, and/or live videos for identification purposes) and activity data associated therewith for one or more environmental product declarations verified by a verifier 108, where new blocks may be added when an environmental product declaration is updated, added and/or verified, where there may be a single blockchain for all environmental product declarations verified by all verifiers, a separate blockchain for environmental product declarations verified by each verifier, or a separate blockchain for environmental product declarations associated with each verifier account, and/or partner account.

In some cases, a blockchain may be used to store environmental credit scores of users 102, partners 104, and/or distributors 106, where each data value included in each block in the blockchain may include identification data (e.g., account identifiers, biometric data, blockchain identifier, public keys, data acquired by the imaging device comprising images, videos, and/or live videos for identification purposes) of a user 102, a partner 104, and/or a distributor 106 and the associated environmental credit score, where new blocks may be added when an environmental credit score is updated, where there may be a single blockchain for all environmental activities confirmed and/or reported by all partners 104, a separate blockchain for environmental activities confirmed and/or reported by each partner 104, or a separate blockchain for environmental activities associated with each user account, partner account, and/or distributor account. The use of a blockchain may ensure that environmental activities data and/or environmental credit scores are not tampered with or misrepresented, as the user devices 110, partner devices 112, distributor devices 114, verifier devices 116, site devices 129, advertisement service provider devices 127, point of service systems 118, and computing nodes 122 in the system for environmental credit scoring 100 as shown in FIG. 1. may be able to validate each of the blocks in the blockchain and view the environmental activity data and environmental credit scores.

In some embodiments, the server computer system 124 may be a node in the blockchain network and may be configured to generate new blocks (e.g., to include updated environmental credit scores, new data received from site devices 129, new data received from point of service systems 118 of one or more partners 104 or other systems associated with users 102, partners 104, distributors 106, and/or verifiers 108, new data received from user devices, partner devices, distributor devices, and advertisement service provider devices 127) that are validated by other nodes and added to the blockchain. In some embodiments, the point of service system 118 may also be a node in the blockchain network and may be configured to generate new blocks that are validated by other nodes and added to the blockchain. In other embodiments, the server computer system 124, site devices 129, point of service systems 118, user devices 110, partner devices 112, distributor devices 114, verifier devices 116, advertisement service provider devices 127, and/or other entities or systems may transmit data to be stored in the blockchain to a node in the blockchain network for addition thereto.

FIG. 4 is a diagram of example components of a device 400. Device 400 may correspond to a device from user devices 110, partner devices 112, distributor devices 114, verifier devices 116, site devices 129, computing nodes 122, and/or point of service systems 118. In some implementations, a device from the user devices 110, partner devices 112, distributor devices 114, verifier devices 116, site devices 129, computing nodes 122, and/or point of service systems 118 may include one or more components of device 400 and/or one or more devices 400. As shown in FIG. 4, device 400 may include a communications interface 408, a memory 404, a processor 406, a storage component 402, an input component 414, an output component 412, and a communications infrastructure 410.

Communications infrastructure 408 includes a component that permits communication among the components of device 400 such as a bus, network, multi-core message-passing scheme, message queue, etc.

Processor 406 may be implemented in firmware, hardware, or a combination of software and hardware. Processor 406 may be connected to a communications infrastructure 410. Processor 406 may be an application-specific integrated circuit (ASIC), an accelerated processing unit (APU), a microprocessor, a field-programmable gate array (FPGA), a central processing unit (CPU), a microcontroller, a graphics processing unit (GPU), a digital signal processor (DSP), a general-purpose or special-purpose processor device specifically configured to perform the functions of the processor 406 discussed herein, or another type of processing component. In some implementations, processor 406 includes one or more processors capable of being programmed to perform a specific function. Processor 406 as described herein may be a single processor, a plurality of processors, or combinations thereof. Processor 406 may have one or more processor "cores.". Processor 406 may be configured to execute computer-readable instructions (software instructions) stored on storage component 402 and/or memory 404. In some embodiments, the processor 406 executing software instructions stored on storage component 402 and/or memory 404 may be configured to perform one or more steps described with reference to FIG. 2A, FIG. 2B, FIG. 2C, and FIG. 3 herein. In some embodiments, a computer-readable medium may comprise non-volatile and/or volatile memory and have stored upon it a set of software instructions that, when executed by the processor 406, cause the processor 406 to perform one or more processes described herein.

The processor 406 may be configured to perform the functions of the server computer system 124 discussed herein as will be apparent to persons having skill in the relevant art. In some embodiments, the processor 406 may comprise one or more modules specifically configured to perform one or more functions of the processor 406, such as a registration module 304, transceiving module 306, verification module 308, processing module 310, etc. As used herein, the term "module" may be hardware or software programmed to perform one or more processes and provides an output using a received input. Based on the present disclosure, the processes, output, and input performed by different modules will be apparent to persons having skill in the relevant art.

In embodiments where a blockchain may be a permissioned blockchain, processor 406 may be configured to execute one or more sets of computer-readable instructions (software instructions) stored on storage component 402 and/or memory 404 in a trusted execution environment (a secure area of a processor).

Memory 404 may include read-only memory (ROM), a random-access memory (RAM), a static or dynamic storage device such as static memory (SRAM), magnetic memory, an optical memory, and/or a flash memory that stores information and/or instructions for use by processor 406. The memory 404 may be configured to store algorithms for use by the registration module 304, transceiving module 306, verification module 308, processing module 310, and/or publication module 314, communication protocols and standards, other algorithms, encryption keys, program code for modules and application programs of the server computer system 124, blockchain data, communications data for blockchain computing nodes 122, user devices 110, partner devices 112, distributor devices 114, verifier devices 116, point of service systems 118, advertisement service provider devices 127, and/or site devices 129, data formatting standards and protocols, and/or other data that may be suitable for use by the server computer system 124 in the performance of the functions disclosed herein as will be apparent to persons having skill in the relevant art. The memory 404 may also be configured to store data comprises algorithms for use by the registration module 304, transceiving module 306, verification module 308, processing module 310, and/or publication module 314, blockchain data, communication data for blockchain computing nodes 122, identification data (e.g., account identifiers, biometric data, blockchain identifier, public keys, data acquired by the imaging device comprising images, videos, and/or live videos for identification purposes) of users 102, partners 104, distributors 106, verifiers 108, sites 128, and/or advertisement service providers 126, hashing algorithms for validating and/or generating blockchain blocks, etc.

Storage component 402 stores software and/or information relating to the use and operation of device 400. For example, storage component 402 may include a hard disk. The hard disk may be a solid-state disk, a magnetic disk, a magneto-optic disk, and/or an optical disk. The storage component 402 may also include flash memory, a magnetic tape, a digital versatile disc (DVD), a cartridge, a compact disc (CD), and/or a floppy disk. The storage component 402 may also include another type of non-transitory computer-readable medium, along with a corresponding drive. The storage component 402 may also include a removable memory chip (e.g., EEPROM, PROM, etc.), and other removable storage units as will be apparent to persons having skill in the relevant art.

Input component 414 includes a component that permits device 400 to receive information, such as a keyboard, a touch screen device, a keypad, a mouse, a switch, a microphone, a button, an optical scanner, and the like. The input component 414 may also include a Radio Frequency Identification (RFID) reader, a card reader, a scale, a barcode scanner, and the like. The input component 414 may also include a sensor for sensing information such as an accelerometer, a gyroscope, an actuator, Global Positioning System (GPS) component, Assisted Global Positioning System (AGPS) component, and the like. The input component 414 may also include one or more biometric devices. The bio-metrics devices or biometric sensors may include fingerprint reader, vein reader, facial recognition device, hand geometry device, iris recognition, retina, and odour/scent recognition device, voice recognition biometric data device, one or more imaging devices (e.g., an infrared imaging device, any other imaging devices), wherein the one or more imaging devices may comprise Complementary Metal Oxide Semiconductor (CMOS) sensor and/or Charge Coupled Device (CCD) sensor, and/or the like.

In some embodiments, the input component 414 may include one or more sensors or devices to acquire data, where the data may be life cycle inventory data (e.g., onsite operations data, onsite material consumption data, onsite emissions data, onsite energy consumption data, and onsite waste data), and/or any other data that may be required by the one or more sensors to be provided to one or more verifiers to verify an environmental product declaration of a product and/or service of a partner of the partners 104 and/or to determine the environmental impact of a product and/or service of a partner of the partners 104. The sensors or devices may include but not limited to one or more sensors or devices for sensing information such as temperature measurement devices, emissions sensor, energy measurement devices, speed measurement devices (e.g., RADAR, LIDAR), other RADAR sensors, thermometers, nano-plasmonic sensors, chemical sensors, proximity sensor, IR sensor (Infrared Sensor), optical particle sensors, pressure sensor, humidity sensors, ionization particle sensors, light sensor, mass spectrometers, ultrasonic sensor, carbon dioxide sensors, smoke, barometers, gas and alcohol sensor, oxygen sensors, touch sensor, color sensor, nitrogen sensors, Geiger counters, tilt sensor, flow, RF radiation detectors, and level sensor or combinations thereof, and/or any other sensor required for performing one or more functions of the device 400 described herein.

In some embodiments, the input component 414 (e.g., a sensor for sensing information such as an accelerometer, a gyroscope, an actuator, global positioning system (GPS) component, Assisted Global Positioning System (AGPS) component, temperature measurement devices, speed measurement devices, etc.) may be anti-tampering or tamper-resistant. In some embodiments, the input component 414 (e.g., a sensor for sensing information such as an accelerometer, a gyroscope, an actuator, global positioning system (GPS) component, Assisted Global Positioning System (AGPS) component, temperature measurement devices, speed measurement devices, etc.) may comprise a module node that acquires data (e.g., sensor data) from the input component 414 (e.g., sensor) and encrypts the data before sending it to be stored in the database 312 of the server computer system 124.

In some embodiments, the input component 414 may be a separate component from device 400 and be operably and/or communicatively coupled to device 400. In some embodiments, the input component 414 may be physically attached to (or manufactured into) device 400.

Output component 412 includes a component that provides output information from device 400 including but not limited to one or more light-emitting diodes (LEDs), a speaker, and/or a display. In some embodiments, the output component 412 may be a separate component from device 400 and be operably and/or communicatively coupled to device 400.

Communications interface 408 includes a component that enables device 400 to communicate with other devices, such as via a wireless connection, a wired connection, or a combination of wireless and wired connections. The component is a transceiver-like component including but not limited to a separate receiver and transmitter or a transceiver. The communications interface may be configured to allow or enable data and software to be transferred between the device 400 and external devices. For example, communications interface 408 may include a network interface (e.g., an Ethernet card), a cellular network interface, an optical interface, a communications port, a coaxial interface, an infrared interface, a radio frequency (RF) interface, a Wi-Fi interface, a PCMCIA slot and card, a universal serial bus (USB) interface, or the like. Communications interface 408 may transfer data and software in the form of signals, which may be optical, electromagnetic, electronic, or other signals as will be apparent to persons having skill in the relevant art.

In some embodiments, the communications interface 408 may comprise one or more of a mobile data network transceiver, a Wi-Fi transceiver, an NFC transceiver, a Bluetooth transceiver, a network adapter, and/or the like. In some embodiments, the communications interface 408 may be configured to allow or enable the processor 406 to communicate with one or more point of service systems 118, computing nodes 122, user devices 110, partner devices 112, distributor devices 114, site devices 129, advertisement service provider devices 127, and/or verifier devices 116 over a network 120.

In embodiments, the communications interface 408 may comprise a subscriber identity module (SIM) of one or more wireless or mobile carriers or wireless service providers that enables the device 400 to communicate with wireless or mobile carriers or wireless service providers and access and use their services. One or more SIM may comprise International Mobile Subscriber Identity (IMSI).

In embodiments where a blockchain may be utilized, the communications interface 408 may be configured to enables device 400 to communicate with other devices and to receive data signals electronically transmitted by the server computer system 124, computing nodes 122, point of service systems 118, user devices 110, partner devices 112, distributor devices 114, site devices 129, advertisement service provider devices 127, and/or verifier devices 116 in a blockchain network. In embodiments where a blockchain may be utilized, the communications interface 408 may be configured to enables device 400 to communicate with other devices and to transmit data signals electronically to the server computer system 124, computing nodes 122, point of service systems 118, user devices 110, partner devices 112, distributor devices 114, site devices 129, advertisement service provider devices 127, and/or verifier devices 116 in a blockchain network.

In some embodiments, the components or devices of the communications interface 408 may be a separate component from device 400 and be operably and/or communicatively coupled to device 400.

One or more processes described herein may be performed by device 400. The processes may be performed by device 400 based on processor 406 executing software instructions that may be stored by a non-transitory computer-readable medium such as storage component 402 and/or memory 404. As defined herein the computer-readable medium is a non-transitory memory device, where a memory device includes memory space spread across multiple physical storage devices or memory space within a single physical storage device. One or more processes described herein may be performed by processor 406 when the software instructions stored in the storage component 402 and/or memory 404 are executed. Alternatively, or additionally, one or more processes described herein may be performed by software instructions in combination with hardwired circuitry. One or more processes described herein may also be performed by hardwired circuitry in place of software instructions. As such, the embodiments and/or implementations described herein are not limited to any specific combination of software and hardware circuitry.

The number of components or arrangements shown in FIG. 4 is provided as an example. In practice, device 400 may include fewer components, additional components, different components, or differently arranged components than those shown in FIG. 4. One or more functions described herein may be performed by one or more components of device 400.

Figure 2A:
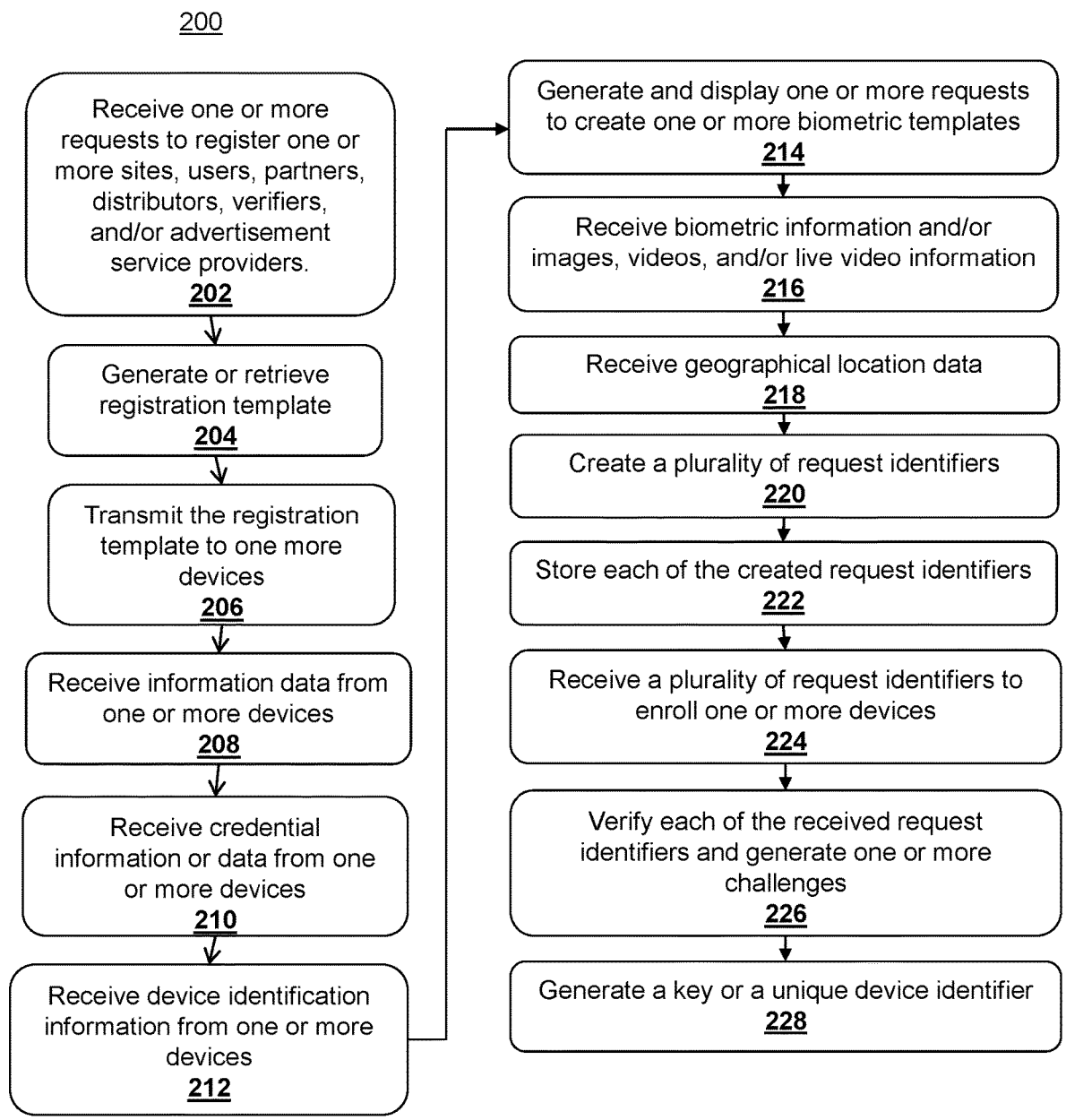
FIG. 2A, FIG. 2B, and FIG. 2C show a simplified flowchart illustrating a method for environmental credit scoring in accordance with one or more embodiments.
Figure 2B:
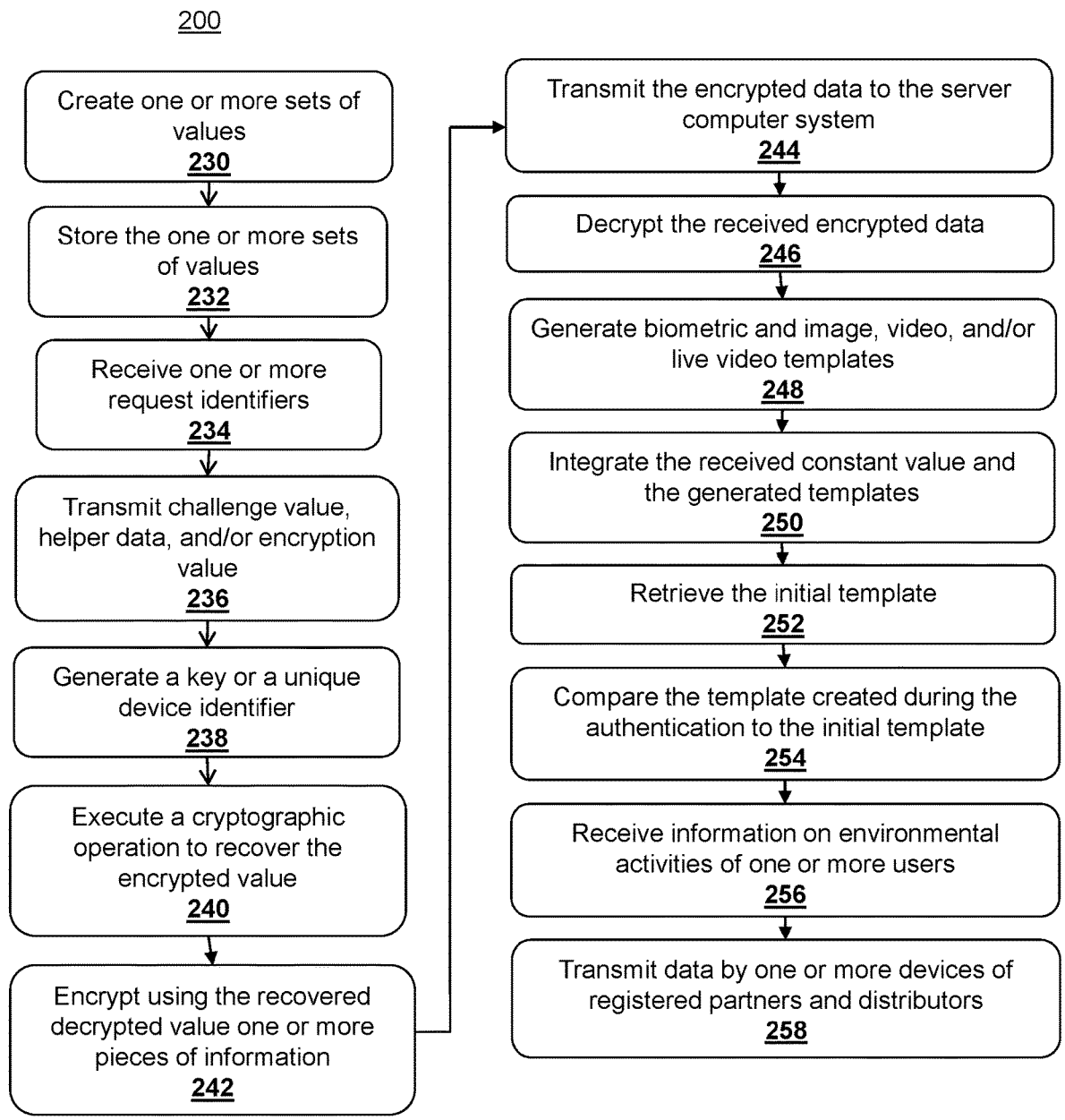
Figure 2C:
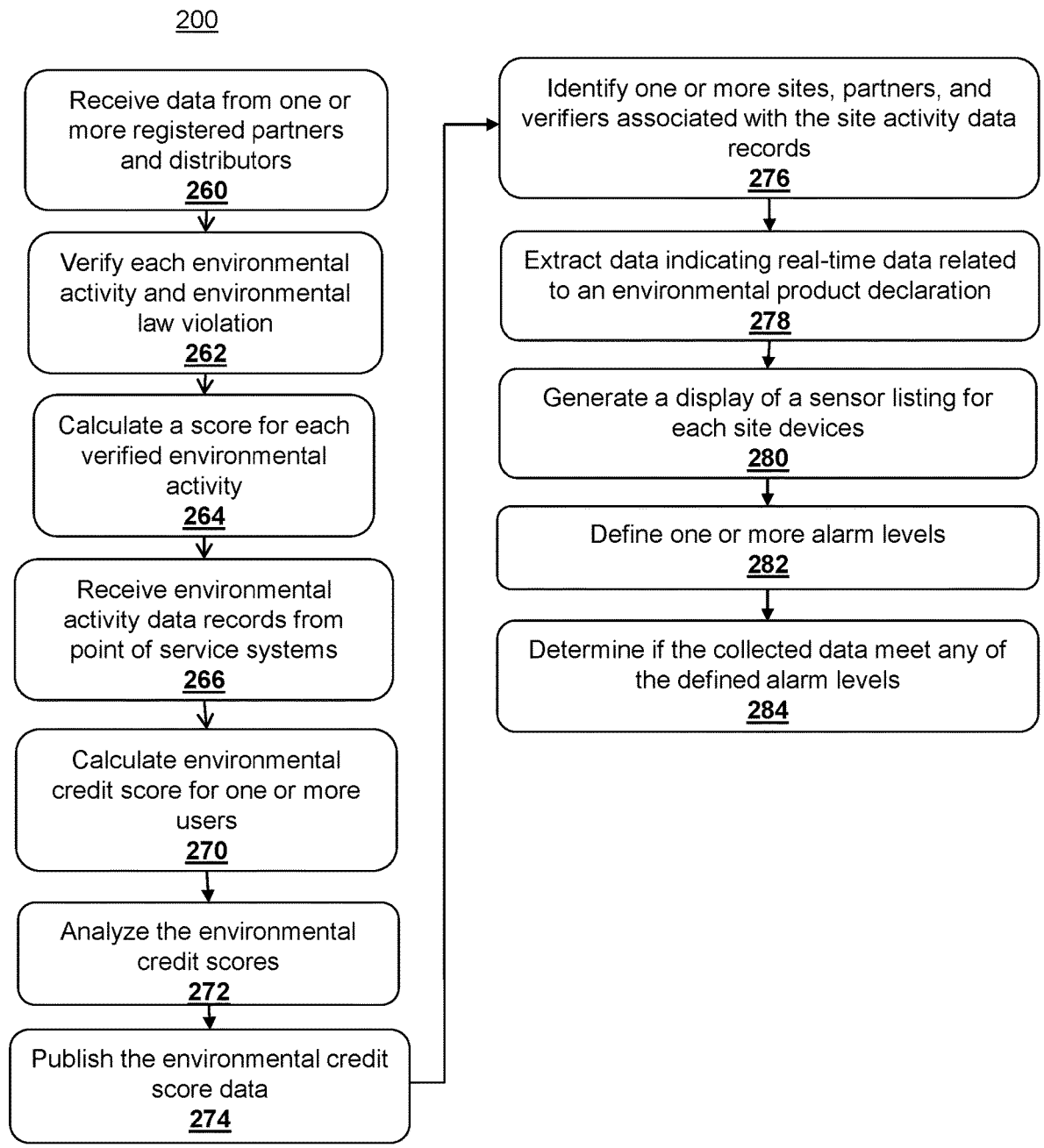

FIG. 2A, FIG. 2B, and FIG. 2C show a flowchart 200 illustrating a method for environmental credit scoring based on the verified activities of sites 128, users 102, partners 104, distributors 106, verifiers 108, and/or advertisement service providers 126 in accordance with one or more embodiments. As discussed with reference to FIG. 1, the users 102, the partners 104, the distributors 106, the verifiers 108, and/or the advertisement service providers 126 may interact with the server computer system 124 via the network 120.

At step 202, the server computer system 124 receives one or more requests to register one or more sites 128, users 102, partners 104, distributors 106, verifiers 108, and/or advertisement service providers 127 with the server computer system 124.

At step 204, the server computer system 124 may generate or otherwise retrieve from the storage component 402 and/or memory 404 of the server computer system 124 a registration template for registering one or more sites 128, users 102, partners 104, distributors 106, verifiers 108, and advertisement service providers 127 with the server computer system 124. The registration template may comprise multiple registration steps, each step may require collecting information from the one or more users 102, partners 104, distributors 106, verifiers 108, and/or advertisement service providers 126 and/or their associated devices.

At step 206, the server computer system 124 may transmit via the network 120 for display or otherwise provide access to the registration template by the site devices 129, user devices 110, partner devices 112, distributor devices 114, verifier devices 116, and/or advertisement service provider devices 127.

A new partner of the partners 104 (e.g., universities, companies, organizations, governmental entities, etc.), a distributor of the distributors 106 (e.g., universities, companies, organizations, governmental entities, product makers, middle agencies, etc.), a verifier of the verifiers 108 (e.g., individuals, companies, organizations, etc.), a user of the users 102 (e.g., individuals), and/or an advertisement service provider of the advertisement service providers 126 (e.g., individuals, companies, organizations, etc.) may interact with an interface (e.g., an application interface, a web interface, an application interface or web interface that may comprise the registration template, etc.) to register with the server computer system 124, preferably through a website hosted by or associated with the server computer system 124, or through a mobile application. For example, employees of partners 104 and distributors 106 may use devices associated with a plurality of partners 104 and distributors 106 (shown as partner devices 112, and distributor devices 114) to access an interface that permits partners and distributors to register with the server computer system 124. Users 102 may use devices associated with a plurality of users 102 (shown as user devices 110) to access an interface that permits users to register with the server computer system 124. Verifiers 108 may use devices associated with a plurality of verifiers 108 (shown as verifier devices 116) to access an interface that permits verifiers 108 to register with the server computer system 124. Advertisement service providers 126 may use devices associated with a plurality of the advertisement service providers 126 (shown as advertisement service providers devices 127) to access an interface that permits advertisement service providers devices 127 to register with the server computer system 124.

The registration of one or more users 102, partners 104, distributors 106, verifiers 108, and/or advertisement service providers 126 and/or their associated devices may comprise one or more steps. Each step may require collecting data or one or more pieces of information and transmitting the data or one or more pieces of information to the server computer system 124. The registration comprises:

(a) transmitting to the server computer system 124 from one or more user devices 110, partner devices 112, distributor devices 114, verifier devices 116, and/or advertisement service provider devices 127 credential information (e.g., user name, unique user identifier, password, personal identification number (PIN), key, and/or the like) of the one or more users 102, partners 104, distributors 106, verifiers 108, and/or advertisement service providers 126, where. In some embodiments, the server computer system 124 may generate the credential information (e.g., public keys, private key, unique user identifier, user name, password, personal identification number (PIN). The credential information can be used to authenticate the one or more users 102, partners 104, distributors 106, verifiers 108, and/or advertisement service providers 126. The first step may also comprise transmitting information that may be transmitted in the other registration steps (e.g., name, address, taxpayer identification number, telephone number, e-mail address); (b) transmitting to the server computer system 124 from one or more user devices 110, partner devices 112, distributor devices 114, verifier devices 116, and/or advertisement service provider devices 127 biometric information (e.g., facial characteristics, voice characteristics, fingerprint characteristics, and eye characteristics) of the one or more users 102, partners 104, distributors 106, verifiers 108, and/or advertisement service providers 126; (c) transmitting to the server computer system 124 from one or more site devices 129, point of service systems 118, user devices 110, partner devices 112, distributor devices 114, verifier devices 116, and/or advertisement service provider devices 127 information relating to the geographical location data (e.g., GPS/AGPS coordinates) of one or more site devices 129, point of service systems 118, user devices 110, partner devices 112, distributor devices 114, verifier devices 116, and/or advertisement service provider devices 127; (d) transmitting to the server computer system 124 from one or more site devices 129 one or more sites' images, videos, live videos of each of the sites 128; (e) transmitting to the server computer system 124 from one or more site devices 129, point of service systems 118, user devices 110, partner devices 112, distributor devices 114, verifier devices 116, and/or advertisement service provider devices 127 information relating to device identification information of one or more devices, where the information may comprise data or one or more pieces of information that are stored locally in the storage component 402 and/or memory 404 of the devices and uniquely identify each of the devices (e.g., media access control ("MAC") address, an international mobile equipment identity ("IMEI") number, an international mobile subscriber identity ("IMSI") number, and/or the like); (f) transmitting to the server computer system 124 from one or more site devices 129, point of service systems 118, user devices 110, partner devices 112, distributor devices 114, verifier devices 116, and/or advertisement service provider devices 127 information relating to the profile of one or more sites 128, users 102, partners 104, distributors 106, verifiers 108, and/or advertisement service providers 126 (e.g., name, address, type, taxpayer identification number, telephone number, e-mail address);

and (g) transmitting to the server computer system 124 from one or more site devices 129, point of service systems 118, user devices 110, partner devices 112, distributor devices 114, verifier devices 116, and/or advertisement service provider devices 127 information relating to one or more Physical Unclonable Function (PUF) of one or more site devices 129, point of service systems 118, user devices 110, partner devices 112, distributor devices 114, verifier devices 116, and/or advertisement service provider devices 127 (e.g., SRAM-PUF, CMOS sensor PUF).

As an example, an employee of a partner 104 (e.g., universities, companies, organizations, governmental entities, etc.) may register with the server computer system 124 by interacting with a web interface displayed on a device associated with the partner to create a profile for the partner. The profile may include but not limited to information indicating a partner name, a partner address, partner type (e.g., product maker, middle agency, university, company, organization, governmental entity, consumer reporting agency, environmental product declaration program operator), other information (e.g., taxpayer identification number, telephone number, e-mail address), one or more geographical locations in which the unregistered partner operates, an environmental product declaration for each product or service offered by the partner, approval by a registered partner (e.g., a partner 104 registered with the server computer system 124) and/or an external system that verifies the partners 104, a registration number of an environmental product declaration, information on environmental product declaration program operator, any other information that uniquely identifies the partners 104, and/or any other information that may be needed to register with the server computer system 124. The one or more employees of a partner 104 may be enabled by the server computer system 124 to select one or more external systems (e.g., external identity management systems, and/or the like) that verify the employees of a partners 104 before allowing them to register with the server computer system 124, wherein the verification by the one or more external systems may be done before or after submitting the registration request, and wherein the registration request may not be accepted by the server computer system 124 if the employees of a partners 104 are not verified by the one or more external systems.

As an example, an employee of a distributor 106 (e.g., product makers, middle agencies, universities, companies, organizations, governmental entities, etc.) may register with the server computer system 124 by interacting with a web interface displayed on a device associated with the distributor to create a profile for the distributor. The profile may include but not limited to information indicating a distributor name, a distributor address, distributor type (e.g., product maker, middle agency, university, company, organization, governmental entity, consumer reporting agency, environmental product declaration program operator), other information (e.g., taxpayer identification number, telephone number, e-mail address), one or more geographical locations in which the distributor operates, an environmental product declaration for each product or service used by the distributor, approval by a registered partner (e.g., a partner 104 registered with the server computer system 124) and/or an external system that verifies the distributors 106, a registration number of an environmental product declaration, information on environmental product declaration program operator, any other information that uniquely identifies the distributors 106, and/or any other information that may be needed to register with the server computer system 124. The one or more employees of a distributor 106 may be enabled by the server computer system 124 to select one or more external systems (e.g., external identity management systems, and/or the like) that verify the distributors 106 before allowing them to register with the server computer system 124, wherein the verification by the one or more external systems may be done before or after submitting the registration request, and wherein the registration request may not be accepted by the server computer system 124 if the one or more employees of distributors 106 are not verified by the one or more external systems.

As an example, an individual may register with the server computer system 124 by interacting with a web interface displayed on a device associated with the user 102 to create a profile for the user. The profile may include but not limited to information indicating a user name, a user address, passport number, taxpayer identification number, telephone number, e-mail address, information on environmental activities of the user (e.g., information on home energy, transportation, waste, food, shopping, and/or the like), approval by a registered partner (e.g., a partner 104 and already registered with the server computer system 124) and/or an external system that verifies the users 102, any other information that uniquely identifies the users 102, and/or any other information that may be needed to register with the server computer system 124. In some implementations, the environmental activities information provided by user 102 may be verified by a registered partner 104 and/or an unregistered entity. One or more individuals may be enabled by the server computer system 124 to select one or more external systems (e.g., external identity management systems, and/or the like) that verify the users 102 before allowing them to register with the server computer system 124, wherein the verification by the one or more external systems may be done before or after submitting the registration request, and wherein the registration request may not be accepted by the server computer system 124 if the users 102 are not verified by the one or more external systems.

As an example, an individual verifier and/or an employee of a verifier 108 (e.g., universities, companies, organizations, governmental entities, etc.) may register with the server computer system 124 by interacting with a web interface displayed on a device associated with the verifier to create a profile for the verifier 108. The profile may include but not limited to information indicating a verifier name, a verifier address, verifier type (e.g., university, company, organization, a governmental entity), other information (e.g., taxpayer identification number, telephone number, e-mail address), one or more geographical locations in which the verifier located, an environmental product declaration for each product or service verified by the verifier, approval by a registered partner (e.g., a partner 104 registered with the server computer system 124), an external system that verifies the verifiers 108, any other information that uniquely identifies the verifiers 108, and/or any other information that may be needed to register with the server computer system 124. The one or more individual verifiers or the employee of the verifiers 108 may be enabled by the server computer system 124 to select one or more external systems (e.g., external identity management systems, and/or the like) that verify the verifiers 108 to verify the verifiers 108 before allowing them to register with the server computer system 124, wherein the verification by the one or more external systems may be done before or after submitting the registration request, and wherein the registration request may not be accepted by the server computer system 124 if the verifiers 108 are not verified by the one or more external systems.

As an example, an individual advertisement service provider of the advertisement service providers 126 and/or an employee of an advertisement service provider (e.g., universities, companies, organizations, governmental entities, etc.) may register with the server computer system 124 by interacting with a web interface displayed on advertisement service provider device 127 associated with the advertisement service providers 126 to create a profile for the advertisement service providers 126. The profile may include but not limited to information indicating advertisement service provider's name, advertisement service provider's address, advertisement service provider's type (e.g., university, company, organization, a governmental entity), other information (e.g., taxpayer identification number, telephone number, e-mail address), one or more geographical locations in which the advertisement service provider 126 located, an environmental product declaration for each product or service used by the advertisement service provider 126, approval by a registered partner (e.g., a partner 104 and already registered with the server computer system 124), an external system that verifies the advertisement service providers 126, any other information that uniquely identifies the advertisement service providers 126, and/or any other information that may be needed to register with the server computer system 124. The one or more advertisement service provider 126 may be enabled by the server computer system 124 to select one or more external systems (e.g., external identity management systems, and/or the like) that verify the advertisement service providers 126 before allowing them to register with the server computer system 124, wherein the verification by the one or more external systems may be done before or after submitting the registration request, and wherein the registration request may not be accepted by the server computer system 124 if the advertisement service providers 126 are not verified by the one or more external systems.

The server computer system 124 may enable one or more registered and authenticated verifiers 108 to interact with an interface to submit a registration request to the server computer system 124 for registering one or more sites 128 and registering or enrolling one or more site devices 129 of one or more partners 104 with the server computer system 124. As an example, one or more registered verifiers 108 may interact with an interface displayed on a site device of the site devices 129 to create a profile for one or more sites 128 of one or more partners 104 and to submit the profile as a registration request to the server computer system 124. The server computer system 124 may authenticate the one or more registered verifiers 108 before allowing them to register the one or more site 128 and the one or more site devices 129. The profile of each site may include but not limited to information indicating a site name, identification information of a partner of the partners 104 (e.g., name, account identifier, blockchain identifier, public key, and/or the like), a partner address, partner type (e.g., university, company, organization, a governmental entity), identification information of one or more site devices 129 (e.g., unique site device identifier that may be printed on the site device and/or provided to the verifier by the server computer system 124, the unique site device identifier may be in a human and machine-readable form), and/or any other information that may be required to register the one or more sites 128 with the server computer system 124. In some embodiments, the unique site device serial number or identifier of the one or more site devices 129 and the partner account identifiers, blockchain identifiers or public keys may be in the form of a Quick Response code (QR code), a barcode, NFC tag, RFID tag, or any electronic tag, and/or any other techniques or device that may be read by the site devices 129, wherein the one or more verifiers 108 may use the site device 129 and its associated components to read the QR code, barcode, NFC tag, RFID tag, or any electronic tag during the registration of the one or more sites 128 and/or during installation of the one or more site devices 129 at partner's sites 128, and the server computer system 124 may automatically fill in the fields of the registration request form with the required information relating to the partner, verifier, and/or site devices 129 after the site device 129 reads the QR code, barcode, NFC tag, RFID tag, or any electronic tag that may be read by the site devices 129.

In some embodiments, the registration request of one or more sites 128 may be submitted by the one or more verifiers 108 at the location of the one or more partners 104 using the one or more site devices 129. The data of each registration request of one or more sites 128 submitted by the one or more verifiers 108 to the server computer system 124 using one or more site devices 129 may include but not limited to time, geographical location data (e.g., GPS/AGPS coordinates) of a partner of the partners 104, one or more verifiers 108, and one or more site devices 129, identification data (e.g., account identifiers, biometric data, blockchain identifier, public keys, and/or the like) of a partner of the partners 104, and/or one or more verifiers 108, and/or identification data of one or more sites 128 (e.g., images, videos, and/or live videos, unique site device identifier), wherein the images, videos, and/or live videos acquired by the one or more imaging devices of the one or more site devices 129 during the registration of the site and during the installation of the one or more site devices 129 may be stored in the database of the server computer system 124 to be used by one or more algorithms, machine learning, and/or a trained neural network by means of deep learning (e.g., image or video recognition algorithms) to authenticate the one or more site, and site devices 128.

In some embodiments, the server computer system 124 may authenticate one or more registered verifiers 108, and a registered partner of the partners 104 prior to registering one or more sites 128 with the server computer system 124, prior to registering one or more site devices 129 with the server computer system 124, and/or prior to enabling one or more site devices 129 to access the server computer system 124 to perform one or more functions of the site devices described herein. The registration request may be rejected by the server computer system 124 if the authentication is not successful. The registration request of one or more sites 128 may also be rejected by the server computer system 124 if the one or more site devices 129, a registered partner of the partners 104, and/or the one or more registered verifiers 108 are not located during the registration of the site of the sites 128 at partner's location (e.g., partner's address) stored in the database of the server computer system 124 or within a pre-defined distance from partner's location (e.g., partner's address) stored in the database of the server computer system 124.

The server computer system 124 may enable one or more registered and authenticated partners 104 to interact with an interface to submit a registration request to the server computer system 124 for registering or enrolling one or more point of service systems 118 of one or more partners 104 with the server computer system 124 to enable the one or more point of service systems 118 to access the server computer system 124 to perform one or more functions of the point of service systems 118 described herein.

At step 208, the server computer system 124 may receive information data from site devices 129, point of service systems 118, user devices 110, partner devices 112, distributor devices 114, verifier devices 116, and/or advertisement service provider devices 127. The information data may be received in real time. The server computer system 124 may facilitate the receipt of information data, which can then be stored in the storage component 402 and/or memory 404 of the server computer system 124.

At step 210, the server computer system 124, may receive credential information or data (e.g., public keys, private key, user name, password, personal identification number (PIN), key, and the like) for the users 102, partners 104, distributors 106, verifiers 108, and/or advertisement service providers 127 by way of input at their associated devices (user devices 110, partner devices 112, distributor devices 114, verifier devices 116, and/or advertisement service provider devices 127). In some embodiments, the credential information may be generated by the server computer system 124. The server computer system 124 may also receive information relating to the profile of one or more sites 128, users 102, partners 104, distributors 106, verifiers 108, and/or advertisement service providers 126 (e.g., name, address, type, taxpayer identification number, telephone number, e-mail address, and other information). The information may be received in real time. The server computer system 124, may associate the users 102, partners 104, distributors 106, verifiers 108, and/or advertisement service providers 127 information data with the users 102, partners 104, distributors 106, verifiers 108, and/or advertisement service providers 127 credential information. The server computer system 124 may store in the storage component 402 and/or memory 404 of the server computer system 124, the associated users 102, partners 104, distributors 106, verifiers 108, and/or advertisement service providers 127 credential information with the users 102, partners 104, distributors 106, verifiers 108, and/or advertisement service providers 127 information data.

At step 212, the server computer system 124 may receive device identification information from one or more site devices 129, point of service systems 118, user devices 110, partner devices 112, distributor devices 114, verifier devices 116, and/or advertisement service provider devices 127 via the network 120. The device identification information may be received in real time. The device identification information may be one or more pieces of information that are stored locally in the storage component 402 and/or memory 404 of the one or more site devices 129, point of service systems 118, user devices 110, partner devices 112, distributor devices 114, verifier devices 116, and/or advertisement service provider devices 127 to uniquely identify each of the devices. The device identification information may include but are not limited to operating system version, operating system manufacturer, operating system name, and information about the one or more site devices 129, point of service systems 118, user devices 110, partner devices 112, distributor devices 114, verifier devices 116, and/or advertisement service provider devices 127 that may comprise a hardware identifier such as, a media access control ("MAC") address, an international mobile equipment identity ("IMEI") number, and/or the like. In some embodiments, the hardware identifier may also comprise an identity of the pairing of the one or more sites 128, users 102, partners 104, distributors 106, verifiers 108, and/or advertisement service providers 127 with their associated devices, such as an international mobile subscriber identity ("IMSI") number. The hardware identifier may also comprise a combination of these and other identifiers of the user devices 110, partner devices 112, distributor devices 114, verifier devices 116, and/or advertisement service provider devices 127. Those of ordinary skill in the art will recognize that other forms of device identification information may be substituted herein as part of the provision of the device identification information to the server computer system 124. In some embodiments, the device identification information may be generated by one or more site devices 129 and transmitted to the server computer system 124 during or after the registration.

The server computer system 124 may associate the users 102, partners 104, distributors 106, verifiers 108, and/or advertisement service providers 127 information data with the device identification information of their associated devices (user devices 110, partner devices 112, distributor devices 114, verifier devices 116, and/or advertisement service provider devices 127). The server computer system 124 may also associate one or more sites 128 with the device identification information of their associated devices one or more site devices 129. The server computer system 124 may also associate one or more partners 104 with the device identification information of their associated devices one or more point of service systems 118.

The server computer system 124 may store in the storage component 402 and/or memory 404 of the server computer system 124, the associated one or more sites 128, users 102, partners 104, distributors 106, verifiers 108, and/or advertisement service providers 127 information data with the device identification data of their associated devices (site devices 129, point of service systems 118, user devices 110, partner devices 112, distributor devices 114, verifier devices 116, and/or advertisement service provider devices 127).

At step 214, one or more requests for the one or more users 102, partners 104, distributors 106, verifiers 108, and/or advertisement service providers 126 to create one or more biometric templates (e.g., face templates) may be generated by the server computer system 124 for display on their associated devices (user devices 110, partner devices 112, distributor devices 114, verifier devices 116, and/or advertisement service provider devices 127) during or after the registration. The server computer system 124 may also generate one or more requests to create one or more image, video, and/or live video templates for display on the one or more verifier devices 116 to create one or more templates for one or more sites 128 during or after the registration of the one or more sites 128 and/or during or after the enrollment and installation of the one or more site devices 129.

At step 216, the server computer system 124 may receive data or one or more data records comprising biometric information (e.g., face images data) of one or more users 102, partners 104, distributors 106, verifiers 108, and/or advertisement service providers 126 acquired by the one or more sensors (e.g., CMOS and CCD sensors) of the one or more user devices 110, partner devices 112, distributor devices 114, verifier devices 116, and/or advertisement service provider devices 127. The server computer system 124 may also receive data one or more data records comprising images, videos, and/or live video information (e.g., site's image, video, and/or live video data) of one or more sites 128. The data or data records may be received in real time.

In some embodiments, the server computer system 124 may generate a biometric template (e.g., face template) for each of the users 102, partners 104, distributors 106, verifiers 108, and/or advertisement service providers 126 based on the received biometric information (e.g., face image data). In some embodiments, the server computer system 124 may also generate image, video and/or live video template (e.g., sites' image, video and/or live video template) for each of sites 128 based on the received images, videos, and/or live video information (e.g., sites' image, video and/or live video data). The server computer system 124 may associate the one or more users 102, partners 104, distributors 106, verifiers 108, and/or advertisement service providers 127 information data with their biometric template data (e.g., face template data) and/or biometric information (e.g., face images data). In some embodiments, the server computer system 124 may generate the biometric template (e.g., face template) by extracting one or more biometric (e.g., face image) features from the received biometric information (e.g., face image data) using one or more algorithms. In some embodiments, the server computer system 124 may generate the image, video, and/or live video template by extracting one or more site images, videos, and/or live videos features from the received images, videos, and/or live video information.

In some embodiments, the server computer system 124 may also associate the one or more sites 128 information data with their image, video, and/or live video template data (e.g., image, video, and/or live video template data) and/or image, video and/or live video information (e.g., image, video and/or live video data). In some embodiments, the server computer system 124 may store in the storage component 402 and/or memory 404 of the server computer system 124, the associated users 102, partners 104, distributors 106, verifiers 108, and/or advertisement service providers 127 information data with their biometric template data (e.g., face template data) and/or biometric information (e.g., face images data). In some embodiments, the server computer system 124 may also store in the storage component 402 and/or memory 404 of the server computer system 124, the associated sites 128 information data with their image, video and/or live video template data (e.g., image, video and/or live video template data) and/or image, video and/or live video information (e.g., image, video and/or live video data).

At step 218, the server computer system 124 may receive data or one or more data records comprising geographical location data (e.g., GPS/AGPS coordinates) of one or more site devices 129, point of service systems 118, user devices 110, partner devices 112, distributor devices 114, verifier devices 116, and/or advertisement service provider devices 127. The geographical location data (e.g., GPS/AGPS coordinates) may be acquired by their GPS/AGPS components during or after the registration. The server computer system 124 may associate the one or more site devices 129, point of service systems 118, user devices 110, partner devices 112, distributor devices 114, verifier devices 116, and/or advertisement service provider devices 127 information data with their geographical location data (e.g., GPS/AGPS coordinates). The server computer system 124 may store in the storage component 402 and/or memory 404 of the server computer system 124, the associated site devices 129, point of service systems 118, user devices 110, partner devices 112, distributor devices 114, verifier devices 116, and/or advertisement service provider devices 127 information data with their geographical location data (e.g., GPS/AGPS coordinates).

At step 220, the server computer system 124 may create a plurality of request identifiers for a plurality of combinations or sets. Each request identifier may be binded with a combination or set. Each combination or set may represent an authentication method that may be used to authenticate each of the sites 128, users 102, partners 104, distributors 106, verifiers 108, and/or advertisement service providers 126 and their associated devices.

In some embodiments, the creation of the plurality of request identifiers for a plurality of combinations or sets by the server computer system 124 may be done during the registration of the one or more sites 128, users 102, partners 104, distributors 106, verifiers 108, and/or advertisement service providers 126 based on the data received from the one or more site devices 129, point of service systems 118, user devices 110, partner devices 112, distributor devices 114, verifier devices 116, and/or advertisement service provider devices 127.

For example, the combination of user, user credential information, device Physical Unclonable Function (PUF), device identification information, and the geographical location data may represent a five-factor authentication method. The first factor: is user that may be represented by the biometric feature of each of the users 102, partners 104, distributors 106, verifiers 108, and/or advertisement service providers 126, site's images, videos, live videos feature of each of the sites 128. The second factor is user credential information that may be represented by the credential information (e.g., public keys, private key, user name, password, personal identification number (PIN), key, and/or the like) of each of the users 102, partners 104, distributors 106, verifiers 108, and/or advertisement service providers 126. The third factor is device PUF that may be represented by the unique device identifier (e.g., SRAM-PUF, CMOS sensor PUF) of each of the site devices 129, point of service systems 118, user devices 110, partner devices 112, distributor devices 114, verifier devices 116, and/or advertisement service provider devices 127. The fourth factor is device identification information that may be represented by one or more pieces of information that are stored locally in the storage component 402 and/or memory 404 of the user devices 110, partner devices 112, distributor devices 114, verifier devices 116, and/or advertisement service provider devices 127 and uniquely identify each of the devices (e.g., media access control ("MAC") address, an international mobile equipment identity ("IMEI") number, an international mobile subscriber identity ("IMSI") number, and/or the like). The fifth factor is geographical location data that may be represented by the geographical location data (e.g., GPS/AGPS coordinates) of each of the site devices 129, point of service systems 118, user devices 110, partner devices 112, distributor devices 114, verifier devices 116, and/or advertisement service provider devices 127.

The combinations may include but not limited to: (user's 102 biometric feature acquired by the one or more sensors of the user device 110, user 102 credential information, user device's 110 PUF, user device 110 identification information, and/or the verified geographical location data of the user device 110), (partner's 104 biometric feature acquired by the one or more sensors of the partner device 112, partner's 104 credential information, partner device's 112 PUF, partner device 112 identification information, and/or the verified geographical location data of the partner device 112), (distributor's biometric feature acquired by the one or more sensors of the distributor device 114, distributor's 106 credential information, distributor device's PUF, distributor device 114 identification information, and/or the verified geographical location data of the distributor device 114), (verifier's biometric feature acquired by the one or more sensors of the verifier device 116, verifier's 108 credential information, verifier device's PUF, verifier device 116 identification information, and/or the verified geographical location data of the verifier device 116), (advertisement service provider's biometric feature acquired by the one or more sensors of the advertisement service provider's device 127, advertisement service provider's 126 credential information, advertisement service provider device's PUF, advertisement service provider device 127 identification information, and/ or the verified geographical location data of the advertisement service provider device 127), (partner's biometric feature acquired by the one or more sensors of the point of service system 118, partner's 104 credential information, point of service system's PUF, point of service system's 118 identification information and/or the verified geographical location data of the point of service system), (site's 128 images, videos, and/or live videos feature, verifier's 108 credential information, site device's PUF, site device 129 identification information, and/or the verified geographical location data of the site device 129), and/or (verifier's biometric feature acquired by the one or more sensors of the site device 129, site's images, videos, and/or live videos feature, verifier's 108 credential information, site device's PUF, site device 129 identification information, and/or the verified geographical location data of the site device 129).

At step 222, the server computer system 124 may store each of the created request identifiers with its associated combination in the storage component 402 and/or memory 404 of the server computer system 124.

In some embodiments, the server computer system 124 may associate each of the created request identifiers with the information data (e.g., device identification data, credential information) of the one or more sites 128, users 102, partners 104, distributors 106, verifiers 108, and/or advertisement service providers 126 and their associated devices during the registration, where a request identifier may be transmitted to the server computer system 124 when each of the plurality of sites 128, users 102, partners 104, distributors 106, verifiers 108, and/or advertisement service providers 126 seek access permission to the server computer system 124 using their associated devices.

In some embodiments, the server computer system 124 may authenticate one or more sites 128, users 102, partners 104, distributors 106, verifiers 108, and/or advertisement service providers 127 and their associated devices based on the type of combination. The type of combinations may comprise one-factor authentication method: user; two-factor authentication method: user, device PUF; three-factor authentication method: user, device PUF, and the geographical location data; four-factor authentication method: user, device PUF, device identification information, and the geographical location data; and five-factor authentication method: user, user credential information, device PUF, device identification information, and the geographical location data. The one-factor, two-factor, three-factor, four-factor, and five-factor authentication methods may comprise any of the factors. In some embodiments, the factors of an authentication method may be determined based on the information data received by the server computer system 124 from the one or more site devices 129, point of service systems 118, user devices 110, partner devices 112, distributor devices 114, verifier devices 116, and/or advertisement service provider devices 127 during the registration.

In some embodiments, the server computer system 124 may enable one or more users 102, partners 104, distributors 106, verifiers 108, and/or advertisement service providers 127 to register based on one-factor, and/or two-factor authentication methods that may include any of the two factors (user, user credential information) without registering their associated devices during the registration and after they become registered and authenticated with the server computer system 124 they may be enabled by the server computer system 124 to register their associated devices. For example, a one-factor authentication method that utilizes users 102 credential information (e.g., public keys, user name, password, personal identification number (PIN), key, and/or the like) may be used to authenticate one or more users 102, partners 104, distributors 106, verifiers 108, and/or advertisement service providers 127. Then after the authentication, the one or more users 102, partners 104, distributors 106, verifiers 108, and/or advertisement service providers 127 may be enabled by the server computer system 124 to register their associated devices.

In some embodiments, the combinations may comprise one or more types of biometric information (e.g., facial characteristics, voice characteristics, fingerprint characteristics, and eye characteristics) to authenticate one or more users 102, partners 104, distributors 106, verifiers 108, and/or advertisement service providers 126. For example, a five-factor authentication method for authenticating the one or more users 102 may comprise user facial characteristics, voice characteristics, fingerprint characteristics, and/or eye characteristics, users 102 credential information, users 102 devices PUF, users 102 devices identification information, and the geolocation data or the geographical location data.

In some embodiments, facial characteristics' biometric information may be used to authenticate one or more users 102, partners 104, distributors 106, verifiers 108, and/or advertisement service providers 126. In some embodiments, image, video, and/or live video characteristics may be used to authenticate one or more sites 128.

In some embodiments, any type of biometric information may be used instead of facial characteristics' biometric information. Additionally, a particular embodiment may utilize multiple types of biometric information (e.g., facial characteristics, voice characteristics, fingerprint characteristics, and eye characteristics) to authenticate one or more users 102, partners 104, distributors 106, verifiers 108, and/or advertisement service providers 126.

In some embodiments, the one or more Physical Unclonable Functions (PUFs) of the user devices 110, partner devices 112, distributor devices 114, verifier devices 116, advertisement service provider devices 127, site devices 129, and point of service systems 118 may be silicon PUFs that can be used to authenticate one or more integrated circuits of the devices, devices' associated components and/or sensors. In some embodiments, the PUFs may be memory (memory chips of the devices) based PUFs, wherein the devices may comprise Flash memory, memristor, Static Random-Access Memory (SRAM), Magnetic RAM or Magnetoresistive random-access memory (MRAM), and/or Resistive random-access memory (ReRAM). In some embodiments, the PUFs may be sensor-based (e.g., fingerprint sensor-based PUF, Complementary Metal Oxide Semiconductor (CMOS) sensor-PUF).

In some embodiments, the PUF of the user devices 110, partner devices 112, distributor devices 114, verifier devices 116, advertisement service provider devices 127, site devices 129, and point of service systems 118 may comprise one or more electronic circuits that generate output dependent on unique physical properties of the physical unclonable function (PUF). For example, due to manufacturing process variations, an integrated circuit (IC) comprises transistors with different physical properties. For example, due to manufacturing process variations, the electronic properties of the transistors (e.g., transistors threshold voltages, gain factor) are different and measurable. In some embodiments, the PUF of the user devices 110, partner devices 112, distributor devices 114, verifier devices 116, advertisement service provider devices 127, site devices 129, and point of service systems 118 may comprise one or more electronic circuits on an electronic chip that generate outputs based on the unique physical properties of the one or more electronic circuits. In some embodiments, in response to receiving an input, the PUF of the user devices 110, partner devices 112, distributor devices 114, verifier devices 116, advertisement service provider devices 127, site devices 129, and point of service systems 118 may be configured to generate an output, where the generated output is based on the unique physical properties of the PUF and/or the input.

In some embodiments, without receiving an input, the PUF of the user devices 110, partner devices 112, distributor devices 114, verifier devices 116, advertisement service provider devices 127, site devices 129, and point of service systems 118 may be configured to generate an output. For example, an output (e.g., unique value) can be obtained from a PUF based on SRAM by requesting the state of the SRAM bits at one or more addresses of the SRAM.

At step 224, the server computer system 124 may receive one or more request identifiers from one or more users 102, partners 104, distributors 106, verifiers 108, and/or advertisement service providers 126 to access the server computer system 124 to enroll their associated devices, where the one or more request identifiers may be sent from their associated devices (user devices 110, partner devices 112, distributor devices 114, verifier devices 116, and/or advertisement service provider devices 127). The server computer system 124 may also receive one or more request identifiers from one or more verifiers 108, wherein the request identifier may be sent from each of one or more site devices 129. The server computer system 124 may also receive one or more request identifiers from one or more partners 104, wherein the request identifier may be sent from each of the point of service systems 118 of the partners 104.

At step 226, the server computer system 124 may verify each of the received request identifiers by comparing it with the request identifiers created and stored in the storage component 402 and/or memory 404 of the server computer system 124. The server computer system 124 may generate one or more challenges, and transmit or communicate the one or more challenges to the user devices 110, partner devices 112, distributor devices 114, verifier devices 116, advertisement service provider devices 127, site devices 129, and/or point of service systems 118 upon accepting each of the received request identifiers. In some embodiments, the devices may communicate the one or more challenges as an input to a PUF (e.g., CMOS sensor-based PUF, SRAM-based PUF) of each of the point of service systems 118, site devices 129, user devices 110, partner devices 112, distributor devices 114, verifier devices 116, and/or advertisement service provider devices 127 to generate responses (output) corresponding to each of the challenges. The server computer system 124 may generate one or more challenges for each combination binded with each request identifier during the enrolment of the user devices 110, partner devices 112, distributor devices 114, verifier devices 116, advertisement service provider devices 127, site devices 129, and/or point of service systems 118. Each of the one or more challenges may comprise a random value (e.g., random string of bits).

At step 228, the user devices 110, partner devices 112, distributor devices 114, verifier devices 116, advertisement service provider devices 127, site devices 129, and/or point of service systems 118 may be configured to generate using a generated output of a PUF a key, or a unique device identifier as a value using one or more algorithms (e.g., Fuzzy Extractor, also known as Helper Data algorithm, BCH Fuzzy Extractor, Efficient Fuzzy Extractor using BCH, Polar using HA-SCL, and/or Polar using serially concatenated BCH and Polar Codes), wherein the generated output of a PUF is constant for a fixed input. In some embodiments, the user devices 110, partner devices 112, distributor devices 114, verifier devices 116, advertisement service provider devices 127, site devices 129, and/or point of service systems 118 may be configured to map each output or response of a PUF to a key or a unique device identifier.

In some embodiments, where the generated output of a PUF is noisy output or not the exact same output that can be generated in response to receiving a fixed input twice, the user devices 110, partner devices 112, distributor devices 114, verifier devices 116, advertisement service provider devices 127, site devices 129, and/or point of service systems 118 may be configured to generate using a generated noisy output of a PUF a constant value (e.g., key, a unique device identifier, a secret, and/or the like) using one or more algorithms (e.g., Fuzzy Extractor, also known as Helper Data algorithm, BCH Fuzzy Extractor, Efficient Fuzzy Extractor using BCH, Polar using HA-SCL, and/or Polar using serially concatenated BCH and Polar Codes), wherein the devices may recover the constant value (e.g., key) for a fixed input using the generated output of a PUF, one or more algorithms and/or one or more methods during the authentication of the devices. The one or more algorithms and/or one or more methods may comprise Fuzzy Extractor, also known as Helper Data algorithm, BCH Fuzzy Extractor, Efficient Fuzzy Extractor using BCH, Polar using HA-SCL, and/or Polar using serially concatenated BCH and Polar Codes, error-correcting code (ECC) method.

In some embodiments, the user devices 110, partner devices 112, distributor devices 114, verifier devices 116, advertisement service provider devices 127, site devices 129, and/or point of service systems 118 may be configured to generate using a generated output of a PUF a helper data using one or more algorithms and/or methods (e.g., Fuzzy Extractor, also known as Helper Data algorithm, BCH Fuzzy Extractor, Efficient Fuzzy Extractor using BCH, Polar using HA-SCL, and/or Polar using serially concatenated BCH and Polar Codes, error-correcting code (ECC) method). For example, the devices may receive one or more challenges, may generate one or more PUF responses, may generate one or more keys or unique device identifiers, and may generate one or more helper data.

At step 230, the user devices 110, partner devices 112, distributor devices 114, verifier devices 116, advertisement service provider devices 127, site devices 129, and/or point of service systems 118 may create one or more sets of values and transmit them to the server computer system 124, each set of values may comprise one or more challenges, helper data, generated unique device identifiers or keys, and/or the one or more responses (output) of a PUF that were generated in response to receiving one or more fixed input (e.g., in response to receiving the same challenge twice). In some embodiments, one or more values of the one or more sets of values may be encrypted by the devices before sending them to the server computer system 124, wherein the encryption may be done in a way that the values can be decrypted by the server computer system 124 after receiving them. In some embodiments, the one or more responses (output) of a PUF may not be stored in the storage component 402 and/or memory 404 of the server computer system 124.

In some embodiments, the server computer system 124 may associate the one or more site devices 129, point of service systems 118, user devices 110, partner devices 112, distributor devices 114, verifier devices 116, and/or advertisement service provider devices 127 information data with their one or more challenges, helper data, generated keys or unique device identifier, and/or the one or more responses (output) of a PUF. The server computer system 124 may store in the storage component 402 and/or memory 404 of the server computer system 124, the associated site devices 129, point of service systems 118, user devices 110, partner devices 112, distributor devices 114, verifier devices 116, and/or advertisement service provider devices 127 information data with their one or more challenges, helper data, generated keys or unique device identifier, and/or the one or more responses (output) of a PUF. In some embodiments, the server computer system 124 may transmit the challenge and helper data to the user devices 110, partner devices 112, distributor devices 114, verifier devices 116, advertisement service provider devices 127, site devices 129, and/or point of service systems 118, where the one or more devices may recover using one or more algorithms and/or methods the one or more keys or unique device identifiers using a PUF.

At step 232, the server computer system 124 may store the one or more sets of values in the storage component 402 and/or memory 404 of the server computer system 124. In embodiments where the server computer system 124 may not store the values of the key or unique device identifier, the server computer system 124 may store a resulting value of a function of the one or more unique device identifiers or keys (e.g., f(key)).

In embodiments where the server computer system 124 may store a one-way function (e.g., a cryptographic hash function or the like) of the key or unique device identifier, the server computer system 124 may transmit the stored challenge and helper data to the user devices 110, partner devices 112, distributor devices 114, verifier devices 116, advertisement service provider devices 127, site devices 129, and/or point of service systems 118, where the one or more devices may recover the one or more keys or unique device identifiers and send them to the server computer system 124. The server computer system 124 may authenticate the user devices 110, partner devices 112, distributor devices 114, verifier devices 116, advertisement service provider devices 127, site devices 129, and/or point of service systems 118 by checking if a function of the received one or more keys or unique device identifiers is equal to the function of the stored one or more keys or unique device identifiers (e.g., f(received key)=f(stored key)).

In some embodiments, the server computer system 124 may authenticate the user devices 110, partner devices 112, distributor devices 114, verifier devices 116, advertisement service provider devices 127, site devices 129, and/or point of service systems 118 using the one or more challenges, helper data, generated unique device identifiers or keys, and/or the one or more responses (output) of a PUF that were generated in response to receiving one or more fixed input (e.g., in response to receiving the same challenge twice).

In some embodiments, the server computer system 124 may integrate using one or more algorithms (e.g., BioHashing algorithms) the constant value (e.g., key, or a unique device identifier) of the one or more user devices 110, partner devices 112, distributor devices 114, verifier devices 116, advertisement service provider devices 127, site devices 129, and/or point of service systems 118 received during the enrollment and the template (e.g., face template, site image, video, or live video template) of the one or more sites 128, users 102, partners 104, distributors 106, verifiers 108, and/or advertisement service providers 127 generated during the enrollment, wherein the one or more templates generated as a result from the integration may be stored in the storage component 402 and/or memory 404 of the server computer system 124.

In some embodiments, the server computer system 124 may integrate using one or more algorithms two or more factors of a two-factor, three-factor, four-factor, and/or five-factor authentication methods, wherein the integration is based on a plurality of combinations of the factors of the two-factor, three-factor, four-factor, and/or five-factor authentication methods, and wherein the one or more templates generated as a result from the integration may be stored in the storage component 402 and/or memory 404 of the server computer system 124. For example, when a five-factor authentication method that comprises biometric or site image, video, or live video information, user credential information, device PUF, device identification information, and the geographical location data is used, the server computer system 124 may integrate using one or more algorithms a constant value (e.g., key, or a unique device identifier), a template (e.g., face template, site image, video, or live video template), user credential information, device identification information, and the geographical location data, wherein the integration is based on a plurality of combinations.

In some embodiments, the server computer system 124 may store the received information related to the factors of the two-factor, three-factor, four-factor, and/or five-factor authentication methods during the enrollment based on a plurality of combinations of the factors without performing the integration (the integration using one or more algorithms), wherein each combination may represent a template combining two or more factors, wherein the one or more templates generated as a result from each of the combinations may be stored in the storage component 402 and/or memory 404 of the server computer system 124.

At step 234, the server computer system 124 may receive a request identifier from one or more devices associated with one or more users 102, partners 104, distributors 106, verifiers 108, and/or advertisement service providers 126 to access the server computer system 124 to perform one or more functions of their functions described herein, where the request identifier may be sent from each of their associated devices. The server computer system 124 may also receive a request identifier from each of the verifiers 108, wherein the request identifier may be sent from each of the site devices 129. The server computer system 124 may also receive a request identifier from each of the partners 104, wherein the request identifier may be sent from each of the point of service systems 118 of the partners 104. The server computer system 124 may also receive a request identifier from each of the site devices 129.

At step 236, the server computer system 124 may verify each of the received request identifiers by comparing it with the request identifiers created and stored in the storage component 402 and/or memory 404 of the server computer system 124. The server computer system 124 may generate one or more challenges, and transmit or communicate the one or more challenges to the user devices 110, partner devices 112, distributor devices 114, verifier devices 116, advertisement service provider devices 127, site devices 129, and/or point of service systems 118 upon accepting each of the received request identifiers. In some embodiments, the devices may communicate the one or more challenges as an input to the PUF (e.g., CMOS sensor-based PUF, SRAM-based PUF) to generate responses (output) corresponding to each of the challenges.

In some embodiments, the server computer system 124 may transmit to the user devices 110, partner devices 112, distributor devices 114, verifier devices 116, advertisement service provider devices 127, site devices 129, and/or point of service systems 118 a challenge value, a helper data, and/or an encryption value upon accepting each of the received request identifiers. The server computer system 124 may generate the encryption value by encrypting a value with a key, where value can be used just once. The server computer system 124 may be configured to generate a new value and to encrypt the new value with a key upon accepting each of the received request identifiers. The key may comprise the key or unique device identifier generated during the enrollment of the one or more devices with the server computer system 124. In some embodiments, the server computer system 124 may be configured to generate asymmetric cryptographic key pair (public key and private key). In such a case, the server computer system 124 may generate the encryption value by encrypting the public key with the key or unique device identifier generated during the enrollment of the one or more devices with the server computer system 124. In other embodiments, the server computer system 124 may be configured to generate a symmetric cryptographic key. In such a case, the server computer system 124 may generate the encryption value by encrypting the symmetric cryptographic key with the key or unique device identifier generated during the enrollment of the one or more devices with the server computer system 124.

In embodiments where the encrypted value is a public key, the one or more user devices 110, partner devices 112, distributor devices 114, verifier devices 116, advertisement service provider devices 127, site devices 129, and/or point of service systems 118 can use the recovered one or more keys or unique device identifiers to execute a cryptographic operation to recover the encrypted value (public key).

At step 238, the user devices 110, partner devices 112, distributor devices 114, verifier devices 116, advertisement service provider devices 127, site devices 129, and/or point of service systems 118 may be configured to generate using a generated output of a PUF a key, a secret, or a unique device identifier as a value using one or more algorithms and/or methods (e.g., Fuzzy Extractor, BCH Fuzzy Extractor, Efficient Fuzzy Extractor using BCH, Polar using HA-SCL, and/or Polar using serially concatenated BCH and Polar Codes, error-correcting code (ECC) method), wherein the generated output of a PUF is constant for a fixed input. In some embodiments, where the generated output of a PUF is noisy output or not the same output that can be generated in response to receiving a fixed input twice, the user devices 110, partner devices 112, distributor devices 114, verifier devices 116, advertisement service provider devices 127, site devices 129, and/or point of service systems 118 may be configured to recover a constant value (e.g., key, or a unique device identifier) using a generated noisy output of a PUF, a challenge and a helper data using one or more algorithms and/or methods. The one or more algorithms and/or one or more methods may comprise Fuzzy Extractor, also known as Helper Data algorithm, BCH Fuzzy Extractor, Efficient Fuzzy Extractor using BCH, Polar using HA-SCL, and/or Polar using serially concatenated BCH and Polar Codes, error-correcting code (ECC) method.

In some embodiments, the recovered constant value (e.g., key, or a unique device identifier) may be used to encrypt and decrypt the data or one or more pieces of information, where one or more user devices 110, partner devices 112, distributor devices 114, verifier devices 116, advertisement service provider devices 127, site devices 129, and/or point of service systems 118 may be configured to encrypt the one or more pieces of information by a way that the data or one or more pieces of information can be decrypted by the server computer system 124 using the recovered constant value (e.g., key, or a unique device identifier) after receiving them.

At step 240, the user devices 110, partner devices 112, distributor devices 114, verifier devices 116, advertisement service provider devices 127, site devices 129, and/or point of service systems 118 may use the one or more recovered keys or unique device identifiers to execute a cryptographic operation to recover the encrypted value.

At step 242, the user devices 110, partner devices 112, distributor devices 114, verifier devices 116, advertisement service provider devices 127, site devices 129, and/or point of service systems 118 may encrypt using the recovered decrypted value and one or more algorithms one or more pieces of information before sending them to the server computer system 124. The decrypted value may be used to encrypt using one or more algorithms one or more pieces of information relating to the factors of an authentication method that comprises a device PUF as a factor before transmitting them to the server computer system 124. For example, when a five-factor authentication method that comprises biometric information, user credential information, device PUF, device identification information, and the geographical location data is used, the decrypted value may be used to encrypt using one or more algorithms data or one or more pieces of information relating to the biometric information, user credential information, device identification information, and the geographical location data before transmitting them to the server computer system 124.

In some embodiments, the recovered constant value (e.g., key, or a unique device identifier) may be used to encrypt using one or more algorithms one or more pieces of information relating to the factors of an authentication method that comprises a device PUF as a factor before transmitting them to the server computer system 124. For example, when a five-factor authentication method that comprises biometric information, user credential information, device PUF, device identification information, and the geographical location data is used, the recovered constant value (e.g., key, or a unique device identifier) may be used to encrypt using one or more algorithms data or one or more pieces of information relating to the biometric information, user credential information, device identification information, and the geographical location data before transmitting them to the server computer system 124.

In some embodiments, one or more users 102, partners 104, distributors 106, verifiers 108, and/or advertisement service providers 127 may be authenticated first using their credential information as a one-factor authentication method and then the server computer system 124 may authenticate them using any combination (two factors, three factors, or four factors) of the other four factors (biometric information, device PUF, device identification information, and the geographical location data). In such a case, the decrypted value may be used to encrypt using one or more algorithms data or one or more pieces of information relating to the factors of the authentication method (two factors, three factors, or four factors) before transmitting them to the server computer system 124.

In some embodiments, the decrypted value can be used to encrypt and decrypt the data or one or more pieces of information, where one or more user devices 110, partner devices 112, distributor devices 114, verifier devices 116, advertisement service provider devices 127, site devices 129, and/or point of service systems 118 may be configured to encrypt the one or more pieces of information by a way that the data or one or more pieces of information can be decrypted by the server computer system 124 using the same decrypted value after receiving them.

In embodiments where the decrypted value is a public key, the server computer system 124 may use the private key to decrypt the encrypted data or one or more pieces of information, where the one or more devices may be configured to encrypt the data or one or more pieces of information by a way that the one or more pieces of information can be decrypted by the server computer system 124 using the private key after receiving them. In embodiments where the decrypted value is a symmetric key, the server computer system may be configured to use the decrypted value to decrypt the encrypted data or one or more pieces of information.

At step 244, the user devices 110, partner devices 112, distributor devices 114, verifier devices 116, advertisement service provider devices 127, site devices 129, and/or point of service systems 118 may transmit the encrypted data to the server computer system 124.

At step 246, the server computer system 124 may decrypt the encrypted data. In some embodiments, the result of decrypting by the server computer system 124 the encrypted information received from the one or more user devices 110, partner devices 112, distributor devices 114, verifier devices 116, advertisement service provider devices 127, site devices 129, and/or point of service systems 118 can be used to verify the identity of the one or more devices. In some embodiments, the authentication of the one or more user devices 110, partner devices 112, distributor devices 114, verifier devices 116, advertisement service provider devices 127, site devices 129, and/or point of service systems 118 is successful if the server computer system 124 successfully decrypted the encrypted information received from one or more devices. In embodiments where the device PUF is used as a factor of a two-factor, three-factor, four-factor, and/or five-factor authentication methods, the device PUF is successfully authenticated if the server computer system 124 successfully decrypted the encrypted information. Thus, the server computer system 124 may compare using one or more algorithms the decrypted data related to the other factors to the initial data related to the other factors stored in the storage component 402 and/or memory 404 of the server computer system 124 to determine if the data match or substantially match.

For example, when a five-factor authentication method that comprises biometric or site image, video, or live video information, user credential information, device PUF, device identification information, and the geographical location data is used, the device PUF is successfully authenticated if the server computer system 124 successfully decrypted the encrypted information. Thus, the server computer system 124 may compare using one or more algorithms the decrypted data (or a template generated based on the decrypted data) related to the other four factors (biometric or site image, video, or live video information, user credential information, device identification information, and the geographical location data) to the initial data (or template) related to the other four factors stored in the storage component 402 and/or memory 404 of the server computer system 124 to determine if the data match or substantially match. For example, the server computer system 124 may compare a face template, user credential information, device identification information, and the geographical location data to the face template, user credential information, device identification information, and the geographical location data stored in the storage component 402 and/or memory 404 of the server computer system 124 to determine if they are match or substantially match.

In some embodiments, the authentication using a two-factor, a three-factor, a four-factor, and/or a five-factor authentication method is successful if all factors of each authentication method are successfully authenticated.

At step 248, the server computer system 124 may generate a biometric template (e.g., face template) for each of the users 102, partners 104, distributors 106, verifiers 108, and/or advertisement service providers 126 based on the received biometric information (e.g., face image data). In some embodiments, the server computer system 124 may also generate image, video, and/or live video template (e.g., sites' image, video and/or live video template) for each of sites 128 based on the received images, videos, and/or live video information (e.g., sites' image, video and/or live video data). In some embodiments, the server computer system 124 may generate the biometric template (e.g., face template) by extracting one or more biometric (e.g., face image) features from the received biometric information (e.g., face image data) using one or more algorithms. In some embodiments, the server computer system 124 may generate the image, video, and/or live video template by extracting one or more site images, videos, and/or live videos features from the received images, videos, and/or live video information.

At step 250, the server computer system 124 may integrate using one or more algorithms (e.g., BioHashing algorithms) the received constant value (e.g., key, or a unique device identifier) of the one or more user devices 110, partner devices 112, distributor devices 114, verifier devices 116, advertisement service provider devices 127, site devices 129, and/or point of service systems 118 and the generated template (e.g., face template, site image, video, or live video template) of the one or more sites 128, users 102, partners 104, distributors 106, verifiers 108, and/or advertisement service providers 127 to create a template to be used for comparison.

In some embodiments, the server computer system 124 may integrate using one or more algorithms two or more factors of a two-factor, three-factor, four-factor, and/or five-factor authentication methods, wherein the integration is based on a plurality of combinations of the factors of the two-factor, three-factor, four-factor, and/or five-factor authentication methods. For example, when a five-factor authentication method that comprises biometric or site image, video, or live video information, user credential information, device PUF, device identification information, and the geographical location data is used, the server computer system 124 may integrate using one or more algorithms a constant value (e.g., key, or a unique device identifier), a template (e.g., face template, site image, video, or live video template), user credential information, device identification information, and the geographical location data, wherein the integration is based on a plurality of combinations.

At step 252, the server computer system 124 may retrieve the initial template created and stored in the storage component 402 and/or memory 404 of the server computer system 124 during the registration or enrollment, wherein the request identifier received from each of the devices may be used to retrieve the initial template.

At step 254, the server computer system 124 may compare using one or more algorithms the template created during the authentication to the initial template created and stored in the storage component 402 and/or memory 404 of the server computer system 124 during the registration or enrollment to determine if the templates match or substantially match. In some embodiments, the authentication may be successful if data variations (e.g., hamming distance) between the template created during the authentication and the initial template created and stored during the registration are within a pre-defined threshold.

In embodiments where the integration (the integration using one or more algorithms) of two or more factors of a two-factor, three-factor, four-factor, and/or five-factor authentication methods may not be performed, the server computer system 124 may compare using one or more algorithms the template of each factor created during the authentication to the initial template of each factor created and stored in the storage component 402 and/or memory 404 of the server computer system 124 during the registration or enrollment to determine if the templates match or substantially match. For example, when a five-factor authentication method that comprises biometric or site image, video, or live video information, user credential information, device PUF, device identification information, and the geographical location data is used, the server computer system 124 may compare using one or more algorithms the received data (or a template generated based on the received data) related to each of the five factors to the initial data (or template) related to the each of the five factors stored in the storage component 402 and/or memory 404 of the server computer system 124 to determine if the data match or substantially match. For example, the server computer system 124 may compare a face template, user credential information, a constant value (e.g., key) of a PUF, device identification information, and the geographical location data to the face template, user credential information, a constant value (e.g., key) of a PUF, device identification information, and the geographical location data stored in the storage component 402 and/or memory 404 of the server computer system 124 to determine if they are match or substantially match. In embodiments where the server computer system 124 may store a one-way function (e.g., a cryptographic hash function or the like) of the constant value (e.g., key) or unique device identifier, the server computer system 124 may authenticate one or more devices by checking if a function of the received one or more keys or unique device identifiers is equal to the function of the stored one or more keys or unique device identifiers (e.g., f(received key)=f(stored key)).

In some embodiments, the authentication may be successful if the templates match or substantially match. In some embodiments, the authentication may be successful if data variations between the template created during the authentication and the initial template created and stored during the registration are within a pre-defined threshold. In some embodiments, the authentication of each of the site devices 129 and/or each of the point of service systems 118 may not be successful if the data variations of the verified geographical location of each of the site devices 129 and/or each of the point of service systems 118 between the templates created during the authentication and the initial templates created and stored during the registration are within a pre-defined threshold.

In some embodiments, the server computer system 124 may verify the geographical location data of one or more user devices 110, partner devices 112, distributor devices 114, verifier devices 116, advertisement service provider devices 127, point of service systems 118 and site devices 129 by comparing using one or more algorithms the received real time geographical location data of the one or more user devices 110, partner devices 112, distributor devices 114, verifier devices 116, advertisement service provider devices 127, point of service systems 118 and site devices 129 acquired by their associated GPS/AGPS to the geographical location data obtained from the wireless or mobile carriers, or wireless service providers, and/or the geographical location determined by the the server computer system 124 to determine if their current geographical location data acquired by their associated GPS/AGPS sensors matches or substantially matches the geographical location data obtained from the wireless or mobile carriers, or wireless service providers, and/or the geographical location data determined the server computer system 124, wherein the devices may be configured to communicate with the wireless or mobile carriers, or wireless service providers and communicate with each other via short range wireless network that may be one of a Bluetooth wireless, Bluetooth low energy and/or near-field communication network, wherein the devices are located within the network coverage area of one or more registered devices with synchronized time. In some embodiments, the geographical location data of a registered device may be successfully verified if the geographical location data determined by the server computer system 124, and/or the geographical location data obtained from the wireless or mobile carriers, or wireless service providers match or substantially match the real time geographical location data of the registered device acquired by its associated GPS/AGPS sensors or if the distance between the three geographical locations within a pre-defined threshold. In some embodiments, the pre-defined threshold may be adjusted by the server computer system 124 to limit the access of the one or more users 102, partners 104, distributors 106, verifiers 108, sites 128, advertisement service providers 126, and/or their associated devices to the server computer system 124 to a specific geographical location, specific area, a specific city, and/or specific country.

In some embodiments, the server computer system 124 may verify the real time geographical location data acquired by the GPS/AGPS sensors of one or more user devices 110, partner devices 112, distributor devices 114, verifier devices 116, advertisement service provider devices 127, point of service systems 118 and site devices 129 prior to enrolling or registering them or prior to authenticating them with the server computer system 124. In some embodiments, the authentication and enrollment of the one or more devices may not be successful if the real time geographical location data acquired by their GPS/AGPS sensors are not successfully verified.

In some embodiments, the server computer system 124 may determine using one or more algorithms the geographical location of one or more registered devices requesting a geographical location (e.g., user devices 110, partner devices 112, distributor devices 114, verifier devices 116, advertisement service provider devices 127, point of service systems 118 and site devices 129) by determining the distance between the one or more devices requesting a geographical location and one or more static and/or dynamic registered devices (e.g., user devices 110, partner devices 112, distributor devices 114, verifier devices 116, advertisement service provider devices 127, point of service systems 118 and site devices 129) with synchronized time by determining the time each of the devices with synchronized time takes to receive a request from the one or more registered devices requesting a geographical location, wherein the geographical location data of the one or more registered devices requesting a geographical location may be stored in the storage component 402 and/or memory 404 of the server computer system 124, wherein the one or more registered devices requesting a geographical location are located within the network coverage area of one or more registered devices with synchronized time, wherein the one or more registered devices with synchronized time and the one or more registered devices requesting a geographical location may be configured to communicate via short range wireless network that may be one of a Bluetooth wireless, Bluetooth low energy and/or near-field communication network, wherein the one or more registered devices with synchronized time and the one or more registered devices requesting a geographical location may be configured to communicate with the wireless or mobile carriers or wireless service providers and the server computer system 124, and wherein the geographical location data may be obtained periodically, intermittently, or continuously and stored in the storage component 402 and/or memory 404 of the server computer system 124.

In some embodiments, the server computer system 124 may be configured to provide verification service where service and/or a process of one or more partners 104 or one or more unregistered entities may be enabled by the server computer system 124 to request to authenticate and verify the identity of one or more users 102, partners 104, distributors 106, verifiers 108, and/or advertisement service providers 126. In some embodiments, the server computer system 124 may enable service and/or a process of one or more partners 104 or one or more unregistered entities to request to authenticate one or more users 102, partners 104, distributors 106, verifiers 108, and/or advertisement service providers 126. In such case, the server computer system 124 may receive a request to authenticate one or more users 102, partners 104, distributors 106, verifiers 108, and/or advertisement service providers 126 from one or more partners 104 and/or one ore unregistered entities; the server computer system 124 may authenticate the one or more users 102, partners 104, distributors 106, verifiers 108, and/or advertisement service providers 126 and provide the service and/or the process with the status or result of the authentication and may notify the one or more partners 104 and/or one ore unregistered entities. In some embodiments, the server computer system 124 may bind credentials (One Time Password token, public key, private key, password, RSA signature, and the like.) with the successful authentication of the one or more users 102, partners 104, distributors 106, verifiers 108, and/or advertisement service providers 126, wherein the server computer system 124 may release the credentials to a service or a process of the one or more partners 104 or the one ore unregistered entities after the successful authentication of the one or more users 102, partners 104, distributors 106, verifiers 108, and/or advertisement service providers 126. In some embodiments, the server computer system 124 may enable the one or more partners 104 and/or one ore unregistered entities to determine authentication options such as location-based verification, device physical unclonable function based verification, user credential based verification, device identification information based verification, and/or biometric information based verification of the one or more users 102, partners 104, distributors 106, verifiers 108, and/or advertisement service providers 126. In such a case, the server computer system 124 may authenticate the users 102, partners 104, distributors 106, verifiers 108, and/or advertisement service providers 126 according to the options selected by the one or more partners 104 and/or one or more unregistered entities.

In some embodiments, the server computer system 124 may enable the one or more users 102, partners 104, distributors 106, verifiers 108, and/or advertisement service providers 126 to request to change or use one or more of their associated devices, wherein the server computer system 124 may enable the one or more users 102, partners 104, distributors 106, verifiers 108, and/or advertisement service providers 126 after authenticating them to submit a request from their associated verified devices registered with the server computer system 124 to change or use one or more devices, wherein the server computer system 124 may exclude authenticating the new one or more devices during the enrollment or registration of the new devices with server computer system 124. In embodiments where the verified devices of the one or more users 102, partners 104, distributors 106, verifiers 108, and/or advertisement service providers 126 are lost, damaged, or not available to be used to submit the request, the server computer system 124 may deactivate or block the lost, damaged, or unavailable devices and enable one or more partners 104 to submit the request on their behave from partners' devices 112, and/or partners' point of service systems 118, wherein the server computer system 124 may authenticate the one or more users 102, partners 104, distributors 106, verifiers 108, and/or advertisement service providers 126 and exclude authenticating their associated devices before allowing the one or more partners 104 to submit a request to the server computer system 124, wherein the authentication may be done according to one-factor, two-factor, three-factor, or four-factor authentication methods After the server computer system 124 accepts the request, the server computer system 124 may enable the users 102, partners 104, distributors 106, verifiers 108, and/or advertisement service providers 126 to register the new one or more devices to be used to communicate with the server computer system 124, wherein the server computer system 124 may exclude authenticating the new one or more devices during the enrollment or registration of the new devices with server computer system 124.

In some embodiments where "user credential information" is used as a factor in an authentication method, the one or more site devices 128 and point of service systems 118 may transmit data to the server computer system 124. In such case, the server computer system 124 may generate and transmit one-time credential information (e.g., user name, password, personal identification number (PIN), key, and the like) to the one or more partners 104 for enabling the one or more point of service systems 118 to access the server computer system 124 after the server computer system receives a request from the one or more partners 104 to enable the one or more point of service systems 118 to access the server computer system 124, wherein the credential information may be sent to the one or more partner devices 112, and wherein the credential information can be used just once. The server computer system 124 may also generate and transmit one-time credential information (e.g., user name, password, personal identification number (PIN), key, and the like) to the one or more verifiers 108 for enabling the one or more site device 129 to access the server computer system 124 during the registration, installation and/or maintenance of the one or more site device 129, or based on a request from the one or more verifiers 108, wherein the credential information may be sent to the one or more verifier devices 116, and wherein the credential information can be used just once.

In some embodiments, the server computer system 124 may enable one or more partners 104, distributors 106, verifiers 108, and/or advertisement service providers 126 to create one or more employee accounts with limited privileges and administrator accounts with the same privileges of the main administrator account (the first account created during the registration of the distributors 106, verifiers 108, and advertisement service providers 126 with the server computer system 124). The server computer system 124 may enable the partners 104, distributors 106, verifiers 108, and/or advertisement service providers 126 to submit a request to deactivate one or more employee accounts and administrator accounts, wherein one or more administrator accounts (e.g., administrator account holders) may be required to agree on a request to deactivate the one or more employee accounts and/or administrator accounts, wherein the server computer system 124 may authenticate one or more administrator account holders prior to deactivating the one or more employee accounts and/or administrator accounts.

Each of the distributors 106, partners 104, users 102, verifiers 108, sites 128, and/or advertisement service providers 126 are then assigned a unique user identifier. The unique user identifier may be, e.g., a number, symbols, alphabets, or any combination of letters and numbers assigned by the server computer system 124. The unique user identifier of the distributors 106, partners 104, users 102, verifiers 108, and/or advertisement service providers may be selected by the distributors 106, partners 104, users 102, verifiers 108, and/or advertisement service providers 126 or the advertisement service providers' 126, distributors' 106, partners' 104, users' 102, and/or verifiers' 108 telephone number. In some instances, a combination of non-unique data may serve as a unique user identifier. The term "unique user identifier" may also refer herein to "account identifier".

In some embodiments, the server computer system 124 may be external to a system and/or a point of service system of an unregistered entity (e.g., product maker, middle agency, university, company, organization, governmental entity, consumer reporting agency, environmental product declaration program operator) and may communicate with the system or the point of service system of the unregistered entity using suitable communication networks and methods for communication between physically separated computing systems. As such the system or the point of service system of the unregistered entity may be enabled by the server computer system 124 to exchange information relating to account identifiers and/or other information associated with one or more users 102, partners 104, distributors 106, verifiers 108, and/or advertisement service providers 126 with the server computer system 124.

In some implementations, the server computer system 124 may enable one or more users 102, partners 104, distributors 106, verifiers 108, and/or advertisement service providers 126 to be verified through one or more external identity management systems and/or systems that utilize cryptographic techniques including but not limited to zero-knowledge proof or zero-knowledge protocol (e.g., uPort, and the like) and/or by reference to a database during or after the registration with the server computer system 124. For example, one or more users 102 may register with the server computer system 124 and choose what personal information they want to provide to the server computer system 124 and may choose to get their identity verified through one or more external identity management systems and/or systems that utilize cryptographic techniques including but not limited to zero-knowledge proof or zero-knowledge protocol (e.g., uPort, and the like).

In some embodiments, the server computer system 124 may create records for the sites 128, distributors 106, partners 104, users 102, verifiers 108, and/or advertisement service providers 126 and their associated devices, the records may be associated with their respective identification information (e.g., biometric information, site images, videos and or live videos information, credential information, geographical location data, device PUFs, device identification information, account identifiers, blockchain identifiers, public keys). The records may be stored in the storage component 402 and/or memory 404 of the server computer system 124, and one or more records may be listed under their respective account profiles.

In embodiments where a blockchain may be utilized, the server computer system 124, may enable one or more users 102, partners 104, distributors 106, verifiers 108, and/or advertisement service providers 126 to be verified through one or more external identity management systems and/or systems that utilize cryptographic techniques including but not limited to zero-knowledge proof or zero-knowledge protocol (e.g., uPort, and the like) and/or by reference to a database. For example, a smart contract library may confirm the identity of users 102, partners 104, distributors 106, verifiers 108, and/or advertisement service providers 126 through one or more external identity management systems and/or systems that utilize cryptographic techniques including but not limited to zero-knowledge proof or zero-knowledge protocol (e.g., uPort, and the like) and/or by reference to a database. As used herein the term "Smart Contract Library" may refer to a script, where the script may verify the identity of users 102, partners 104, distributors 106, verifiers 108, and/or advertisement service providers 126 on the blockchain through one or more external identity management systems and/or systems that utilize cryptographic techniques including but not limited to zero-knowledge proof or zero-knowledge protocol (e.g., uPort, and the like) and/or by reference to a database.

In another embodiment where a blockchain may be utilized, once a user 102, a partner, 104 a distributor 106, a verifier 108, and/or an advertisement service provider 126 input the required information during the registration and completed the verification process, they become registered on the distributed ledger and may be associated with a smart contract library. In another embodiment where a blockchain may be utilized, once the registration request submitted by one or more verifiers 108 for registering one or more sites 128 was accepted by the server computer system 124, the one or more sites 128 and their associated site devices 129 become registered on the distributed ledger and may be associated with a smart contract library.

In other embodiments where a blockchain may be utilized, a blockchain identifier, a user identifier, and/or a key may be assigned to each of the sites 128, users 102, partners 104, distributors 106, verifiers 108, and/or advertisement service providers 126 after they join the network to access the distributed ledger. The distributed ledger may be stored on a plurality of site devices 129, point of service systems 118, computing nodes 122, user devices 110, partner devices 112, distributor devices 114, verifier devices 116, advertisement service provider devices 127, and/or other processor-based devices. In some embodiments, the nodes of the distributed ledger may comprise systems associated with partners 104, distributors 106, verifiers 108, users 102, and/or advertisement service providers 126. In some embodiments, the distributed ledger may comprise one or more shared ledgers, a distributed database, a hash chain database (cryptographic hash chain database), a blockchain database, and a blockchain-based database. In some embodiments, the distributed ledger may comprise a hash chain (cryptographic hash chain) in which the transactions that occur in the network and associated with the sites 128, users 102, partners 104, distributors 106, verifiers 108, and/or advertisement service providers 126 and other data or information are collected into blocks and each block contains a hash (cryptographic hash) of the previous block in the chain, where a blockchain may record any type of data as a form of transaction that occurs in the network (e.g., transfer of information or exchange). The transactions that occur in the network and associated with the sites 128, users 102, partners 104, distributors 106, verifiers 108, and/or advertisement service providers 126 and other information may be broadcasted to and verified collectively by the nodes of the distributed ledger. In some embodiments, the distributed ledger may comprise digital records of information including but not limited to environmental activities information, environmental law violations information, biometric information, site images, videos and or live videos information, credential information, geographical location data, device PUFs, device identification information, account identifiers, blockchain identifiers, public keys, and/or other identification data) of a plurality of sites 128, users 102, partners 104, distributors 106, verifiers 108, and/or advertisement service providers 126 and their associated devices.

At step 256, the server computer system 124 may receive or collect information on environmental activities (e.g., products and/or services) carried out (e.g., purchased, used, or completed) by a user 102 before becoming a registered user. The information may be collected from the user by communicating with the user's device 110 that allows or enables the user to communicate with the server computer system 124 and to provide the server computer system 124 with the required information. The data may be collected from the user by the server computer system 124 during or after registering the user with the server computer system 124. The information collected from the user may include, but not limited to personal information (e.g., name, address, passport number, taxpayer identification number, telephone number, e-mail address, password, username, and/or the like), information on the environmental activities of the user including but not limited to information on a partner of the registered partners 104 (e.g., partner's name and/or partner's account identifier) and information on user's home energy, transportation, waste, food, and shopping. In some embodiments, the server computer system 124 may verify the information provided by or collected from the user with a registered partner of the partners 104 and/or an unregistered entity. In some embodiments, the verification of information provided by or collected from a user of the users 102 may be done by communicating with one or more point of service systems 118 of a registered partner of the partners 104, one or more devices 400 of a registered partner, and/or one or more devices 400 of an unregistered entity, where the respective account identifiers of one or more users 102, partners 104, distributor 106, and/or other identification data (e.g., biometric information, credential information, geographical location data, device PUF s, device identification information, account identifiers, public keys, unique user identifier, blockchain identifier, name, address, and/or other identification data) provided by or collected from the user may be used in communications exchanged therewith for the verification process. In some embodiments, the server computer system may receive information on environmental activities (e.g., products and/or services) carried out (e.g., purchased, used, or completed) by one or more users 102 before becoming registered users by communicating with one or more point of service systems 118 of a registered partner of the partners 104, one or more devices 400 of a registered partner, and/or one or more devices 400 of an unregistered entity to collect information on environmental activities (e.g., products and/or services) carried out (e.g., purchased, used, or completed) by one or more users 102 before becoming registered users, wherein the respective account identifiers of the one or more users 102, partners 104, distributor 106, and/or other identification data (e.g., biometric information, credential information, geographical location data, device PUF s, device identification information, account identifiers, public keys, unique user identifier, blockchain identifier, name, address, and/or other identification data) received from the user may be used in communications exchanged therewith for the verification process, wherein the received information may be stored in the database of the server computer system.

The server computer system 124 may further calculate using one or more algorithms an estimated environmental impact for user's environmental activities based on the data collected from the user 102. In some embodiments, the server computer system 124 may allow or enable one or more verifiers 108 to determine the estimated environmental impact of each environmental activity of user's environmental activities (e.g., products and/or services) carried out (e.g., purchased, used, or completed) by the user before becoming a registered user if the environmental activity is not associated with a verified environmental product declaration that is previously verified by a verifier of the verifiers 108. In some embodiments, the server computer system 124 may determine the environmental impact of each activity of the user's environmental activities (e.g., products and/or services) carried out (e.g., purchased, used, or completed) by the user before becoming a registered user based on a verified environmental product declaration of the same environmental activity if the environmental product declaration is previously verified by a verifier of the verifiers 108 and associated with a partner of the partners 104.

In some embodiments, the server computer system 124 may assign points, currency, cryptocurrency, and/or credits to the users 102, partners 104, distributors 106, verifiers 108, and/or advertisement service providers 126 and may enable one or more users 102, partners 104, distributors 106, verifiers 108, and/or advertisement service providers 126 to transfer the ownership records for points, currency, cryptocurrency (cryptographic currency) and/or credits associated with their accounts to each other. In some embodiments, the server computer system 124 may create points, currency, cryptocurrency (cryptographic currency), and/or credits records and/or ownership records associated with the accounts and with the identification data (e.g., biometric information, credential information, geographical location data, device PUF s, device identification information, account identifiers, public keys, unique user identifier, blockchain identifier, name, address, and/or other identification data) of a plurality of users 102, partners 104, distributors 106, verifiers 108, and/or advertisement service providers 126. In some embodiments, the server computer system 124 may allow or enable the users 102 to deposit, and/or exchange the points, currency, cryptocurrency (cryptographic currency), and/or credits (e.g., exchange the points to any form of currency such as fiat currency, electronic currency, and/or cryptocurrency). In some embodiments, the server computer system 124 may communicate with third-party systems (e.g., currency, cryptocurrency exchange platforms, or systems) to deposit, transfer, and/or exchange the points, currency, cryptocurrency, and/or credits.

In embodiments where a blockchain may be utilized, the ownership records for points, currency, cryptocurrency, and/or credits, are transferred with a process similar to the transfer of currency in a block-chain based cryptocurrency (cryptographic currency) system. In some embodiments where a blockchain may be utilized, the distributed ledger may comprise a side chain of a cryptocurrency (cryptographic currency) blockchain or a standalone ledger.

In some embodiments, the server computer system 124 may allow or enable one or more verifiers 108 to determine a service unit (usage unit) for each service offered by a partner of the partners 104 based on its category and/or based on the information mentioned in the environmental product declaration of the service. For example, the transportation companies as partners 104 of the server computer system 124 may offer the use of electric vehicles (e.g., where the vehicles may use renewable electricity at charging stations) to users 102 as transportation service; a point of service system 118 of the transportation companies may collect data (e.g., information about the distance and identification information of a user of the users 102) and transmit the data to the server computer system 124; the server computer system 124 may allow or enable one or more verifiers 108 to determine a service unit (usage unit) for the transportation service (e.g., one hour of using the service, and/or per mile); the server computer system 124 may credit service units (usage units) of any service associated with a verified environmental product declaration and offered by a partner of the partners 104 under user's 102 account when it's carried out (e.g., completed) by the users 102. In some embodiments, the server computer system 124 may compare using one or more algorithms the usage behavior of users 102 based on the service units credited under the accounts of users 102 and award or punish the users 102 based on the number of service units credited under their accounts. For example, the server computer system 124 may add or deduct cryptocurrency, currency, and/or points from the users' 102 accounts based on the usage behavior of users 102.

The server computer system 124 may use the service units (usage units) to calculate an environmental credit score for the users 102. The server computer system 124 may use the service units (usage units) to determine the number (e.g., the maximum or the minimum number of units) of service units, points, cryptocurrencies, any other rewards that may be credited under the users' accounts.

In some embodiments, the server computer system 124 may suggest or recommend one or more environmental activities (e.g., products and/or services) to the registered users 102 based on factors including but not limited to the environmental impact of users' environmental activities (e.g., products and/or services) carried out (e.g., purchased, used, or completed) before or after being registered users. The recommended or suggested environmental activities (e.g., products and/or services) may be aimed to reduce the environmental impact of the users' environmental activities. The server computer system 124 may assign or credit users' accounts with points and/or credits after carrying out (e.g., purchasing, using, or completing) recommended or suggested environmental activities (e.g., products and/or services). The server computer system 124 may use the points credited under users' 102 accounts and other factors to calculate the users' environmental credit scores. The server computer system 124 may determine the number of points that should be assigned for each environmental activity carried out by a user of the users 102 based on the score of the environmental product declaration of the environmental activity (e.g., products and/or services).

In some embodiments, the server computer system 124 may determine using one or more algorithms, machine learning, and/or a trained neural network by means of deep learning users' habits and/or behavior (e.g., environmentally friendly habits) and recommend or suggest environmental activities (e.g., products and/or services) to the users 102. The server computer system 124 may determine using one or more algorithms, machine learning, and/or a trained neural network by means of deep learning users' habits and/or behavior using the relationship between users' decisions to carry out environmental activities and the users' interaction with the server computer system 124 (e.g., type of environmental activities they carry out, time of carrying out environmental activities, geographical locations of environmental activities, and the cost of carrying out the environmental activities), information about users' activities collected from external sources (e.g., data management platforms), and other factors.

By way of non-limiting example, the server computer system 124 may suggest or recommend to a user of the users 102 the use of renewable electricity, the use of specific electric vehicles, the use of any other environmentally friendly products and/or services offered by a registered partner 104 or an unregistered entity. In some embodiments, the server computer system 124 may calculate of users' 102 environmental credit scores based on the environmental impact of users' environmental activities before becoming registered users 102, the environmental activities suggested or recommended by the server computer system 124 and carried out (e.g., participated in, purchased, used, or completed) by the users 102 after becoming registered users. The server computer system 124 may store the information on environmental activities completed by a user of the users 102 before becoming a registered user and the information collected from the user during or after the registration process in the users' records in the storage component 402 and/or memory 404 of the server computer system 124 and may list the information under the respective account profiles of users 102, partners 104 and/or distributors 106.

In some embodiments, the server computer system 124 may award the one or more users 102 points, currency, cryptocurrency, and/or credits based on the environmental impact of users' environmental activities before being registered users 102, the environmental activities suggested or recommended by the server computer system 124 and carried out (e.g., participated, purchased, used, or completed) by the users 102 after being registered users, where the points, currency, cryptocurrency, and/or credits may be spent by the users 102 and can be exchanged and/or used by the users 102. In some embodiments, the calculated points and/or credits of the users 120 may be used as a currency (e.g., cryptocurrency) and/or may be exchanged for any form of currency (e.g., fiat currency, electronic currency, and/or cryptocurrency).

In some embodiments, the server computer system 124 may enable the users 102 to use the awarded points or credits of the one or more users 102 to purchase one or more products and/or services offered by a partner of the partners 104, and/or an unregistered entity. In some embodiments, the calculated points or credits of the users 102 and its associated transactions may be stored in the database of the server computer system 124 and may be listed under the respective account profiles of the users 102 and/or partners 104. In some embodiments, the calculated points or credits of the users 102 may be stored in a remote database and/or a distributed database.

In embodiments where a blockchain may be utilized, the distributed ledger may comprise a hash chain (cryptographic hash chain) in which environmental activities information, calculated points and/or credits of the users 102 and its associated transactions, and/or other information are collected into blocks and each block contains a hash (cryptographic hash) of the previous block in the chain. In embodiments where a blockchain may be utilized, environmental activities information, calculated points and/or credits of the users 102 and its associated transactions, and/or other information may be broadcasted to and verified collectively by the nodes of the distributed ledger.

In some embodiments, the server computer system 124 may allow or enable the users 102 to use the calculated points and/or credits associated with users' accounts to get or purchase one or more products and/or services offered by the partners 104 and/or an unregistered entity. For example, the users 102 may be authenticated through the point of service systems 118, partner devices 112, and/or systems associated with the partners 104. The point of service systems 118, partner devices 112, and/or system associated with the partners 104 may authenticate and verify the users 102, and/or check the number of points, credits, amount of currency, cryptocurrency, points, and/or credits associated to the users 102 by communicating with the server computer system 124. In some embodiments, the unique user identifiers, public key, account identifiers, or blockchain identifiers of the users 102 may be in the form of identifying card, a barcode, RFID, QR code or electronic tag, and/or any other techniques or device that may be read by the point of service systems to (a) complete the transaction related to an environmental activity carried out (e.g., purchased, used, or completed) by the users 102, (b) register the users 102 with the server computer system 124, and (c) purchase a product or a service offered by the partners 104.

In some embodiments, the server computer system 124 may store the calculated points, currency, cryptocurrency, or credits of the users 102 and its associated transactions in the storage component 402 and/or memory 404 of the server computer system 124 and list the information on the points, currency, cryptocurrency, or credits and it's associated transactions under the respective account profiles of the users 102 and/or partners 104. In some embodiments, the server computer system 124 may store the calculated points or credits of the users in a remote database and/or a distributed database.

In embodiments where a blockchain may be utilized, the server computer system 124 may transfer the ownership records for points, currency, cryptocurrency, and/or credits, with a process similar to the transfer of currency in a block-chain based cryptocurrency system. For example, the server computer system 124 may transfer the ownership records of the points, currency, cryptocurrency, and/or credits from users' 102 accounts to partners' 104 accounts as proof of purchase when the users 102 purchase products and/or services offered by the partners 104. In some embodiments where a blockchain may be utilized, the distributed ledger may comprise a side chain of a cryptocurrency blockchain or a standalone ledger.

At step 258, a registered partner 104 and/or a registered distributor 106 may transmit data to the server computer system 124. The transmission of data by a registered partner to the server computer system 124 may be done by communicating with the server computer system 124 through one or more partner devices 112 and/or one or more point of service systems 118 of a partner, where the respective account identifiers of one or more users 102, partners 104, distributors 106, and/or other identification (e.g., biometric information, credential information, geographical location data, device PUFs, device identification information, account identifiers, public keys, unique user identifier, blockchain identifier, name, address, and/or other identification data) may be used in communications exchanged therewith for identification and/or verification of the partner. The transmission of data by a registered distributor 106 to the server computer system 124 may be done by communicating with the server computer system 124 through one or more devices of distributor devices 114, where the respective account identifiers of one or more partners 104, distributors 106, and/or other identification data (e.g., biometric information, credential information, geographical location data, device PUF s, device identification information, account identifiers, public keys, unique user identifier, blockchain identifier, name, address, and/or other identification data) may be used in communications exchanged therewith for identification and/or verification of the distributor.

In some embodiments, the data transmitted by one or more registered partners 104 to the server computer system 124 may include data relating to one or more environmental law violations of one or more users 102, partners 104 and/or distributors 106, and other information and activities reported by the partners 104. In some embodiments, the data transmitted by one or more registered partners 104 to the server computer system 124 may include data relating to one or more environmental activities (e.g., products and/or services) offered by the one or more registered partners 104 to one or more users 102. In some embodiments, the data transmitted by one or more registered distributors 106 to the server computer system 124 may include data relating to environmental activities (e.g., products and/or services) distributed to one or more partners 104 by the one or more distributors, and environmental activities (e.g., products and/or services) used by the one or more distributors 106 to distribute environmental activities (e.g., products and/or services) to the one or more partners 104.

In some embodiments, the server computer system 124 may provide the one or more registered partners 104 and/or the one or more registered distributors 106 with an option such as through a website and/or a mobile application hosted by or associated with the server computer system 124 to choose from multiple categories of one or more environmental activities (e.g., products and/or services) and to list and fill in online information on the environmental activities they offer, distribute and/or use and/or the environmental law violations reported by partners 104.

In some embodiments, one or more registered partners 104 may transmit data to the server computer system 124, the data relating to environmental activities (e.g., products and/or services) offered to the users 102 by the partners 104. The data for each environmental activity transmitted by each of the partners 104 may include, but not limited to partners' identification data (e.g., biometric information, credential information, geographical location data, device PUF s, device identification information, account identifiers, public keys, unique user identifier, blockchain identifier, name, address, and/or other identification data) and information on the environmental activity transmitted including but not limited to, the geographic location where the environmental activity was transmitted, information on the environmental activities (e.g., products and/or services) that partners 104 want to offer to the users 102, and/or an environmental product declaration.

In some embodiments, one or more registered partners 104 may transmit data to the server computer system 124, the data relating to local and/or international environmental law violations reported by the partners 104 including information about one or more users 102, partners 104, and/or distributors 106. The data for each environmental law violation transmitted by each of the partners 104 may include, but not limited to users', partners', distributors', and/or verifiers' identification data (e.g., biometric information, credential information, geographical location data, device PUF s, device identification information, account identifiers, public keys, unique user identifier, blockchain identifier, name, address, and/or other identification data) and information on the environmental law violation transmitted including but not limited to, the geographical location where the environmental law violation was transmitted, taxpayer identification number, name (e.g., the names of users 102, partners 104, distributors 106, and/or verifiers 108 who violated the law), and/or address.

In some embodiments, the data for each environmental activity transmitted by each of the partners 104 may include but not limited to information indicating one or more user names 102, one or more user addresses, other information (e.g., passport numbers, taxpayer-identification numbers, telephone numbers, e-mail addresses, passwords, usernames, public key, blockchain identifiers, user's biometric data information). The data for each environmental activity transmitted by each of the partners 104 may also include but not limited to information indicating one or more partner names, one or more partner addresses, one or more partner types (e.g., product maker, middle agency, university, company, organization, governmental entity, consumer reporting agency, environmental product declaration program operator), identification information (e.g., biometric information, credential information, geographical location data, device PUF s, device identification information, account identifiers, public keys, unique user identifier, blockchain identifier, name, address, and/or other identification data), and/or other information (e.g., taxpayer identification number, telephone number, e-mail address,). The data for each environmental activity transmitted by each of the partners 104 may also include but not limited to information indicating one or more distributor names, one or more distributor addresses, one or more distributor types (e.g., product maker, middle agency, university, company, organization, governmental entity, consumer reporting agency, environmental product declaration program operator), identification information (e.g., biometric information, credential information, geographical location data, device PUF s, device identification information, account identifiers, public keys, unique user identifier, blockchain identifier, name, address, and/or other identification data) and/or other information (e.g., taxpayer identification number, telephone number, e-mail address).

In some embodiments, the environmental product declaration of a product or a service offered by a partner of the partners 104 may be in a machine-readable format. In some embodiments, each of the partners 104 may provide the server computer system 124 with a registration number of an environmental product declaration, and/or information on an environmental product declaration program operator and/or other information. In some embodiments, the environmental product declaration, may be a type III environmental product declaration based on ISO 14025 and (a) issued by a specific program operator or (b) issued by a specific program operator in a specific geographical area such as a specific state, country, continent, or region, or (c) based on a harmonized product category rules including not limited to the European pilot for Product and Organization Environmental Footprint Category Rules (PEFCR, OEFCR).

In embodiments where a blockchain may be utilized, the distributed ledger may comprise a hash chain in which users', partners', and distributors' environmental activities information and its associated transactions, and/or other information are collected into blocks and each block contains a hash of the previous block in the chain. In embodiments where a blockchain may be utilized, environmental activities information and its associated transactions, and/or other information may be broadcasted to and verified collectively by the nodes of the distributed ledger.

At step 260, the server computer system 124 may receive data from one or more registered distributors 106 and/or registered partners 104. The data received from the one or more registered partners 104 may include data relating to one or more environmental law violations of one or more users 102, partners 104 and/or distributors 106, and other information and activities reported by the partners 104.

In some embodiments, the data received from one or more registered partners 104 may include data relating to one or more environmental activities (e.g., products and/or services) offered by the one or more registered partners 104 to one or more users 102. the received data comprising data relating to the environmental activities (e.g., products and/or services) offered to the users 102 by the partners 104. The data for each environmental activity received from each of the partners 104 may include, but not limited to partners' identification data (e.g., biometric information, credential information, geographical location data, device PUFs, device identification information, account identifiers, public keys, unique user identifier, blockchain identifier, name, address, and/or other identification data) and information on the environmental activity transmitted including but not limited to, the geographic location where the environmental activity was transmitted, information on the environmental activities (e.g., products and/or services) that partners 104 want to offer to the users 102, and/or an environmental product declaration. The server computer system 124 may assign each environmental activity with an identification number (e.g., a number, symbols, alphabets, or any combination of letters and numbers assigned by the server computer system 124) and stores the data in the storage component 402 and/or memory 404 of the server computer system 124.

In some embodiments, the data received from one or more registered distributors 106 may include data relating to environmental activities (e.g., products and/or services) distributed to one or more partners 104 by the one or more distributors, and environmental activities (e.g., products and/or services) used by the one or more distributors 106 to distribute environmental activities (e.g., products and/or services) to the one or more partners 104.

The server computer system 124 may list the data in the registered distributors' and/or registered partners' records based on the category of each environmental activity. The records of the distributors 106 and partners 104 may be listed under the respective account profiles of partners 104 and distributors 106. In some embodiments, the records may be stored in a remote database and/or a distributed database.

In some embodiments, the server computer system 124 may enable the partners 104 who want to offer, resell, and/or distribute to the users 102 one or more environmental activities (e.g., products and/or services) owned or produced by other partners 104 (original owners/producers of the environmental activities) to use an option such as through a website and/or a mobile application hosted by or associated with the server computer system 124 to search partners' (original owners/producers of the environmental activities) environmental activities using identification data (e.g., identification number of the partners' environmental activities, environmental product declaration registration numbers, or identification numbers, partners' unique user identifiers, partners' public keys, and/or other identification data) related to the environmental activities and partners 104 (original owners/producers of the environmental activities). The server computer system 124 may match the identification data related to the environmental activities (e.g., products and/or services) with the identification data stored in the database of the server computer system 124 to identify the environmental activities and to display the environmental activities to partners 104 who want to offer, resell, and/or distribute to the users 102 one or more environmental activities (e.g., products and/or services). The server computer system 124 may also enable the partners 124 to certify and/or request that they want to offer, resell, and/or distribute the same environmental activities (e.g., products and/or services) to the users 102. The server computer system 124 may also allow or enable the partners 104 (original owners/producers of the environmental activities) to approve or reject the request of allowing or enabling the partners 104 to offer, resell, and/or distribute the environmental activities to the users 102. The server computer system 124 may list the environmental activities under the environmental activity records of the partners 104 who requested to offer, resell, and/or distribute the environmental activities to the users 102.

In some embodiments, the server computer system 124 may enable the partners 104 who want to offer, resell and/or distribute to the users 102 one or more environmental activities (e.g., products and/or services) belong to other partners 104 (original owners/producers of the environmental activities) to choose from multiple categories of one or more environmental activities (e.g., products and/or services) listed under the environmental activities' records of the partners 104 (original owners/producers of the environmental activities) and certify and/or request that they want to offer or distribute the same environmental activities (e.g., products and/or services) to the users 102.

In some embodiments, the server computer system 124 may enable the partners 104 (original owners/producers of environmental activities) to provide the server computer system 124 with information about an approved list of partners 104 that may offer, resell, or distribute the environmental activities (e.g., products and/or services) owned or produced by the partners 104 (original owners/producers of the environmental activities). The information may include but is not limited to identification data (e.g., partners' unique user identifiers, blockchain identifiers, account identifiers, and/or partners' public keys).

In some embodiments, the server computer system 124 may assign one or more registered verifiers 108 to verify an environmental product declaration of a product or a service of a partner of the partners 104 based on many factors including but not limited to the geographical locations of the registered verifiers and partners, the number of verification activities relating to environmental activities (e.g., products and/or services) of a partner of the partners 104 verified by each of the verifiers 108, or assigned randomly by the server computer system 124. In some embodiments, each of the verifiers 108 may be an individual verifier, a group of individuals, or an organization (e.g., certification body) registered with the server computer system 124 to carry out verification activities (e.g., verification of environmental product declarations, determination of the environmental impact of environmental activities). In some embodiments, each of the verifiers 108 may have to pass an examination to measure the knowledge of the verifier on one or more topics before or after being registered with the server computer system 124 to carry out verification activities (e.g., verification of environmental product declarations, determination of the environmental impact of environmental activities).

In some embodiments, the server computer system 124 may conduct an examination to measure the knowledge of one or more individuals from a group of individual verifiers, or an organization (e.g., certification body) on one or more topics before or after being registered with the server computer system 124 as verifiers 108 to carry out verification activities (e.g., verifying environmental product declarations, determining the environmental impact of environmental activities).

In some embodiments, the server computer system 124 the examination may conduct an examination for measuring the knowledge of verifiers 108 on or more topics over a network 120 (e.g., internet) by communicating with the server computer system 124. In some embodiments, the verifier devices 116 may be configured to communicate with the server computer system 124 and may be configured to enable the verifiers 108 to access the server computer system 124 to take the examination. In some embodiments, the verifier devices 116 may be configured to enable one or more verifiers 108 to take the examination using video or live-proctoring. In some embodiments where video proctoring may be used, a recording may be made by the server computer system 124 and stored in the storage component 402 and/or memory 404 of the server computer system 124, where the server computer system 124 may enable and assign one or more verifiers 108 from the registered verifiers 108 to objectively judge the examination performance of the one or more verifiers 108 after the one or more verifiers 108 take the examination. In some embodiments where a live proctoring may be used, the server computer system 124 assign one or more verifiers 108 from the registered verifiers 108 may be selected to monitor each of the verifiers 108 in real-time while the verifiers 108 take the examination. In some embodiments, the server computer system 124 may schedule the examination for measuring the knowledge of the verifiers 108 on one or more topics. In some embodiments, the server computer system 124 may enable the one or more verifiers who want to take the examination to schedule the examination. In some embodiments, the server computer system 124 may determine one or more algorithms, machine learning, and/or a trained neural network by means of deep learning the examination performance of each of the verifiers 108.

In embodiments where a blockchain may be utilized, the server computer system 124 may enable each of the registered verifiers 108 to be verified through one or more external identity management systems and/or systems that utilize cryptographic techniques including but not limited to zero-knowledge proof or zero-knowledge protocol (e.g., uPort, and the like) and/or by reference to a database. For example, a smart contract library may confirm the verifiers' identity through one or more external identity management systems and/or systems that utilize cryptographic techniques including but not limited to zero-knowledge proof or zero-knowledge protocol (e.g., uPort, and the like) and/or by reference to a database.

In embodiments where a blockchain may be utilized, the distributed ledger may comprise a hash chain (cryptographic hash chain) in which the activities information of each of the verifiers 108 and/or other information are collected into blocks and each block contains a hash (cryptographic hash) of the previous block in the chain. In embodiments where a blockchain may be utilized, the activities information of each of the verifiers 108 and/or other information may be broadcasted to and verified collectively by the nodes of the distributed ledger.

In some embodiments, the verifier devices 116 may be configured to communicate with the server computer system 124 to authenticate the verifiers 108, wherein the server computer system 124 may verify the verifiers' 108 identification data while the verifiers 108 take the examination. In some embodiments, the verifier devices 116 may be configured to communicate with the server computer system 124 to authenticate the verifiers 108. The authentication may be performed according to a one-factor, two-factor, three-factor, four-factor, and/or five-factor authentication methods. In some embodiments, the verification process may comprise calling each of verifiers 108 over the phone by the server computer system 124 preferably on a recorded line and/or sending the verifier text messages with instructions for identity verification.

An environmental product declaration of products and/or services offered by partners 104 may be a type III environmental product declaration based on ISO 14025. The environmental product declaration may include but not limited to information about company, product and/or service; the environmental impacts, including but not limited to global warming potential, depletion potential of the stratospheric ozone layer, acidification potential of land and water, eutrophication potential, formation potential of tropospheric ozone photochemical oxidants, abiotic depletion potential for non-fossil resources, abiotic depletion potential for fossil resources, human toxicity, freshwater aquatic Ecotoxicity, marine aquatic Ecotoxicity, and terrestrial Ecotoxicity; resource use including but not limited to total use of renewable primary energy resources, total use of non-renewable primary, use of secondary material, and use of renewable secondary fuels; waste generation including but not limited to hazardous waste disposed, non-hazardous waste disposed, and radioactive waste disposed; and other information including but not limited to components for re-use, materials for recycling, materials for energy recovery and exported energy.

In some embodiments, the verification of an environmental product declaration of a product or a service by one or more registered verifiers 108 may include but not limited to verifying the information presented in the environmental product declaration including verifying the life cycle assessment-based data (e.g., data relating to the life cycle assessments conducted according to the ISO 14040, ISO 14044, and/or any other ISO standards), verifying additional environmental information, and/or verifying other information.

In some embodiments, the life cycle inventory data (e.g., onsite operations data, onsite material consumption data, onsite emissions data, onsite energy consumption data, and/or onsite waste data) may be collected, measured, or estimated. The collected and/or measured data relating to the life cycle inventory may be acquired using one or more sensors and/or devices of a site device of the site devices 129 installed at partners' sites 128. The one or more site devices 129 may be configured to acquired data and to transfer the acquired data to the server computer system 124, where the server computer system 124 may store the data in the storage component 402 and/or memory 404 of the server computer system 124.

In embodiments where a blockchain may be utilized, a blockchain may record any type of data (e.g., data received from the site devices 129, point of service systems 118, users 102, partners 104, distributors 106, verifies 108, advertisement service providers 126, and/or third-party systems) as a form of transaction that occurs in the network 120 (e.g., transfer of information or an exchange,) in a distributed database that maintains a continuously growing list of data records hardened against tampering and revision. In some embodiments, the data records may be hardened against tampering and revision even by participating parties or operators who share the database.

In some embodiments, the server computer system 124 may enable one or more registered verifiers 108 to verify one or more environmental product declarations by conducting real-time sample collection, calculations, measurements, and/or analysis using the verifier devices 116, where sensors and/or devices (e.g., a sensor for sensing information such as an accelerometer, a gyroscope, Global Positioning System (GPS) component, Assisted Global Positioning System (AGPS) component, temperature measurement devices, speed measurement devices, etc.) of each of the verifier devices 116 may be utilized in the verification process.

In some embodiments, the server computer system 124 may conduct an examination to measure the knowledge of the verifiers 108 on one or more topics, where the examination may comprise practical examination on conducting calculations, measurements, sample analysis (e.g., chemical analysis and testing), sample collection, and/or the like using the verifier devices 116, where the input component 414 (e.g., a sensor for sensing information such as an accelerometer, a gyroscope, an actuator, global positioning system (GPS) component, Assisted Global Positioning System (AGPS) component, temperature measurement devices, speed measurement devices, etc.) of each of the verifier devices 116 may be utilized during the examination.

In some embodiments, the verifier devices 116 may be configured to enable registered verifiers 108 to conduct verification activities (e.g., verification of environmental product declarations, determination of the environmental impact of environmental activities) using one or more devices and/or sensors where a verifier device from the verifier devices 116 may be the device 400 having a processor 406 and differently arranged components, fewer components, additional components, different components than those shown in FIG. 4. (e.g., communications infrastructure 410, memory 404, input component 414, output component 412, a storage component 402, communications interface 408) where the processor 406 is configured by software to perform one or more functions of a verifier device of the verifier devices 116 described herein.

In some embodiments, the server computer system 124 may enable one or more registered verifiers 108 to propose guidelines or rules relating to the creation and/or verification of the environmental product declaration (e.g., data collection strategies or rules, verification rules), where the final decision of whether to accept or reject the proposed guidelines or rules may be taken based on the majority vote of one or more registered verifiers, where the server computer system 124 may invite one or more verifiers 108 to reconduct the verification activities until at least 51% of the verifiers 108 vote yes to approve a decision before it is accepted by the server computer system 124. In some embodiments, one or more algorithms may be used by the server computer system 124 in the process of reaching an agreement. For example, one or more algorithms may be used to calculate and determine the majority vote.

In some embodiments, the verification of an environmental product declaration by one or more registered verifiers 108 may include but not limited to taking pictures, scanning documents, collecting data (e.g., data relating to onsite operations, inputs and outputs from a specific site, measuring onsite material consumption, emissions, energy consumption, and waste, etc.), verifying identities, measuring distances, determining geographical locations, collecting samples, analyzing samples, determining the chemical composition of the collected samples, measuring temperature, energy measurements (e.g., electrical measurements), and/or the like using the one or more input component 414 (e.g., a sensor for sensing information such as an accelerometer, a gyroscope, an actuator, global positioning system (GPS) component, Assisted Global Positioning System (AGPS) component, temperature measurement devices, speed measurement devices, etc.) of each of the verifier devices 116.

In some embodiments, once one or more partners 104 may register with the server computer system 124 and provide the server computer system 124 with an environmental product declaration or submit a request to create a new environmental product declaration for one or more products and/or service they want to offer to the users 102, the server computer system 124 may assign and enable one or more verifiers 108 to verify the environmental product declaration provided by the one or more partners 104 or to create a new environmental product declaration for the products and/or services of the one or more partners 104.

In some embodiments, the server computer system 124 may enable one or more registered verifiers 108 may review the information relating to verification activities (e.g., verification of environmental product declarations, determination of the environmental impact of environmental activities) carried out by each of the registered verifiers 108 to reach an agreement on the validity of the information provided by each of the registered verifiers 108 and to decide or vote whether to accept or reject each piece of information provided by the verifiers 108. The server computer system 124 may determine, the final decision of whether to accept or reject each piece of information relating to the verification activities conducted or carried out by each of the registered verifiers 108 based on the majority vote, where the server computer system 124 may invite one or more verifiers 108 to reconduct the verification activities until at least 51% of the verifiers 108 vote yes to approve a decision before it is accepted by the server computer system 124. In some embodiments, the server computer system 124 may determine using one or more algorithms the majority vote.

In some embodiments, the server computer system 124 may enable one or more verifiers to review the information relating to the verification activities carried out by each of the registered verifiers 108 and to decide or vote whether to accept or reject each piece of information within a specific time limit, wherein points, currency, cryptocurrency, and/or credits may be credited under the accounts of the registered verifiers 108 for each piece of information they review.

In some embodiments, the server computer system 124 may enable one or more users 102 to carry out each environmental activity associated with a product and/or a service after the verification of the environmental product declaration of the product and/or service by one or more verifiers 108 is completed.

In some embodiments, the server computer system 124 may enable one or more registered verifiers 108 to collect data using one or more sensors or devices of the one or more verifier devices 116, and transferring information to the server computer system 124, where the data may be used for the verification of an environmental product declaration. In some embodiments, the server computer system 124 may communicate with a partner of the partners 104 and/or an external system to collect information or data (e.g., information on identity verification, energy measurements, sample analysis, determination of the chemical composition of samples) relating to the verification activities (e.g., verification of environmental product declarations, determination of the environmental impact of environmental activities) carried out by a verifier of the verifiers 108.

In some embodiments, the server computer system 124 may enable a registered partner of the partners 104 to submit a request to create an environmental product declaration for one or more products and/or services, wherein the server computer system 124 may enable the partner to transfer the required service fee to the server computer system 124 using the currency, cryptocurrency, points, and/or credits available in the partner's account. In some embodiments, the server computer system 124 may assign one or more verifiers 108 to create an environmental product declaration for a product and/or a service of a partner of the partners 104, wherein the server computer system 124 may transfer currency, cryptocurrency, points, and/or credits to the one or more verifiers 108 to create the environmental product declaration.

In some embodiments, the server computer system 124 may enable one or more registered verifiers 108 to create an environmental product declaration of a product or a service according to the ISO standards. For example, the creation of an environmental product declaration of a product or a service may be done by performing a life cycle assessment study based on the product category rules according to ISO 14040 and ISO 14044, and/or any other standards.

The server computer system 124 may enable one or more verifiers 108 to collect data using verifier devices 116, the data is related to the inventory analysis step of the life cycle assessment conducted according to the ISO 14040 and ISO 14044 standards or any other standards.

In some embodiments, the server computer system 124 may enable an external system to transfer data relating to the life cycle assessment (e.g., life cycle inventory data) of an environmental product declaration of product or service to the server computer system 124, the server computer system 124 may store the received data in the storage component 402 and/or memory 404 of the server computer system 124. In embodiments where a partner of the partners 104 has one or more site devices 129 installed at partner's locations, one or more verifiers 108 may be enabled by the server computer system to access the site activity data records of the one or more site device of the partner 104 and utilize data relating to the life cycle assessment (e.g., life cycle inventory data) of an environmental product declaration of product or service offered by a partner of the partners 104 to verify or create an environmental product declaration of a product or service offered by the partner 104.

In some embodiments, the server computer system 124 may compare using one or more algorithms the environmental product declarations of the products and/or services of one or more partners 104 to determine the environmental product declaration that has the lowest environmental impact, wherein the one or more verifiers 108 may follow guidelines or rules (e.g., the environmental product declarations are based on the same product category rules, analyzed according to the same life cycle impact assessment method, modeled using the same data and/or system boundaries, functionally equivalent, and/or based on the same functional unit.) in the creation and/or verification of environmental product declarations of products and/or services to enable comparability between the environmental product declarations of the products and/or services of one or more partners 104.

In some embodiments, the server computer system 124 may anonymize the identification data of one or more verifiers 108 and any information that makes the one or more verifiers 108 recognizable and forward the information verified by the one or more verifiers 108 relating to an environmental product declaration to one or more verifiers 108 and enable the new one or more verifiers to review or to verify the verified information and decide to accept or reject each piece of information, and comment, and/or rate (e.g., on a scale from 1-10) the validity of information verified by the other one or more verifiers 108.

In some embodiments, the server computer system 124 may assign one or more verifiers 108 to re-review or reverify the information verified by one or more verifiers 108 and enable them to decide to accept or reject each piece of information, comment, and rate (e.g., on a scale from 1-10) the validity of verified information until at least 51% of the verifiers 108 assigned by the server computer system 124 vote yes to approve a decision on the validity of the information verified by the one or more verifiers 108 before it is accepted by the server computer system 124. The server computer system 124 may enable the one or more verifiers 108 to decide if specific information in the environmental product declaration is required to be accurate or within a specific range of accuracy.

In some embodiments, one or more verifier devices 116 may be configured to transmit to the server computer system 124 data comprising at least one verification activity record. The verification activity record may comprise data relating to one or more verification activities (e.g., verification and/or creation of environmental product declarations, determination of the environmental impact of environmental activities, and/or environmental impact of environmental law violations) carried out by the one or more registered verifiers 108. The data for each verification activity record transmitted by each of verifier devices 116 may include, but not limited to one or more verifiers', partners' and/or distributors identification data (e.g., biometric information, credential information, geographical location data, device PUFs, device identification information, account identifiers, public keys, unique user identifier, blockchain identifier, name, address, and/or other identification data), information on the verification activity transmitted (e.g., the geographical location where the verification activity was transmitted), and information on the verification and/or creation of environmental product declarations, and information relating to the determination of the environmental impact of environmental activities and environmental law violations. The information on the creation and verification of an environmental product declaration may include but is not limited to data collected by the verifiers 108 and data provided by the verifiers 108 relating to the verification, or creation of the environmental product declaration, and/or life-cycle inventory data. In some embodiments, the information on the creation and verification of an environmental product declaration may include but is not limited to data relating to the life cycle assessment (e.g., life cycle inventory data) of a product or service. In some embodiments, the server computer system 124 may enable one or more external systems to transmit data relating to the life cycle assessment (e.g., life cycle inventory data) of a product or service to the server computer system 124.

In some embodiments, the server computer system 124 may assign one or more verifiers 108 to install one or more site devices 129 at one or more partners' sites 128, wherein the server computer system 124 may enable one or more verifiers to determine the installation location and orientation of site devices 129 at one or more sites 128 (location) of one or more partners 104. In some embodiments, the biometric data acquired by one or more imaging devices of one or more site devices 129 may include but not limited to images, videos, and/or live videos of one or more sites 128.

In some embodiments, the server computer system 124 may deactivate one or more site devices 129 if the one or more site devices 129 are not located at partner's location (e.g., partner's address) stored in the storage component 402 and/or memory 404 of the server computer system 124 or within a pre-defined distance from partner's location (e.g., partner's address) stored in the storage component 402 and/or memory 404 of the server computer system 124.

In embodiments where one more verifiers 108 may utilize site activity data records in the verification and/or creation of an environmental product declaration of an environmental activity (e.g., product and/or service) offered by a partner of the partners 104, the server computer system 124 may mark the environmental activity (e.g., product and/or service) with makes or signs, recommend the environmental activity (e.g., product and/or service) to the users 102, and/or add more points, credits, cryptocurrency, and/or currency to the one or more user accounts who carry out (e.g., participate in, purchase, use, or complete) the environmental activity (e.g., product and/or service).

In some embodiments, the server computer system 124 may also enable one or more verifiers to submit a request to the server computer system 124 to deactivate the one or more site device 129 and/or change the location and orientation of one or more site devices 129 (e.g., installing the same site device in a new location, changing the orientation of the site device) where the imaging device of the input component 414 of the server computer system 124 may acquire new data (e.g., images, videos, and/or live videos), where the new images, videos, and/or live videos acquired by the one or more imaging devices of the one or more site devices 129 during and after changing the orientation and/or the installation of the site devices 129 may be stored in the storage component 402 and/or memory 404 of the server computer system 124 to be used by one or more algorithms to authenticate the one or more sites 128.

In some embodiments, the site devices 129 may be configured to collect site activity data continuously, periodically, and/or based on a request from one or more verifiers 108 and to transmit site activity data to the server computer system 124 in real-time.

In some embodiments, the operation of the one or more site devices 129 and their associated devices and/or sensors may be dictated by one or more sets of instructions (e.g., program code, libraries, software, machine code, firmware). The one or more sets of instructions (e.g., program code, libraries, software, machine code, firmware) that dictate a site device of the site devices 129 may be installed over the network 120, and/or updated to add functionality or updated for any other reason. For example, one or more sets of instructions (e.g., program code, libraries, software, machine code, firmware) may dictate the operation of sensors or devices that acquire data, where the data may be life cycle inventory data (e.g., onsite operations data, onsite material consumption data, onsite emissions data, onsite energy consumption data, and onsite waste data), and/or any other data.

The one or more sets of instructions (e.g., program code, libraries, software, machine code, firmware) may also dictate the operation of Radio Frequency Identification (RFID) reader, a card reader, a barcode scanner, an accelerometer, a gyroscope, an actuator, Global Positioning System (GPS) component, Assisted Global Positioning System (AGPS) component, fingerprint reader, vein reader, facial recognition device, hand geometry device, iris recognition, retina and odour/scent recognition device, voice recognition biometric data device, an imaging device (e.g., infrared imaging device, any other imaging devices), sensors for acquiring life cycle inventory data (e.g., onsite operations data, onsite material consumption data, onsite emissions data, onsite energy consumption data, and onsite waste data), temperature measurement devices, emissions sensor, energy measurement devices, speed measurement devices (e.g., RADAR, LIDAR), other RADAR sensors, chemical sensors, proximity sensor, IR sensor (Infrared Sensor), pressure sensor, light sensor, ultrasonic sensor, smoke, gas and alcohol Sensor, touch sensor, color sensor, humidity sensor, tilt sensor, flow, and level sensor and/or other sensors of the site devices 120.

In such cases, the blockchain may be utilized to install one or more sets of instructions (e.g., program code, libraries, software, machine code, firmware) onto the one or more site devices 129, wherein each block of the blockchain may include one or more install records, wherein each install record may include but not limited to at least a unique site device identifier, a blockchain identifier of a partner of the partners 104, and a software identifier (comprises site device software version), wherein the server computer system 124 may authenticate using one-factor, two-factor, three-factor, four-factor, and/or five-factor authentication methods the one or more sites 128, a partner of the partners 104 (e.g., an employee of a partner), and/or one or more verifiers 108 prior to installing the one or more install records onto the one or more site devices 129. In some embodiments, the server computer system 124 may authenticate the one or more sites 128, a partner of the partners 104 (e.g., an employee of a partner), and/or one or more verifiers 108 prior to installing the one or more install records onto the one or more site devices 129, where the installation of the one or more records onto the one or more site devices may be allowed by the server computer system if the authentication is successful.

In some embodiments, the site devices 129 may be configured to communicate with partners' systems or devices to collect a variety of data and transmit the data to the server computer system 124.

The application of one or more hashing algorithms to the block reference value and data reference value may generate hash values, such that it would be necessary to regenerate the reference value if the corresponding data is modified. This may make the blockchain immutable as the propagation of any modification through the rest of the blocks in the blockchain would be necessary. Thus, any malicious changes to the one or more sets of instructions that dictate the operation of one or more site devices 129 and their associated sensors and devices would block the use of the copy of the blockchain installed on the one or more site devices 129. This in turn would deactivate the one or more site devices 129.

In some embodiments, where a blockchain may be utilized, the server computer system 124 may verify the version of the software (one or more sets of instructions) installed onto the one or more site devices 129 periodically to determine if there is a software (one or more sets of instructions) update is required to be installed on each of the site devices 129, where the software identifier may be used by the server computer system 124 to determine the version of the software (one or more sets of instructions) installed onto the one or more site devices 129. The server computer system 124 may also store in the database of the server computer system 124 a list of the software updates associated with each of the site devices 129. In case if there is a software (one or more sets of instructions) update required to be installed onto each of the site devices 129, the server computer system 124 may authenticate using one-factor, two-factor, three-factor, four-factor, and/or five-factor authentication methods one or more sites 128, a partner of the partners 104 (e.g., an employee of a partner), and/or a verifier of the verifiers 108 prior to installing the one or more install records onto the one or more site devices 129, wherein the geographical location data may be verified.

In some embodiments, the operation of the one or more user devices 110, partner devices 112, distributor devices 114, verifier devices 116, point of service systems 118, and/or advertisement service provider devices 127, and their associated devices and/or sensors may be dictated by one or more sets of instructions (e.g., program code, libraries, software, machine code, firmware). One or more sets of instructions (e.g., program code, libraries, software, machine code, firmware) may be installed over the network 120, and/or updated to add functionality or updated for any other reason. In such cases, the blockchain may be utilized to install the one or more sets of instructions (e.g., program code, libraries, software, machine code, firmware) onto the one or more user devices 110, partner devices 112, distributor devices 114, verifier devices 116, point of service systems 118, and/or advertisement service provider devices 127, and their associated devices and/or sensors, wherein each block of the blockchain may include one or more install records, wherein each install record may include but not limited to one or more device identifiers, one or more blockchain identifiers, a software identifier, of the users 102, partners 104, distributors 106, verifiers 108, and/or advertisement service providers 126 and their associated devices, wherein the server computer system 124 may authenticate using one-factor, two-factor, three-factor, four-factor, and/or five-factor authentication methods the users 102, partners 104, distributors 106, verifiers 108, and/or advertisement service providers 126 and their associated devices prior to installing the one or more install records. In some embodiments, the geographical location data of the site devices 129, point of service systems 118, user devices 110, partner devices 112, distributor devices 114, verifier devices 116, point of service systems 118, and/or advertisement service provider devices 127 may be verified prior to installing the one or more install records onto the devices.

In some embodiments, the server computer system 124 may authenticate using one-factor, two-factor, three-factor, four-factor, and/or five-factor authentication methods the one or more user devices 110, partner devices 112, distributor devices 114, verifier devices 116, point of service systems 118, and advertisement service provider devices 127 prior to installing the one or more install records onto the one or more user devices 110, partner devices 112, distributor devices 114, verifier devices 116, point of service systems 118, and/or advertisement service provider devices 127, and their associated devices and/or sensors.

In some embodiments where a blockchain may be utilized, the distributed ledger may comprise a side chain for the installation of one or more sets of instructions (e.g., program code, libraries, software, machine code, firmware), where the blockchain may be a permissioned blockchain (access-controlled).

At step 262, the server computer system 124 may verify each environmental activity (e.g., product and/or service) and environmental law violation offered or reported by the one or more partners 104, each environmental activity (e.g., product and/or service) distributed to the one or more partners 104 by the one or more distributors 106, and each environmental activity (e.g., product and/or service) used by the one or more distributors 106 to distribute environmental activities (e.g., products and/or services) to the one or more partners 104 and mark each verified environmental activity and environmental law violation. The server computer system 124 may communicate with one or more external system of program operator to verify an environmental product declaration of a product and/or a service transmitted or submitted to the server computer system 124 by the one or more partners 104 and distributors 106. The server computer system 124 may communicate with one or more registered partners 104 or one or more unregistered entities to verify one or more environmental law violations of one or more partners 104, distributors 106, and/or users 102. The respective account identifiers of one or more users 102, partners 104, distributor 106, and/or other identification data may be used in communications exchanged therewith for the verification of the environmental product declarations and/or environmental law violations.

In some embodiments, the server computer system 124 may assign one or more verifiers 108 to determine the estimated environmental impact of each environmental law violations based on its environmental impact. The server computer system 124 may transfer currency, cryptocurrency, points, and/or credits to the one or more verifiers 108 to determine the estimated environmental impact of each environmental law violations.

At step 264, the server computer system 124 may calculate using one or more algorithms a score for each verified environmental activity such as a product and/or a service offered by each of the partners 104 by comparing the verified environmental product declarations of products and services stored in the database of the server computer system 124 based on the information included in the verified environmental product declarations of the products and service, where guidelines or rules (e.g., the environmental product declarations may have the same system boundaries, created using the same life cycle impact method, and product category rules) may be used in the creation and/or verification of environmental product declarations of products and/or services to enable comparability between the environmental product declarations; calculate using one or more algorithms a score for each verified environmental activity such as a product and/or a service used by the one or more distributors 106 to distribute environmental activities to the one or more partners 104, and/or unregistered entities based on the information included in the verified environmental product declaration of the product and/or a service and the information included in the verified environmental product declarations of the products and/or services used by other distributors to distribute environmental activities, where specific guidelines or rules (e.g., the environmental product declarations may have the same system boundaries, created using the same life cycle impact method, and product category rules) may be used in the creation and/or verification of environmental product declarations of products and/or services to enable comparability between the environmental product declarations; and calculate using one or more algorithms a score for each verified environmental law violation reported by the one or more partners 104 based on the environmental impact of each environmental law violation.

In some embodiments, the server computer system 124 may penalize (e.g., by not sending verification requests) the verifiers 108 for providing decisions (e.g., misleading verifications decisions) that are not accepted by at least 51% of the verifies 108. The server computer system 124 may also reward (e.g., by sending verification requests, and/or sending currency, cryptocurrency, points, and/or credits) verifiers 108 who accept more assignments.

In some embodiments, partners' environmental activities (e.g., products and/or services) with high scores may be given the priority to be promoted to users 102. In some embodiments, the score and number of verified environmental activities (e.g., products and/or services) offered by the one or more partners 104, the score and number of environmental law violations of the one or more partners 104, and the responses of the one or more partners 104 to the suggestions or recommendations of the server computer system 124 may be used to calculate an environmental credit score for the one or more partners 104. The score and number of verified environmental activities (e.g., products and/or services) used by the one or more distributors 106, the score and number of environmental law violations of the one or more distributors 106, and the responses of the one or more distributors 106 to the suggestions or recommendations of the server computer system 124 may be used to calculate an environmental credit score for the one or more distributors 106. The environmental credit score of the one or more partners 104 and distributors 106 may be calculated for a specific geographical area and/or for a specific type of environmental activities and/or a specific category or classification of a product or a service.

In some embodiments, the server computer system 124 may add more points, credits, and/or cryptocurrency to the environmental credit score of the one or more users 102 who carry out (e.g., participate in, purchase, use, or complete) environmental activities (e.g., products and/or services) with a high score environmental product declaration and/or mark and reward the one or more partners 104 and distributors 106 with high environmental credit scores with marks, signs, symbols and/or any other benefits. The environmental credit score of the partners 104 and distributors 106 may be used in areas including, but not limited to decisions by the government towards companies and towards any other entities. In some embodiments, the server computer system 124 may reward the users 102 who carry out (e.g., participate in, purchase, use, or complete) environmental activities (e.g., products and/or services) with a high score environmental product declaration with points, credits, and/or currency.

At step 266, one or more users 102 who have previously registered with the server computer system 124 may register with one or more partners 104. The users 102 may be authenticated by one or more point of service systems 118 of one or more partners 104 to be able to carry out (e.g., participate in, purchase, use, or complete) an environmental activity (e.g., products and/or services). Users 102 may enter the unique user identifiers on a keypad or other input device at the point of service systems 118, or log in to a website or use a mobile application. Alternately, users 102 may use an identifying card, a barcode, RFID, QR code or electronic tag and/or any other techniques or device that may be read by the point of service systems 118 to confirm the environmental activities carried out by the users 102, wherein the point of service systems 118 may communicate with the server computer system 124 to authenticate the one or more users 102.

In some embodiments, the server computer system 124 may enable one or more partners 104, to register one or more users 102 and create one or more user accounts for the users 102 using partners' point of service systems 118 and/or partners devices 112, wherein the one or partners 104 may provide the one or more users 102 with a barcode, RFID, QR code or electronic tag and/or any other techniques or device that may be read by the point of service systems 118 and/or partners devices 112.

The point of service systems 118 may transmit information to the server computer system 124, the information may include but not limited to information on the environmental activities (e.g., products and/or services) carried out (e.g., purchased, used, or completed) by the one or more users 102, the identification data (e.g., biometric information, credential information, geographical location data, device PUFs, device identification information, account identifiers, public keys, unique user identifier, blockchain identifier, name, address, and/or other identification data) of the one or more distributors 106 and/or the one or more users 102 and the one or more partners 104, the identification number of each environmental activity, the number of environmental activities, and/or the geographical location of the point of service systems 118.

At step 268, the server computer system 124 may receive environmental activity data comprising data records from the one or more point of service systems 118 of the one or more partners 104 and processes the information. The server computer system 124 may match the environmental activity records of the one or more distributors 106, users 102, and partners 104 with the identification data (e.g., unique user identifiers, blockchain identifiers, biometric data, public keys) of the one or more distributors 106, users 102, and partners 104 to identify environmental activity records of at least one of the plurality of distributors 106, users 102, and partners 104 associated with the identification data and credits the respective environmental activity records of the one or more distributors 106, users 102, and partners 104 based on the information on the environmental activities (e.g., products and/or services) carried out (e.g., purchased, used, or completed) by the one or more users 102. The distributors 106, users 102, and partner 104 may monitor and track the environmental activities stored in the environmental activity records of distributors 106, users 102, and partner 104.

At step 270, the server computer system 124 may calculate, based on the environmental activity data credited under the records of the one or more users 102 an environmental credit score for the one or more users 102 using one or more algorithms. In some embodiments, the environmental credit score of the one or more users 102 may be calculated for a specific geographical area and/or for a specific product and/or service category, and so forth. In some embodiments, the calculation of an environmental credit score for the one or more users 102 may be done by considering factors including but not limited to (a) the number, category, and environmental impact of environmental activities of the one or more users 102 aimed at protecting the environment, (b) the length of the history of environmental activities of the one or more users 102, (c) the score of the environmental product declaration of each environmental activity carried out by the one or more users 102, (d) the responses of the one or more users 102 to the activities suggested by the server computer system 124 based on the environmental activities of the one or more user 102 before and after being registered users, and (e) the type and number of environmental law violations of the one or more users 102.

In some embodiments, the calculation of an environmental credit score for each of users 102 by the server computer system 124 may be done by considering factors including but not limited to (a) the number and score of the environmental product declarations of the environmental activities (e.g., product and/or service) carried out (e.g., purchased, used, or completed) by the users 102, where the score of the environmental product declaration determine the number of points the user will get, (b) the calculation of the number of points relating to the environmental activities (e.g., products and/or services) suggested or recommended by the server computer system 124 to each of users 102 and carried out (e.g., purchased, used, or completed) by each of the users 102, and (c) the total number of the score of environmental law violations of each of the users 102.

The calculation of an environmental credit score for each of the users 102 may be done after every environmental activity credited in the environmental activity records of the one or more users 102 and/or at regular intervals and/or based on a request from the one or more users 102 and/or the one or more partners 104.

At step 272, the server computer system 124 may analyze the environmental credit scores of the users 102, partners 104, and/or distributors 106 to determine the one or more users 102, partners 104, and/or distributors 106 with high environmental credit scores. The analysis may be done in various areas including but not limited to the category of environmental activities, geographical area, and any other areas. The server computer system 124 may exchange information with one or more users 102, partners 104, and/or distributors 106 relating to the environmental credit scores of the one or more users 102, benefits available, new rules for environmental credit score calculation, and so forth.

In some embodiments, the server computer system 124 may identify one or more sites, partners, and verifiers associated with the site activity data collected by the or more site devices; extract data indicating a real-time data related to an environmental product declaration of at least one of the plurality of partners for each site device; generate a display of a sensor listing for each site device, wherein each of the sensors is listed with its associated real-time data related to the environmental product declaration, wherein the generated display further may comprise site identification information and partners identification information for each of the sensors of each of the site devices, wherein the generated display further comprises historical data over a period of time, wherein the generated display comprises graphical data; define one or more alarm levels based on collected real-time data related to the environmental product declaration of an environmental activity offered by the at least one of the plurality of partners, wherein the server computer system 124 may enable one or more verifiers to define the one or more alarm levels based on collected real-time data related to the environmental product declaration; and determine whether the collected data by the ore or more sensors of the one or more site devices includes real-time data that meet any of the defined alarm levels, wherein at least one of the defined alarm levels is met, and further comprising generating an alarm notification and notify the one or more partners and one or more verifiers. In some embodiments, the server computer system 124 may assign one or more verifiers to re-verify the environmental product declaration when at least one of the defined alarm levels is met. In some embodiments, the server computer system 124 may make an environmental activity offered by a partner of the partners 104 unavailable to be carried out (e.g., purchased, used, or completed) by one or more users 102 when at least one of the defined alarm levels is met.

At step 274, the server computer system 124 may publish the environmental credit score data of the users 102, partners 104, and distributors 106 under the environmental activity records of the users 102, partners 104, and/or distributors 106 respectively, and, may notify the users 102, partners 104 and/or distributors 106 and may mark the users 102, partners 104 and/or distributors 106 with high environmental credit scores with marks, signs, or symbols. The server computer system 124 may receive responses from the users 102, partners 104, and/or distributors 106 to system messages and proposals.

In some embodiments, the server computer system 124 may enable program operators to track and monitor the verification activities of an environmental product declaration performed by one or more verifiers 108. In some embodiments, the server computer system 124 may enable program operators to allow or prevent the publication (making it available for the public on the blockchain network) of a verified environmental product declaration.

At step 276, the server computer system 124 may identify one or more sites 128, partners 104, and verifiers 108 associated with the site activity data collected by the or more site devices 129.

At step 278, the server computer system 124 may extract data indicating real-time data related to an environmental product declaration of at least one of the plurality of partners 104 for each site device 129.

At step 280, the server computer system 124 may generate a display of a sensor listing for each site devices 129, wherein each of the sensors is listed with its associated real-time data related to the environmental product declaration, wherein the generated display further comprises site 128 identification information and partners 104 identification information for each of the sensors of each of the site devices 129, wherein the generated display further comprises historical data over a period of time, wherein the generated display comprises graphical data.

At step 282, the server computer system 124 may define one or more alarm levels based on collected real-time data related to the environmental product declaration of an environmental activity offered by the at least one of the plurality of partners 104, wherein the one or more alarm levels are defined by one or more verifiers 108 based on the collected real-time data related to the environmental product declaration.

At step 284, the server computer system 124 may determine whether the collected data by the ore or more sensors of the one or more site devices 129 includes real-time data that meet any of the defined alarm levels, wherein at least one of the defined alarm levels is met, and further comprising generating an alarm notification and notify the one or more partners 104 and one or more verifiers 108, wherein one or more verifiers 108 are assigned to reverify the environmental product declaration when at least one of the defined alarm levels is met. In some embodiments, the server computer system 124 may make an environmental activity offered by a partner of the partners 104 unavailable to be carried out (e.g., purchased, used, or completed) by one or more users 102 when at least one of the defined alarm levels is met.

The environmental credit scores and/or environmental activity data of the users 102 may be used for penalizing and/or rewarding the users 102. The environmental credit scores and/or environmental activity data of the users 102 may be used by private and/or public and/or voluntary sectors and/or by other entities in areas including but not limited to employment decisions, university admission decisions, and landlord-tenant decisions, decisions of the government towards individuals, companies and any other entities. The environmental credit scores and/or environmental activity data of the users 102 may also be used in other areas that may impact consumer's lives including but not limited to determining whether a service, an award, a credit, a scholarship should be offered or granted to the users 102.

At any time, the server computer system 124 may provide information to the partners 104, distributors 106, and/or users 102 on their environmental activities, environmental law violations, data relating to currency, cryptocurrency, points, and/or credits. In some embodiments, the server computer system 124 may generate a display comprising the information. The information may be displayed on a website hosted by or associated with the server computer system 124. The information may be displayed in the form of text and/or graphs. The information may include but is not limited to historical data on environmental activities, environmental law violations, environmental credit score, environmental credit report, and/or credits', points', and/or currency's transactions' data. The historical data on environmental activities may include but limited to the number, type, time, date, and location of environmental activities, environmental law violations, environmental impact information for each environmental activity, and/or the score of the environmental product declaration of each environmental activity (e.g., product and/or service). The transactions' data may include but limited to data relating to the transfer and/or exchange of credits, points, and/or currency relating to users 102, partners 104, and/or distributors 106. An environmental credit report is a statement that has information about the environmental credit activities and current environmental credit situation of the one or more partners 104, distributors 106, and/or users 102. An environmental credit report may include but not limited to (a) name, address, birth date, social security number, national identification number, passport number, and phone number, business name, business registration number contact information, environmental activities offered, used, and/or reported, employer identification number, and (b) information on current and historical environmental activities stored in user's and/or partner's records. The server computer system 124 may provide the distributors 106 with information on the environmental activities (e.g., products and/or services) distributed to the partners 104 and carried out (e.g., purchased, used, or completed) by the users 102. The server computer system 124 may allow or enable users, partners, and/or distributors to access the server computer system 124 and display information on registered users', partners', and/or distributors' environmental activities and/or transactions' data on users' devices 110, partners devices' 112, and/or distributors' devices 114.

At any time, the server computer system 124 may provide information to the verifiers 108. In some embodiments, the server computer system 124 may generate a display comprising the information. The information may be displayed on a website hosted by or associated with the server computer system 124. The information may be displayed in the form of text and/or graphs. The information may include but is not limited to historical data relating to the creation, and verification of environmental product declarations, the determination of the environmental impact of environmental activities, and environmental law violations, and information relating to the points', credits' and/or currency's transactions' data. The verification activities data may include but are not limited to the verification data of environmental product declarations, and data relating to the determination of the environmental impact of environmental activities, and environmental law violations. The data relating to the creation of an environmental product declaration may include but is not limited to data collected by the verifiers 108 and/or life-cycle inventory data. The server computer system 124 may allow or enable the verifiers 108 to access the server computer system 124 and display information on partners 104 environmental activities (e.g., products and/or services) on verifier devices 116 operated by the verifiers 108. The transactions' data may include but are not limited to transactions relating to the transfer and/or exchange of credits, points, and/or currency relating to the verifiers 108.

At any time, the server computer system 124 may provide information to the advertisement service providers 126. In some embodiments, the server computer system 124 may generate a display comprising the information. The information may be displayed on a website hosted by or associated with the server computer system 124. The information may be displayed in the form of text and/or graphs. The information may include but is not limited to historical data relating to the advertisement service that may be provided to users 102, partners 104, distributors 106, verifiers 108, and/or unregistered entities (e.g., individuals, universities, companies, organizations, governmental entities, etc.) and information on the transactions' data relating to the credits and/or currencies associated with the advertisement service. The advertisement service data or information may include but not limited to advertisement activities data (e.g., information on the advertisement service requests or orders, information on the time, type, number, cost, and content details of advertisements, and information on the results or the delivery of advertisement service requests or orders). The advertisement service transactions' data may include but not limited to information on the balances, deposits, and/or transfers of credits and/or currencies relating to the advertisement service and associated with the users 102, partners 104, distributors 106, verifiers 108, advertisement service providers 126, and/or the server computer system 124.

The server computer system 124 may enable the users 102 to search for environmental activities (e.g., products and/or services) offered by one or more partners 104 in a specific or any geographical location, the option of allowing or enabling the users 102 to search for environmental activities (e.g., products and/or services) in a specific or any geographical location may be provided to the users 102 through a website hosted by or associated with the server computer system 124 and/or through a mobile application. The server computer system 124 may display the results to the users 102 who search for environmental activities (e.g., products and/or services) based on many factors including but not limited to the score of the environmental product declaration of each environmental activity (e.g., product and/or service), and the geographical location of the environmental activities (e.g., products and/or services). In some embodiments, one or more environmental activities with a high score environmental product declaration may be promoted, suggested, or recommended by the server computer system 124 to one or more users 102 and may be displayed first to the users 102. In some embodiments, the one or more environmental activities with a verified environmental product declaration by one or more verifiers 108 using data received from one or more site devices 129 of at least one of the plurality of partners 104 may be promoted, suggested, or recommended by the server computer system 124 to one or more users 102 and may be marked by the server computer system 124 as verified and may be displayed first to the users 102.

In some embodiments, the server computer system 124 may enable one or more partners 104 to use credits, currency, cryptocurrency, and/or points associated with their accounts to recommend, suggest and/or promote one or more environmental activities (e.g., products and/or services) to the users 102. In some embodiments, the server computer system 124 may cred the accounts of users 102 with credits, cryptocurrency, currency, and/or points for receiving recommendations, suggestions, and/or promotions related to one or more environmental activities (e.g., products and/or services).

In some embodiments, the geolocation data or geographical location data of the site devices 129, point of service systems 118, user devices 110, partner devices 112, distributor devices 114, verifier devices 116, and/or advertisement service provider devices 127 may be obtained from wireless or mobile carriers, wireless service providers, where the devices may be configured to communicate with the wireless or mobile carriers or wireless service providers.

In some embodiments, the geolocation data or the geographical location data (e.g., GPS/AGPS coordinates) may be obtained from multiple sources including but not limited to static or dynamic site devices 129, point of service systems 118, user devices 110, partner devices 112, distributor devices 114, verifier devices 116, and/or advertisement service provider devices 127, where the geolocation or geographical data may be periodically, intermittently, or continuously acquired and stored in the database 312 of the server computer system 124. In some embodiments, the geolocation data or the geographical location data (e.g., GPS/AGPS coordinates) may be acquired by the GPS and/or AGPS components of the input component 414 of the site devices 129, point of service systems 118, user devices 110, partner devices 112, distributor devices 114, verifier devices 116, and/or advertisement service provider devices 127.

The server computer system 124 may retrieve geolocation data or the geographical location data (e.g., GPS/AGPS coordinates) identifiers stored in the database 312 of the server computer system 124 corresponding to one or more devices and a second geolocation data or the geographical location data (e.g., GPS/AGPS coordinates) identifiers corresponding to a current location of one or more devices and compare the first geolocation data or the geographical location data (e.g., GPS/AGPS coordinates) to the second geolocation data or the geographical location data (e.g., GPS/AGPS coordinates) to determine a location of one or more devices.

The server computer system 124 may suggest or recommend environmental activities (e.g., products and/or services) to the one or more users 102 based on many factors including but not limited to the environmental activities' location from the location of one or more users 102 and/or the score of the environmental product declaration of the environmental activities (e.g., products and/or services).

Figure 3:
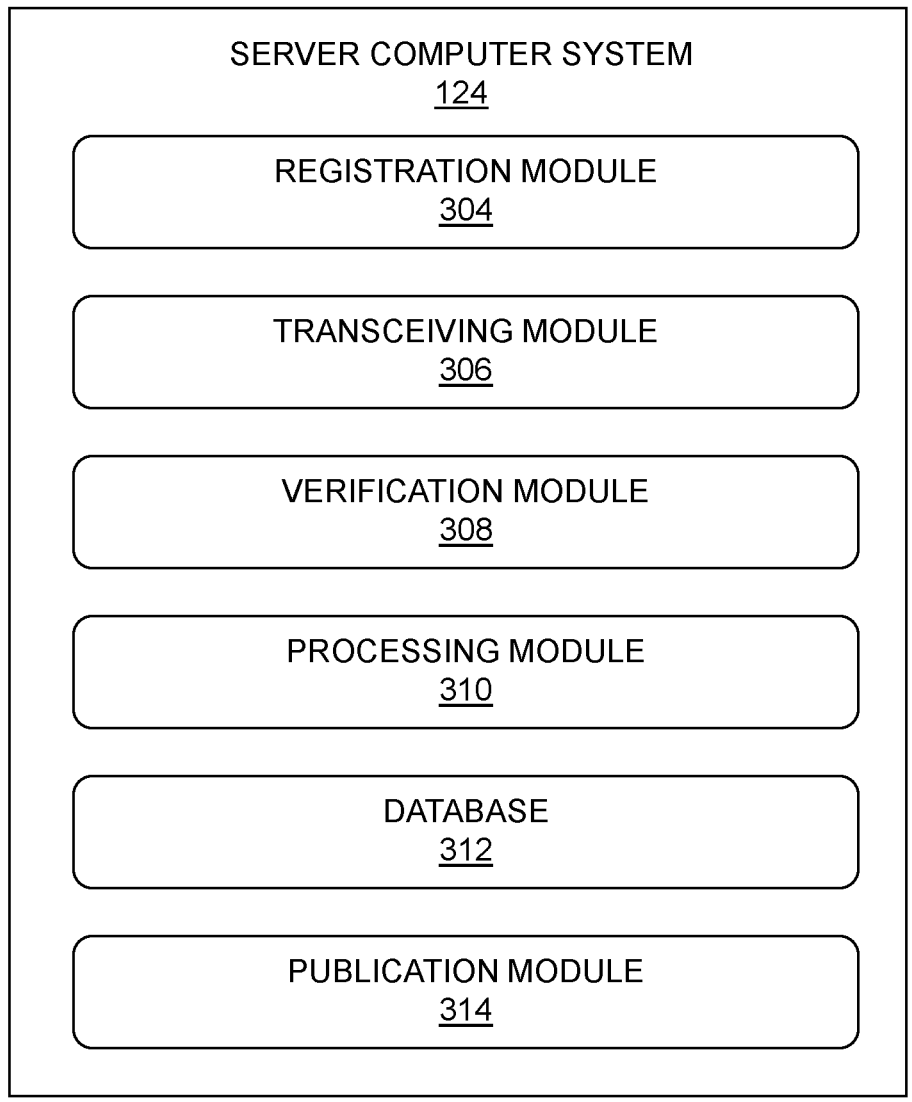
FIG. 3 is a block diagram illustrating system elements of an exemplary server computer system, in accordance with an embodiment.

FIG. 3 is a block diagram 300 illustrating system elements of an exemplary server computer system 124, in accordance with an embodiment of the present disclosure. As shown, the server computer system 124 primarily includes a registration module 304, a transceiving module 306, a verification module 308, a processing module 310, a database 312, and a publication module 314.

The registration module 304 may be configured to register a plurality of users, partners, and distributors with the server computer system 124 by assigning a unique user identifier (e.g., a blockchain identifier, account identifier) to each of the users 102, partners 104, and distributors 106. The registration module 304 may be further configured to create an account profile and environmental activity records for the plurality registered users 102, partners 104, and distributors 106. The registration module 304 may also be configured to associate the registered users', partners', and distributors' environmental activity records with the users', partners', and distributors' identification data (e.g., unique user identifiers, account identifiers, public keys, blockchain identifiers, biometric data) and store in the database 312. The registration module 304 may also be configured to list users', partners', and distributors' environmental activity records under the respective account profiles of users 102, partners 104, and/or distributors 106.

The registration module 304 may also be configured to register a plurality of verifiers 108 with the server computer system 124 by assigning a unique user identifier to each of the verifiers 108 (e.g., a blockchain identifier, account identifier). The registration module 304 may be further configured to create an account profile and activity records for the plurality of registered verifiers 108. The registration module 304 may also be configured to associate the registered verifiers' activity records with the verifiers' identification data (e.g., unique user identifiers, account identifiers, public keys, blockchain identifiers, biometric data) and store in database 312. The registration module 304 may also be configured to list verifiers' activity records under the respective account profiles of verifiers 108.

The registration module 304 may also be configured to register a plurality of sites 128 with the server computer system 124 by assigning a unique user identifier (e.g., a blockchain identifier) to the plurality of the registered sites 128. The registration module 304 may be further configured to create an account profile and activity records for the plurality of the registered sites 128. The registration module 304 may also be configured to associate the registered sites' activity records with the sites' identification data (e.g., unique user identifiers, account identifiers, public keys, blockchain identifiers, biometric data) and store in database 312. The registration module 304 may also be configured to list sites' activity records under the respective account profiles of sites 128.

The registration module 304 may also be configured to register a plurality of advertisement service providers 126 with the server computer system 124 by assigning a unique user identifier to each of the advertisement service providers 126 (e.g., a blockchain identifier, account identifier). The registration module 304 may be further configured to create an account profile and activity records for the plurality of the registered advertisement service providers 126. The registration module 304 may also be configured to associate the registered advertisement service providers' activity records with the advertisement service providers' identification data (e.g., unique user identifiers, account identifiers, public keys, blockchain identifiers, biometric data) and store in the database 312. The registration module 304 may also be configured to list advertisement service providers' activity records under the respective account profiles of advertisement service providers 126.

In other embodiments where a blockchain may be utilized, the registration module 304 may also be configured to assign a blockchain identifier, a user identifier, and/or a public key to each of the users 102, partners 104, distributors 106, verifiers 108, sites 128, and/or advertisement service providers 126 after they register or join the network to access the distributed ledger.

In some embodiments, the registration module 304 may also be configured to create points, currency, cryptocurrency, and/or credit records or ownership records associated with the accounts and/or with the identification data (e.g., biometric data, account identifiers, blockchain identifiers, public keys) of the plurality of users 102, partners 104, distributors 106, verifiers 108, and/or advertisement service providers 126.

In some embodiments, the registration module 304 may also be configured to enable each of the users 102, partners 104, distributors 106, verifiers 108, and/or advertisement service providers 126 to register the user devices 110, partner devices 112, distributor devices 114, verifier devices 116, and/or advertisement service provider devices 127, respectively with the server computer system 124 to access the server computer system 124. The registration module 304 may also be configured to enable each of the partners 104 to register one or more point of service systems 118 with the server computer system 124 to access the server computer system 124. The registration module 304 may also be configured to enable one or more verifiers 108 to register one or more sites 128 and site devices 129 of a partner of the partners 104 with the server computer system 124 to access the server computer system 124. In some embodiments, the registration module 304 may also be configured to register the devices associated with the sites 128, users 102, partners 104, distributors 106, verifiers 108, and/or advertisement service providers 126 during the registration of each of the sites 128, users 102, partners 104, distributors 106, verifiers 108, and/or advertisement service providers 126 with the server computer system 124.

The transceiving module 306 may be configured to receive data from one or more devices of at least one of the registered users 102 in real-time including but not limited to identification data (e.g., biometric information, credential information, geographical location data, device PUFs, device identification information, account identifiers, a name of a user, a user address, passport number, taxpayer identification number, telephone number, e-mail address, password, username, and/or the like), information relating to one or more environmental activities (e.g., information on home energy, transportation, waste, food, shopping, and/or the like) carried out (e.g., purchased, used, or completed) by the registered users 102 before becoming registered users, and to assign each of the environmental activities an identification number.

The transceiving module 306 may also be configured to receive data from one or more devices of at least one of the registered verifiers 108 in real-time, the data may include but not limited to identification data (e.g., biometric information, credential information, geographical location data, device PUFs, device identification information, account identifiers, a name of a verifier, a verifier address, other information (e.g., passport number, taxpayer identification number, telephone number, e-mail address, password, verifier username, and/or the like) and information about one or more verification activities (e.g., verification of environmental product declarations, determination of the environmental impact of environmental activities) carried out by the one or more registered verifiers 108 before becoming registered verifiers 108, and to assign each of the verification activities an identification number, the verification activities' information may include but not limited to information on one or more environmental product declarations verified by the one or more registered verifiers 108, geographical locations where the environmental product declarations were verified, and/or other information.

In some embodiments, the transceiving module 306 may further be configured to receive at least one verification activity data comprising one or more data records from at least one of the verifier devices 116 in real-time. The verification activity data may include data relating to one or more verification activities (e.g., verification and/or creation of environmental product declarations, determination of the environmental impact of environmental activities, and/or environmental impact of environmental law violations) carried out by the one or more registered verifiers 108. The data for each verification activity transmitted by each of verifier devices 116 may include, but not limited to one or more verifiers', partners' and/or distributors identification data (e.g., unique user identifiers, account identifiers, biometric information, credential information, geographical location data, device PUFs, device identification information, account identifiers, blockchain identifier, public keys), information on the verification activity transmitted (e.g., geographic location where the verification activity was transmitted), and information on the verification and/or creation of environmental product declarations, and data relating to the determination of the environmental impact of environmental activities, and environmental law violations. The information on the creation and verification of an environmental product declaration may include but is not limited to data collected by the verifiers 108, data provided by the verifiers 108 relating to the verification, or creation of the environmental product declaration, and/or life-cycle inventory data. In some embodiments, the transceiving module 306 may be configured to receive data from one or more devices of at least one of the partners 104, and/or from an external system, the data relating to the life cycle assessment (e.g., life cycle inventory data) of product or service to the server computer system 124, the received data may be stored in the database of the server computer system 124. In some embodiments, the transceiving module 306 may further be configured to assign each of the received data or data records an identification number.

The transceiving module 306 may also be configured to receive data relating to environmental activities (e.g., products and/or services) carried out (e.g., purchased, used, or completed) by one or more registered users 102 from one or more point of service systems 118 of one or more registered partners 104 in real-time; each of the registered users 102 may enter or provide the point of service systems 118 with users' identification data (e.g., unique user identifiers, account identifiers, biometric information, credential information, geographical location data, device PUFs, device identification information, account identifiers, blockchain identifier, public keys) so as to access the one or more registered users' accounts and/or environmental activity records; the point of service systems 118 may be configured to communicate with the server computer system 124 to authenticate the one or more registered users 102, wherein the server computer system 124 may verify the identification data of the one or more registered users 102 and confirm that the one or more environmental activities were carried out by the users 102. The transceiving module 306 may further be configured to assign each of the received data data or records an identification number.

In some embodiments, the transceiving module 306 may further be configured to receive at least one environmental activity data or record from one or more devices of at least one of the plurality of partners 104, and distributors 106 in real-time. The environmental activity data or record may comprise data relating to one or more environmental activities (e.g., products and/or services) offered by one or more partners 104, one or more environmental activities (e.g., products and/or services) distributed to one or more partners 104 by one or more distributors 106, and one or more environmental activities (e.g., products and/or services) used by one or more distributors 106 to distribute one or more environmental activities (e.g., products and/or services) to one or more partners 104. The data for each environmental activity transmitted by each of the partners 104 may include, but not limited to partners' identification data (e.g., partners' unique user identifiers, partners' account identifiers, biometric information, credential information, geographical location data, device PUFs, device identification information, account identifiers, blockchain identifier, public keys) and information on the environmental activity transmitted including but not limited to, the geographic location where the environmental activity was transmitted, information on the environmental activities (e.g., products and/or services) that partners 104 want to offer to the users 102, information relating to a request for creating an environmental product declaration for the environmental activities (e.g., products and/or services) offered by the partners 104 and/or an environmental product declaration. The transceiving module 306 may further be configured to assign each of the received data records an identification number.

In some embodiments, the data for each environmental activity transmitted by each of the partners 104 may include information relating to a request for creating an environmental product declaration for the environmental activities (e.g., products and/or services) from at least one of the plurality of partners 104 in real-time.

In some embodiments, the transceiving module 306 may further be configured to receive at least one environmental activity data or record from one or more devices of at least one of the plurality of partners 104 in real-time. The environmental activity record may include data relating to one or more environmental law violations reported by one or more partners 104. The data for each environmental law violation transmitted by each of the partners 104 may include, but not limited to users', partners', distributors', advertisement service providers', and/or verifiers' identification data (e.g., unique user identifiers, account identifiers, biometric information, credential information, geographical location data, device PUFs, device identification information, account identifiers, blockchain identifier, public keys) and information on the environmental law violation transmitted including but not limited to, the geographic location where the environmental law violation was transmitted, taxpayer identification number, name (e.g., the names of users 102, partners 104, distributors 106, advertisement service providers 126, and/or verifiers 108 who violated the law), and/or address. The transceiving module 306 may further be configured to assign each of the received data records an identification number.

In some embodiments, the transceiving module 306 may further be configured to receive at least one advertisement service data record and/or at least one advertisement service transactions data record from one or more devices of at least one of the advertisement service providers 126 in real-time. The data for each advertisement service may include, but not limited to users' 102, partners' 104, distributors' 106, verifiers' 108, and/or advertisement service providers' 126 identification data (e.g., unique user identifiers, account identifiers, biometric information, credential information, geographical location data, device PUFs, device identification information, account identifiers, blockchain identifier, public keys) and information on the advertisement activities data (e.g., information on the advertisement service requests or orders, information on the time, type, number, cost, and/or content details of advertisements). The data for each advertisement service transaction may include, but not limited to users' 102, partners' 104, distributors' 106, verifiers' 108, and/or advertisement service providers' 126 identification data (e.g., unique user identifiers, account identifiers, biometric data, blockchain identifier, public keys) and information on the deposits, and/or transfers of credits cryptocurrency, and/or currencies relating to the advertisement service and associated with the users 102, partners 104, distributors 106, verifiers 108, advertisement service providers 126, and/or the server computer system 124. The transceiving module 306 may further be configured to assign each of the received data records an identification number.

In some embodiments, the transceiving module 306 may further be configured to receive one or more site activity data or data records relating to one or more sites 128 from one or more site devices 129 in real-time. The data or data record for each site activity may include, but not limited to identification data (e.g., site images, videos and or live videos information, credential information, geographical location data, device PUFs, device identification information, account identifiers, blockchain identifier, public keys) of a partner of the partners 104, and/or one or more verifiers 108, identification data (e.g., site images, videos, and/or live videos, blockchain identifier, public keys) of a site of the sites 128, data (e.g., life cycle inventory data) including but not limited to onsite operations data, onsite material consumption data, onsite emissions data, onsite energy consumption data, and/or onsite waste data of one or more products and/or services of a partner of the partners 104 collected by the site device of the site devices 129, geographical location data (e.g., GPS/AGPS coordinates) of the site device 129, and/or other data.

In some embodiments, the transceiving module 306 may further be configured to receive one or more request identifiers from one or more devices of at least one of the users 102, partners 104, distributors 106, verifiers 108, and/or advertisement service providers 126 to access the server computer system 124, wherein each of the request identifiers may be sent from each of the user devices 110, partner devices 112, distributor devices 114, verifier devices 116, and/or advertisement service provider devices 127; receive one or more request identifiers from one or more devices of at least one of the verifiers 108, wherein each of the request identifiers may be sent from each of the site devices 129; and receive one or more request identifiers from one or more devices of at least one of the partners 104, wherein each of the request identifiers may be sent from each of the point of service systems 118 of the partners, wherein the received data may be received in real time.

In some embodiments, the transceiving module 306 may further be configured to receive one or more data or data records comprising biometric information (e.g., face images) of each of the users 102, partners 104, distributors 106, verifiers 108, and/or advertisement service providers 126 acquired by the one or more sensors (e.g., CMOS and CCD sensors) of the user devices 110, partner devices 112, distributor devices 114, verifier devices 116, and/or advertisement service provider devices 127, wherein the received data may be received in real time. The server computer system 124 may also receive data or one or more data records comprising site images, videos, and/or live videos of each of the sites 128 acquired by the one or more sensors (e.g., CMOS and CCD sensors) of the one or more site devices 129, wherein the received data may be received in real time.

In some embodiments, the transceiving module 306 may further be configured to receive data or one or more data records comprising one or more unique device identifiers (e.g., CMOS sensor physical unclonable functions) of each of the site devices 129, point of service systems 118, user devices 110, partner devices 112, distributor devices 114, verifier devices 116, and/or advertisement service provider devices 127, wherein the received data may be received in real time.

In some embodiments, the transceiving module 306 may further be configured to receive data or one or more data records comprising identification data (e.g., blockchain identifiers, public keys, and/or the like) of each of the sites 128, users 102, partners 104, distributors 106, verifiers 108, and/or advertisement service providers 126, wherein the received data may be received in real time.

In some embodiments, the transceiving module 306 may further be configured to receive data or one or more data records comprising the geographical location data (e.g., GPS/AGPS coordinates) of the site devices 129, point of service systems 118, user devices 110, partner devices 112, distributor devices 114, verifier devices 116, and/or advertisement service provider devices 127 acquired by the GPS/AGPS sensors of their associated devices in real time, wherein the received data may be received in real time. In some embodiments, the transceiving module 306 may further be configured to receive data or one or more data records comprising user credential information (e.g., user name, password, personal identification number (PIN), key, and the like), wherein the received data may be received in real time.

In some embodiments, the transceiving module 306 may further be configured to receive device identification information from the one or more site devices 129, point of service systems 118, user devices 110, partner devices 112, distributor devices 114, verifier devices 116, and/or advertisement service provider devices 127. The device identification information may be one or more pieces of information that uniquely identify each of the devices. The device identification information may include but are not limited to operating system version, operating system manufacturer, information about the communications interface 408, a memory 404, a processor 406, a storage component 402, an input component 414, an output component 412, and a communications infrastructure 410 of the site devices 129, point of service systems 118, user devices 110, partner devices 112, distributor devices 114, verifier devices 116, and/or advertisement service provider devices 127, and operating system name. Those of ordinary skill in the art will recognize that other forms of device identification information may be substituted herein as part of the provision of the device identification information to the server computer system 124.

In some embodiments, the processing module 310 may be configured to receive device identification information from the one or more site devices 129, point of service systems 118, user devices 110, partner devices 112, distributor devices 114, verifier devices 116, and/or advertisement service provider devices 127. The device identification information may be one or more pieces of information that uniquely identify each of the devices. The device identification information may include but are not limited to operating system version, operating system manufacturer, information about the communications interface 408, a memory 404, a processor 406, a storage component 402, an input component 414, an output component 412, and a communications infrastructure 410 of the site devices 129, point of service systems 118, user devices 110, partner devices 112, distributor devices 114, verifier devices 116, and/or advertisement service provider devices 127, and operating system name. Those of ordinary skill in the art will recognize that other forms of device identification information may be substituted herein as part of the provision of the device identification information to the server computer system 124. In such cases, a combination of user, device PUF, user device identification information, and the geolocation data or the geographical location data (e.g., GPS/AGPS coordinates) may represent the four-factor authentication method. In some embodiments, the combinations may also comprise other user credential information (e.g., user name, password, personal identification number (PIN), key, and the like) to be user, user credential information, device PUF, device identification information, and the geographical location data (e.g., GPS/AGPS coordinates) to represent a five-factor authentication method.

The verification module 308 may be configured to verify the received data and/or information comprising environmental activities data (e.g., information on home energy, transportation, waste, food, shopping, and/or the like) carried out (e.g., purchased, used, or completed) by the registered users 102 before and/or after becoming registered users and to assign each of the environmental activities an identification number. In some embodiments, the verification module 308 may be configured to verify the received data and/or information by communicating with one or more point of service systems 118 of a registered partners 104, one or more devices 400 of a registered partners 104, and/or one or more devices 400 of unregistered entities, wherein the received data may comprise the respective account identifiers of one or more users 102, partners 104, distributor 106, and/or other identification data (e.g., unique user identifiers, biometric data or biometric information, blockchain identifier, public keys, name, address, and/or other identification data) that may be used in communications exchanged therewith for the verification process.

In some embodiments, the verification module 308 may also be configured to verify each environmental product declaration associated with an environmental activity (e.g., product and/or service) offered by each of the partners 104 by communicating with one or more devices 400 of one or more registered partners 104 and/or external systems of unregistered entities (e.g., program operators). The verification module 308 may also be configured to mark each verified environmental activity.

In some embodiments, the verification module 308 may further be configured to communicate with one or more devices 400 of registered partners 104 and/or one or more external systems of unregistered entities to verify an environmental law violation of one more partners 104, distributors 106, and/or users 102, wherein the respective account identifiers of one or more users 102, partners 104, distributor 106, and/or other identification data may be used in communications exchanged therewith for the verification of the environmental product declarations and/or environmental law violations. Governmental entities, consumer reporting agencies, Environmental Product Declaration program operators, and other entities may act as partners 104.

In embodiments where a blockchain may be utilized, the verification module 308 may be configured to communicate with one or more external identity management systems and/or systems that utilize cryptographic techniques including but not limited to zero-knowledge proof or zero-knowledge protocol (e.g., uPort, and the like) to verify the identity of one or more users 102, partners 104, distributors 106, verifiers 108, and/or advertisement service providers 126. For example, a smart contract library may confirm users' 102, partners' 104, distributors' 106, verifiers' 108, and/or advertisement service providers' 126 identities through one or more external identity management systems and/or systems that utilize cryptographic techniques including but not limited to zero-knowledge proof or zero-knowledge protocol (e.g., uPort, and the like) and/or by reference to a database.

In some embodiments, the verification module 308 may be configured to verify the verifiers 108 by automatically calling the verifier over the phone and preferably recording the call and/or sending the verifiers 108 text messages and providing the verifiers 108 with instructions for identity verification, where the verification may be done during the examination (while the verifiers 108 take the examination).

The processing module 310 may be configured to assign one or more verifiers 108 to determine the estimated environmental impact of each environmental law violations based on its environmental impact. In some embodiments, the processing module 310 may also be configured to credit one or more verifiers' 108 accounts with currency, cryptocurrency, points, and/or credits for determining the estimated environmental impact of each environmental law violations.

In some embodiments, where environmental activities (e.g., products and/or services) may not be associated with a verified environmental product declaration that is previously verified by a verifier of the verifiers 108, the processing module 310 may be configured to assign a verifier of the verifiers 108 to determine the estimated environmental impact of each environmental activity of user's environmental activities carried out (e.g., purchased, used, or completed) by the user before becoming a registered user. In some embodiments, where the environmental product declaration is previously verified by a verifier of the verifiers 108 and associated with a partner of the partners 104, the processing module 310 may be configured to determine the environmental impact of each activity of the user's environmental activities (e.g., products and/or services) carried out (e.g., purchased, used, or completed) by the user before becoming a registered user based on the information mentioned in the verified environmental product declaration of the environmental activity.

In some embodiments, the processing module 310 may be configured to credit the accounts of users 102, partners 104, distributors 106, verifiers 108, and/or advertisement service providers 126 with points, currency, cryptocurrency, and/or credits and may be configured to allow or enable one or more users 102, partners 104, distributors 106, verifiers 108, and/or advertisement service providers 126 to transfer the ownership records of points, currency, cryptocurrency and/or credits associated with their accounts to each other or to an external system. In some embodiments, the processing module 310 may be configured to allow or enable the users 102 to deposit, and/or exchange the points, currency, cryptocurrency, and/or credits (e.g., exchange the points to any form of currency fiat currency, electronic currency, and/or cryptocurrency). In some embodiments, the processing module 310 may be configured to communicate with third-party systems (e.g., currency, cryptocurrency exchange platforms, or systems) to deposit, transfer, and/or exchange the points, currency, cryptocurrency, and/or credits.

In embodiments where a blockchain may be utilized, the processing module 310 may be configured to transfer the ownership records for points, currency, cryptocurrency, and/or credits with a process similar to the transfer of currency in a block-chain based cryptocurrency system. In some embodiments where a blockchain may be utilized, the distributed ledger may comprise a side chain of a cryptocurrency blockchain or a standalone ledger.

In some embodiments, the processing module 310 may be configured to allow or enable one or more verifiers 108 to determine a service unit (usage unit) for each service offered by a partner of the partners 104 based on its category and/or the information mentioned in the environmental product declaration of the service. For example, transportation companies as partners 104 of the environmental credit scoring system 124 may offer the use of electric vehicles to the users 102 (as transportation service); a point of service system 118 may be configured to collect and transmit information (e.g., the pickup point, distance, and/or drop off point) to the environmental credit scoring system; the processing module 310 may be configured to allow or enable one or more verifiers 108 to determine a service unit (usage unit) for the transportation service (e.g., one hour of using the service or per mile); the processing module 310 may be configured to credit users' accounts with the service units (usage units) for any verified service carried out (e.g., purchased, used, or completed) by a user of the users 102; the processing module 310 may be configured to use the service unites to award the users 102 with cryptocurrency, currency, points, or any other rewards.

In some embodiments, the processing module 310 may be configured to calculate using one or more algorithms users' 102 environmental credit scores using the service units (usage units) associated with their accounts. In some embodiments, the processing module 310 may be configured to determine using one or more algorithms the number (e.g., the maximum or the minimum number of units) of service units, points, cryptocurrencies, any other rewards that should be credited under the users' 102 accounts.

In some embodiments, the processing module 310 may be configured to suggest or recommend one or more environmental activities (e.g., products and/or services) to the registered users 102 based on factors including but not limited to the environmental impact of users' 102 environmental activities (e.g., products and/or services) carried out (e.g., purchased, used, or completed) before or after being registered users. The recommended or suggested environmental activities (e.g., products and/or services) may be aimed to reduce the environmental impact of the users' environmental activities. The processing module 310 may also be configured to assign or credit users' accounts with points and/or credits after carrying out (e.g., purchasing, using, or completing) the recommended or suggested environmental activities (e.g., products and/or services). The processing module 310 may also be configured to use the points credited under users' 102 accounts and other factors to calculate the users' 102 environmental credit scores. The processing module 310 may also be configured to determine the number of points that should be assigned for each environmental activity carried out by a user of the users 102 based on the score of the environmental product declaration of the environmental activity (e.g., products and/or services).

In some embodiments, the processing module 310 may be configured to determine using one or more algorithms, machine learning, and/or a trained neural network by means of deep learning users' habits and/or behavior (e.g., environmentally friendly habits) and recommend or suggest environmental activities (e.g., products and/or services) to the users 102. The processing module 310 may also be configured to determine using machine learning and/or a trained neural network by means of deep learning users' habits and/or behavior by using the relationship between users' decisions to carry out environmental activities and the users' interaction with the server computer system 124 (e.g., type of environmental activities they carry out, time of carrying out environmental activities, geographical locations of environmental activities, and the cost of carrying out the environmental activities), information about users' activities collected from external sources (e.g., data management platforms), and other factors.

By way of non-limiting example, the processing module 310 may be configured to suggest or recommend to a user of the users 102 the use of renewable electricity, the use of specific electric vehicles, the use of any other environmentally friendly products and/or services offered by a registered partner 104 or an unregistered entity. In some embodiments, the processing module 310 may be configured to calculate users' 102 environmental credit scores based on the environmental impact of users' environmental activities before being registered users 102, the environmental activities suggested or recommended by the server computer system 124 and carried out (e.g., participated in, purchased, used, or completed) by the users 102 after being registered users. The processing module 310 may be configured to store the information on environmental activities carried out by a user of the users 102 before being a registered user and the information collected from the user during or after the registration process in the users' records in the database of the server computer system 124 and list the information under the respective account profiles of the users 102, partners 104 and/or distributors 106.

In some embodiments, the processing module 310 may be configured to calculate points and/or credits based on the environmental impact of users' environmental activities before being registered users 102, the environmental activities suggested or recommended by the server computer system 124 and carried out (e.g., participated, purchased, used, or completed) by the users 102 after being registered and to credit the users' accounts with credits, points, and/or cryptocurrency that may be spent and/or exchanged by the users 102.

In some embodiments, the processing module 310 may be configured to allow or enable the users 102 to purchase one or more services offered by the partners 104, distributors 106, and/or an unregistered entity using points and/or credits associated with users' accounts. For example, users 102 may provide the partners 104 with the users' identification data (e.g., unique user identifiers, account identifiers, blockchain identifiers, biometric data or biometric information, public keys) and complete a verification process through the point of service systems 118 of the partners 104, partner devices 112, and/or systems associated with the partners 104; the point of service systems 118, partner devices 112, and/or system associated with the partners 104 may be configured to communicate with the server computer system 124 verify the identification data of the users 102, and/or to check the number of points, credits, amount of currency, cryptocurrency, points, and/or credits associated to the users 102 by communicating with the server computer system 124 and to transfer the required currency, points and/or credits from users' 102 accounts to partners' 104 accounts as proof of purchase.

In some embodiments, the processing module 310 may be configured to store the calculated points or credits of the users 102 and its associated transactions in the database of the server computer system 124 and to list the information on the points or credits and its associated transactions under the respective account profiles of the users 102, partners 104, and/or distributors 106. In some embodiments, the processing module 310 may be configured to store the calculated points or credits of the users in a remote database and/or a distributed database.

In embodiments where a blockchain may be utilized, the processing module 310 may be configured to transfer the ownership records for points, currency, and/or credits, with a process similar to the transfer of currency in a block-chain based cryptocurrency system. For example, the processing module 310 may be configured to transfer the ownership records for the points and/or credits from users' 102 accounts to partners' 104 accounts as proof of purchase when the users 102 get or purchase products and/or services offered by the partners 104. In some embodiments where a blockchain may be utilized, the distributed ledger may comprise a side chain of a cryptocurrency blockchain or a standalone ledger.

In some embodiments, the processing module 310 may be configured to enable the partners 104 who want to offer, resell, and/or distribute to the users 102 one or more environmental activities (e.g., products and/or services) owned or produced by other partners 104 (original owners/producers of the environmental activities) to search partners' (original owners/producers of the environmental activities) environmental activities using environmental activities' identification data (e.g., identification number of the partners' environmental activities, environmental product declaration registration numbers, or identification numbers, partners' unique user identifiers, partners' public keys, and/or other identification data) using an option such as through a website and/or a mobile application hosted by or associated with the server computer system 124. The processing module 310 may be further configured to allow or enable the partners 124 to certify and/or request that they want to offer, resell, and/or distribute the same environmental activities (e.g., products and/or services) to the users 102. In some embodiments, the processing module 310 may be further configured to allow or enable the partners 104 (original owners/producers of the environmental activities) to approve or reject the request of allowing or to enable the partners 104 to offer, resell, and/or distribute the environmental activities to the users 102. The processing module 310 may be further configured to list the environmental activities under the environmental activity records of the partners 104 who requested to offer, resell, and/or distribute the environmental activities to the users 102.

In some embodiments, the processing module 310 may also be configured to allow or enable the partners 104 who want to offer, resell and/or distribute to the users 102 one or more environmental activities (e.g., products and/or services) belong to other partners 104 (original owners/producers of the environmental activities) to choose from multiple categories of one or more environmental activities (e.g., products and/or services) listed under the environmental activities' records of the partners 104 (original owners/producers of the environmental activities) and certify and/or request that they want to offer or distribute the same environmental activities (e.g., products and/or services) to the users 102.

In some embodiments, the processing module 310 may also be configured to allow or enable partners 104 (original owners/producers of environmental activities) to provide the server computer system 124 with information about an approved list of partners 104 that may offer, resell, or distribute the environmental activities (e.g., products and/or services) owned or produced by the partners 104 (original owners/producers of the environmental activities). The information may include but is not limited to identification data (e.g., partners' unique user identifiers, and/or partners' public keys).

In some embodiments, the processing module 310 may be configured to enable one or more registered verifiers 108 to verify an environmental product declaration. The processing module 310 may also be configured to assign one or more verifiers 108 to verify an environmental product declaration, where the selection of the verifiers may be based on many factors including but not limited to the geographical locations of the registered verifiers and partners 104, the number of verification activities relating to environmental activities (e.g., products and/or services) of a partner of the partners 104 verified by each of the verifiers 108, and/or selected randomly from the verifiers 108 registered with the server computer system 124. In some embodiments, the processing module 310 may be configured to assign or more registered verifiers 108 to verify an environmental product declaration, where the verification may include but not limited to verifying the information presented in the environmental product declaration including verifying the life cycle assessment-based data (e.g., data relating to the life cycle assessments conducted according to the ISO 14040, ISO 14044, and/or any other ISO standards), verifying additional environmental information, and/or verifying other information.

In some embodiments, the processing module 310 may be configured to assign one or more registered verifiers 108 to collect using the verifier device 116 data relating to the inventory analysis step of the life cycle assessment conducted according to the ISO 14040 and ISO 14044 standards or any other standards. In embodiments where a blockchain may be utilized, the processing module 310 be configured to record or store any type of data (e.g., data received from the users 102, partners 104, distributors 106, verifies 108, advertisement service providers 126, and/or third-party systems) as a form of transaction that occurs in the network 120 (e.g., transfer of information or an exchange,) in a distributed database that maintains a continuously growing list of data records hardened against tampering and revision, the data records may be hardened against tampering and revision even by participating parties or operators who share the database.

In some embodiments, the processing module 310 may be configured to conduct an examination to measure the knowledge of the verifiers 108 on one or more topics before or after being registered with the server computer system 124 to carry out verification activities (e.g., verification of environmental product declarations, determination of the environmental impact of environmental activities), where each of the verifiers 108 may have to pass the examination.

In some embodiments, the processing module 310 may be configured to conduct an examination to measure the knowledge of the verifiers 108 on one or more topics by communicating with the verifiers 108 over the network 120 (e.g., internet). In some embodiments, the processing module 310 may be configured to enable the verifiers 108 to access the server computer system 124 to take the examination to measure the knowledge of the verifiers 108 on one or more topics using the verifier devices 116 that may be configured to communicate with the server computer system 124. In some embodiments, the verifier devices 116 may be configured to enable verifiers 108 to take the examination with video or live proctoring. In some embodiments where video proctoring may be used, the processing module 310 may be configured to record audio and/or videos and store in the database of the server computer system 124 to objectively judge the examination performance of each of the verifiers 108, where the processing module 310 may be configured to assign one or more verifiers 108 from the registered verifiers 108 after the verifiers 108 take the examination to review the verifiers' 108 audios, videos, and answers to objectively judge the examination performance of each of the verifiers 108.

In some embodiments where live proctoring may be used, the processing module 310 may be configured to assign one or more verifiers 108 from the registered verifiers 108 to monitor each of the verifiers 108 in real-time while the verifiers 108 take the examination. In some embodiments, the processing module 310 may be configured to schedule the examination for measuring the knowledge of the verifiers 108 on one or more topics, the processing module 310 may also be configured to enable each of the verifiers 108 to schedule the examination. In some embodiments, the processing module 310 may be configured to use one or more algorithms, machine learning, and/or a trained neural network by means of deep learning to judge the examination performance of each of the verifiers 108.

In some embodiments, the processing module 310 may be configured to enable and/or assign one or more registered verifiers 108 to conduct real-time sample collection, calculations, measurements, and/or analysis using the verifier devices 116 as a part of the verification process, where the sensors and/or devices associated with each of the verifier devices 116 may be utilized in the verification process.

In some embodiments, the processing module 310 may be configured to conduct an examination to measure the knowledge of the verifiers 108 on one or more topics, where the practical examination may include but not limited to conducting calculations, measurements, sample analysis, sample collection, and/or the like using the verifier devices 116, where the input component 414 (e.g., a sensor for sensing information such as an accelerometer, a gyroscope, an actuator, global positioning system (GPS) component, temperature measurement devices, speed measurement devices, etc.) of each of the verifier devices 116 may be utilized.

In some embodiments, the processing module 310 may be configured to enable one or more registered verifiers 108 to verify an environmental product declaration, where the verification may include but not limited to collecting data (e.g., onsite operations, inputs, and outputs from a specific site, measuring onsite material consumption, emissions, energy consumption, waste, etc.), taking pictures, scanning documents, verifying identities, measuring distances, determining geographical locations, collecting samples, analyzing samples, determining the chemical composition of the collected samples, measuring temperature, and/or the like using one or more verifier devices 116, where the input component 414 (e.g., a sensor for sensing information such as an accelerometer, a gyroscope, an actuator, global positioning system (GPS) component, temperature measurement devices, speed measurement devices, etc.) of each of the verifier devices 116 may be utilized during the verification of an environmental product declaration.

In some embodiments, the processing module 310 may be configured to enable one or more registered partners 104 to submit a request for creating an environmental product declaration for the environmental activities (e.g., products and/or services) they own, produce, and/or offer, and/or to submit a request for determining the environmental impact of environmental activities they own, produce, and/or offer. In some embodiments, the processing module 310 may enable one or more registered verifiers 108 to perform activities (e.g., verification of environmental product declarations, determination of the environmental impact of environmental activities).

In some embodiments, the processing module 310 may be configured to enable one or more registered verifiers 108 to review the information relating to verification activities (e.g., verification of environmental product declarations, determination of the environmental impact of environmental activities) carried out by each of the registered verifiers 108 to reach an agreement on the validity of the information provided by each of the registered verifiers 108 and decide or vote whether to accept or reject each piece of information provided by the verifiers 108, the processing module 310 may also be configured to determine the final decision relating to whether to accept or reject each piece of information relating to the verification activities conducted or carried out by each of the registered verifiers 108 based on the majority vote, where the processing module 310 may also be configured to assign other one or more verifiers 108 to reconduct the verification activities until at least 51% of the verifiers 108 vote yes to approve a decision before it is accepted. In some embodiments, the processing module 310 may be configured to use one or more algorithms, machine learning, and/or a trained neural network by means of deep learning in the process of reaching an agreement on the validity of each piece of information relating to the verification activities carried out by each of the registered verifiers 108. For example, one or more algorithms, machine learning, and/or a trained neural network by means of deep learning may be used to calculate and determine the majority vote.

In some embodiments, the processing module 310 may be configured to determine a specific time limit for each of the registered verifiers 108 to review the information relating to the verification activities carried out by each of the registered verifiers 108 and decide or vote whether to accept or reject each piece of information. The processing module 310 may also be configured to credit the accounts of the registered verifiers 108 with points, currency, and/or credits for each piece of information they review and decide.

In some embodiments, the processing module 310 may be configured to determine using one or more algorithms, machine learning, and/or a trained neural network by means of deep learning the validity of each piece of information relating to the verification activities carried out or conducted by each of the registered verifiers 108 including but not limited to taking pictures, scanning documents, verifying identities, energy measurements (e.g., electrical measurements), measuring distances, determining geographical locations, collecting samples, analyzing samples, determining the chemical composition of the collected samples, measuring temperature, and/or the like In some embodiments, the processing module 310 may be configured to determine using one or more algorithms, machine learning, and/or a trained neural network by means of deep learning the validity of each piece of information relating to the verification activities carried out or conducted by each of the registered verifiers 108, where processing module 310 may also be configured to utilize the relationship between the previous verification activities data (e.g., verification data of environmental product declarations, data relating to the determination of the environmental impact of environmental activities) carried out by one or more registered verifiers 108, and the life-cycle inventory data (e.g., the international ecoinvent database, the U.S. life cycle inventory database, European reference life cycle database (ELCD) database, GaBi database, and/or the like) in determining the validity of each piece of information relating to the verification activities carried out or conducted by each of the registered verifiers 108 by utilizing machine learning and/or a trained neural network by means of deep learning.

In some embodiments, the processing module 310 may be configured to enable the users 102 to carry out an environmental activity associated with a product and/or a service after the verification of the environmental product declaration associated with the product and or service is completed.

In some embodiments, the processing module 310 may be configured to enable one or more registered verifiers 108 to collect and transmit information to the server computer system 124 using one or more verifier devices 116, where one or more sensors and/or devices of each verifier device of the verifier devices 116 may be utilized in the process of collecting and transferring information to the server computer system 124. In some embodiments, the processing module 310 may be configured to communicate with a partner of the partners 104 and/or a third-party system to collect information or data (e.g., energy measurements, sample analysis, determination of the chemical composition of samples) relating to the verification activities (e.g., verification of environmental product declarations, determination of the environmental impact of environmental activities) carried out by a verifier of the verifiers 108.

In some embodiments, the processing module 310 may be configured to enable one or more registered partners 104 to submit a request for creating an environmental product declaration for one or more products and/or services they own, produce, and/or offer, where the processing module 310 may be configured to assign one or more verifiers 108 to create the environmental product declaration. In some embodiments, the processing module 310 may be configured to allow or enable the partners 104 to transfer service fee to the server computer system 124 for creating an environmental product declaration by using currency, cryptocurrency, points, and/or credits available in the partners' accounts. In some embodiments, the processing module 310 may be configured to assign one or more verifiers 108 to create an environmental product declaration for a product and/or a service of a partner of the partners 104, where the processing module 310 may be configured to enable the partners 104 to transfer currency, cryptocurrency, points, and/or credits to the accounts of one or more verifiers 108.

In some embodiments, the processing module 310 may be configured to compare the environmental product declarations based on the information included in the environmental product declarations, where the environmental product declarations may be verified by one or more verifiers 108, wherein the environmental product declarations may be based on the same product category rules, analyzed according to the same life cycle impact assessment method, modeled using the same data and/or system boundaries, functionally equivalent, and/or based on the same functional unit In some embodiments, the processing module 310 may be configured to allow or enable the verifiers 108 to follow guidelines or rules in the creation and/or verification of environmental product declarations of products and/or services. For example, to be comparable the environmental product declarations may be based on the same product category rules, analyzed according to the same life cycle impact assessment method, modeled using the same data and/or system boundaries, functionally equivalent, and/or based on the same functional unit.

In some embodiments, the processing module 310 may be configured to anonymize the verifiers' 108 identification data and any information that makes the verifiers recognizable in a piece of information and/or in an environmental product declaration and to forward the information and/or the environmental product declaration verified by the verifiers 108 to one or more verifiers to review or re-verify the information and/or the environmental product declaration, where the processing module 310 may also be configured to enable the verifiers 108 to decide to accept or reject each piece of information verified by other verifiers 108 and to comment, and rate (e.g., on a scale from 1-10) the validity of the verified information. In some embodiments, the processing module 310 may also be configured to continue assigning one or more verifiers 108 to re-review or re-verify the verified information and decide to accept or reject each piece of information, comment, and/or rate the validity of verified information until at least 51% of the verifiers 108 vote yes to approve a decision on the validity of the verified information provided before it is accepted by the processing module 310. The processing module 310 may also be configured to allow or enable the verifiers to determine if specific information in the environmental product declaration is required to be accurate or within a specific range of accuracy.

In some embodiments, the processing module 310 may also be configured to allow or enable the registered verifiers 108 to propose and/or set guidelines or rules relating to the creation and/or verification of the environmental product declaration (e.g., data collection strategies or rules, verification rules), where the final decision of whether to accept or reject the guidelines or rules may be taken based on the majority vote, where at least 51% of the verifiers 108 vote yes to approve the guidelines or rules before it is accepted by the processing module 310. The processing module 310 may also be configured to use one or more algorithms to determine the majority vote.

The processing module 310 may be configured to calculate using one or more algorithms a score for each verified environmental activity such as a product and/or a service offered by each of the partners 104 by comparing the verified environmental product declarations of the products and services stored in the database of the server computer system 124 based on the information included in the verified environmental products, where guidelines or rules (e.g., the environmental product declarations may have the same system boundaries, created using the same life cycle impact method, and product category rules) may be used in the creation and/or verification of environmental product declarations of products and/or services to enable comparability between the environmental product declarations to determine the environmental product declaration that has the lowest environmental impact; calculate using one or more algorithms a score for each verified environmental activity such as a product and/or a service used by the one or more distributors 106 to distribute environmental activities to the one or more partners 104, and/or unregistered entities based on the information included in the verified environmental product declaration of the product and/or a service and the information included in the verified environmental product declarations of the products and/or services used by other distributors to distribute environmental activities, where guidelines or rules (e.g., the environmental product declarations may have the same system boundaries, created using the same life cycle impact method, and product category rules) may be used in the creation and/or verification of environmental product declarations of products and/or services to enable comparability between the environmental product declarations to determine the environmental product declaration that has the lowest environmental impact; and calculate using one or more algorithms a score for each verified environmental law violation reported by the one or more partners 104 based on the environmental impact of each environmental law violation.

In some embodiments, the processing module 310 may be configured to penalize (e.g., by not sending verification requests) the verifiers 108 for providing decisions (e.g., misleading verification decisions) that are not accepted by the majority of the other verifies 108 and/or not in agreement with the decisions relating to the verification activities determined by the one or more algorithms, machine learning, and/or a trained neural network by means of deep learning. The processing module 310 may also be configured to reward (e.g., by sending verification requests, and/or sending currency, cryptocurrency, points, and/or credits) verifiers 108 who accept more assignments and provide decisions accepted by the majority of verifiers and/or in an agreement with the decisions relating to the verification activities determined by the processing module 310.

In some embodiments, the processing module 310 may also be configured to calculate, using one or more algorithms users' environmental credit scores based on the environmental activity data credited under the records of the users 102 by considering factors including but not limited to (a) the number and score of the environmental product declarations of the environmental activities (e.g., product and/or service) carried out (e.g., purchased, used, or completed) by the users 102, (b) the number and score of the environmental activities (e.g., products and/or services) suggested or recommended by the server computer system 124 to the users 102 and carried out (e.g., purchased, used, or completed) by the users 102, (e) the number and score of environmental law violations, (f) the geographical area where the users are located, and/or (g) the product and/or service category (e.g., the product and/or service category obtained from the environmental product declaration).

In some embodiments, the processing module 310 may also be configured to calculate users' 102, partners 104, and/or distributors 106 environmental credit scores after every environmental activity credited in the environmental activity records of the one or more users 102 partners 104, and/or distributors 106, or at regular intervals or based on a request from the one or more users 102 partners 104, and/or distributors 106.

In an embodiment, the processing module 310 may also be configured to calculate, using one or more algorithms partners' 104 environmental credit scores based on factors including but not limited to (a) the score and number of the verified environmental product declarations of products and/or services offered by the partners 104, (b) the score and number of verified environmental law violations of the partners 104, and (c) the number of partners' 104 responses to the suggestions of the processing module 310.

In an embodiment, the processing module 310 may also be configured to calculate, using one or more algorithms distributors' 106 environmental credit scores based on factors including but not limited to (a) the score and number of verified the environmental product declarations of products and/or services used by the distributors 106, (b) the score and number of the environmental law violations of the distributors 106, and (c) the number of distributors' 106 responses to the suggestions of the processing module 310.

Further, the processing module 310 may also be configured to match the environmental activity records associated with the identification data (e.g., unique user identifiers, biometric data, blockchain identifier, and/or public keys) of the one or more distributors 106, users 102, and partners 104 to identify the environmental activity records and to credit the respective environmental activity records of the one or more distributors 106, users 102, and partners 104 based on the information on the environmental activities (e.g., products and/or services) carried out (e.g., purchased, used, or completed) by the one or more users 102.

In an embodiment, the processing module 310 may be further configured to enable users 102 to search for an environmental activity such as a product and/or a service offered by one or more partners 104 in a specific or any geographical location. The environmental activities may be displayed 102 based on factors including but not limited to the score of the environmental product declaration of each of the environmental activities and the verified geographical location of the users 102, and/or environmental activities offered by one or more partners 104, wherein the verified geographical location of the users 102 and partners 104 may be determined by the server computer system 124. In some embodiments, the environmental activities with high scores may be given the priority to be promoted to the users 102.

In an embodiment, the processing module 310 may also be configured to display the environmental activities (e.g., products and/or service) to the users 102 based on the score and verification status of the environmental product declaration of each environmental activity (e.g., product and/or service), wherein the environmental activities with a high score and/or verified environmental product declaration may be displayed first to the one or more users 102.

In some embodiments, the processing module 310 may also be configured to credit the accounts of one or more users 102 with points, credits, and/or cryptocurrency after they carry out (e.g., participate in, purchase, use, or complete) environmental activities (e.g., products and/or services), where the number of points, credits, and/or cryptocurrency credited into users' accounts may be based on the score of the environmental product declaration of the products or services carried out by the users 102. The processing module 310 may also be configured to mark and reward the one or more partners 104 and distributors 106 with high environmental credit scores with marks, signs, symbols, and/or any other benefits. The environmental credit score of the partners 104 and distributors 106 may be used in areas including, but not limited to decisions by the government towards companies and towards any other entities.

The processing module 310 may be configured to suggest environmental activities (e.g., products, and/or services) to each of the users 102 based on the location of the environmental activities of one or more partners from each of the users 102 and based on the score of the environmental product declaration of the environmental activities. The processing module 310 may also be configured to allow or enable the users 102 to search for an environmental activity such as a product and/or a service offered by one or more partners 104 to the users 102 in a geographical location through a website hosted by or associated with the server computer system 124 and/or through a mobile application.

The processing module 310 may be configured to determine the geographical location of one or more registered devices requesting a geographical location (e.g., user devices 110, partner devices 112, distributor devices 114, verifier devices 116, advertisement service provider devices 127, point of service systems 118 and site devices 129) by determining the distance between the one or more devices requesting a geographical location and one or more static and/or dynamic registered devices (e.g., user devices 110, partner devices 112, distributor devices 114, verifier devices 116, advertisement service provider devices 127, point of service systems 118 and site devices 129) with synchronized clocks (synchronized time) by determining the time each of the devices with synchronized time takes to receive a request from the one or more registered devices requesting a geographical location, wherein the geographical location data of the one or more registered devices requesting a geographical location may be stored on the database of the database 312 of the server computer system 124, wherein the one or more registered devices requesting a geographical location are located within the network coverage area of one or more registered devices with synchronized time, wherein the one or more registered devices with synchronized time and the one or more registered devices requesting a geographical location may be configured to communicate via short range wireless network that may be one of a Bluetooth wireless, Bluetooth low energy and/or near-field communication network, wherein the one or more registered devices with synchronized time and the one or more registered devices requesting a geographical location may be configured to communicate with the wireless or mobile carriers or wireless service providers and the server computer system 124, wherein the geographical location data may be obtained periodically, intermittently, or continuously and stored in the database 312 of the server computer system 124.

In some embodiments, the processing module 310 may be configured to verify the geographical location data of one or more user devices 110, partner devices 112, distributor devices 114, verifier devices 116, advertisement service provider devices 127, point of service systems 118 and site devices 129 by comparing using one or more algorithms the received real time geographical location data of the one or more user devices 110, partner devices 112, distributor devices 114, verifier devices 116, advertisement service provider devices 127, point of service systems 118 and site devices 129 acquired by their associated GPS/AGPS to the geographical location data obtained from the wireless or mobile carriers, or wireless service providers, and/or the geographical location determined by the processing module 310 to determine if their current geographical location data acquired by their associated GPS/AGPS sensors matches or substantially matches the geographical location data obtained from the wireless or mobile carriers, or wireless service providers, and/or the geographical location data determined by the processing module 310, wherein the devices may be configured to communicate with the wireless or mobile carriers, or wireless service providers and communicate with each other via short range wireless network that may be one of a Bluetooth wireless, Bluetooth low energy and/or near-field communication network, wherein the devices are located within the network coverage area of one or more registered devices with synchronized time. In some embodiments, the geographical location data of a registered device may be verified if the geographical location data determined by the processing module 310, and/or the geographical location data obtained from the wireless or mobile carriers, or wireless service providers match or substantially match the real time geographical location data of the registered device acquired by its associated GPS/AGPS sensors or if the three geographical locations are within a pre-defined distance from each other.

In some embodiments, the processing module 310 may be configured to compare using one or more algorithms the received real time geographical location data of the one or more user devices 110, partner devices 112, distributor devices 114, verifier devices 116, advertisement service provider devices 127, point of service systems 118 and site devices 129 acquired by their associated GPS/AGPS sensors prior to enrolling or registering them or prior to authenticating them with the server computer system 124 to the geographical location data obtained from the wireless or mobile carriers, or wireless service providers, and/or geographical location determined by the processing module 310 to determine if their current location acquired by their associated GPS/AGPS sensors matches or substantially matches the location obtained from the wireless or mobile carriers, or wireless service providers, and/or the geographical location determined by the processing module 310, wherein the devices may be configured to communicate with the wireless or mobile carriers, or wireless service providers and communicate with each other via short range wireless network that may be one of a Bluetooth wireless, Bluetooth low energy and/or near-field communication network, wherein the devices are location located within the network coverage area of one or more registered devices with synchronized time In some embodiments, the processing module 310 may be configured to reject the enrollment or registration of one or more point of service systems 118 and one or more site devices 129 if the location determined by the processing module 310, and/or the geographical location data obtained from the wireless or mobile carriers, or wireless service providers does not match or does not substantially match the real time geographical location data of the one or more point of service systems 118 and one or more site devices 129 acquired by their associated GPS/AGPS sensors or if the three locations are not within a pre-defined distance from each other.

In some embodiments, the processing module 310 may be configured to reject the enrollment or registration of one or more user devices 110, partner devices 112, distributor devices 114, verifier devices 116, and/or advertisement service provider devices 127 if the geographical location data determined by the server computer system 124, and/or the geographical location data obtained from the wireless or mobile carriers, or wireless service providers does not match or does not substantially match the real time geographical location data acquired by their associated GPS/AGPS sensors or if the three locations are not within a pre-defined distance from each other, or if the geographical location data determined by the processing module 310, and/or the geographical location data obtained from the wireless or mobile carriers, or wireless service providers are not within a pre-defined location such as a city, state, country, region or a location determined by the processing module 310.

In some embodiments, the processing module 310 may be configured to reject the authentication of one or more point of service systems 118 and one or more site devices 129 if the geographical location data determined by the processing module 310, and/or the geographical location data obtained from the wireless or mobile carriers, or wireless service providers does not match or or does not substantially match the real time geographical location data of the one or more point of service systems 118 and one or more site devices 129 acquired by their associated GPS/AGPS sensors or if the three locations are not within a pre-defined distance from each other.

In some embodiments, the processing module 310 may be configured to reject the authentication of one or more user devices 110, partner devices 112, distributor devices 114, verifier devices 116, and/or advertisement service provider devices 127 if the geographical location data determined by the processing module 310, and/or the geographical location data obtained from the wireless or mobile carriers, or wireless service providers does not match or does not substantially match the real time geographical location data of the one or more user devices 110, partner devices 112, distributor devices 114, verifier devices 116, and/or advertisement service provider devices 127 acquired by their associated GPS/AGPS sensors or if the three locations are not within a pre-defined distance from each other, or if the geographical location determined by the server computer system 124, and/or the geographical location data obtained from the wireless or mobile carriers, or wireless service providers are not within a pre-defined location such as a city, state, country, region or a location determined by the processing module 310.

In some embodiments, the processing module 310 may be configured to enable one or more users 102, partners 104, distributors 106, verifiers 108, and/or advertisement service providers 126 to verify their geographical location, wherein after verifying the location the processing module 310 may notify them about the result of the verification. In some embodiments, the processing module 310 may be configured to enable one or more partners 104, distributors 106, verifiers 108, advertisement service providers 126 and/or external systems to verify the geographical location of users 102, partners 104, distributors 106, verifiers 108, and/or advertisement service providers 126.

In some embodiments, the processing module 310 may also be configured to credit the accounts of users 102 with credits, currency, and/or points for receiving the recommendations, suggestions, and/or promotions of the environmental activities (e.g., products and/or services). In some embodiments, the processing module 310 may also be configured to credit the accounts of users 102 with credits, currency, and/or points for receiving advertisement service data records from the advertisement service providers 126.

The processing module 310 may also be configured to analyze the environmental credit score of users 102, partners 104, and distributors 106 and determine the one or more users 102, partners 104, and distributors 106 with a high environmental credit score.

In some embodiments, the processing module 310 may also be configured to enable one or more users 102, partners 104, verifiers 108, and/or advertisement service providers 126 to search for an environmental activity (e.g., product and/or service) offered by each of the partners 104 in the database of the server computer system 124, where the information on the environmental product declaration of the products and/or services (e.g., environmental product declaration identification data such as the registration number), and/or other identification data (e.g., unique user identifiers of partners 104, blockchain identifiers, name, address, and/or other identification data) may be used by the one or more user 102 in the search process.

In some embodiments, the processing module 310 may be configured to authenticate one or more users 102, and/or a partner of the partners 104 while the user carrying out an environmental activity offered by a partner of the partners 104 (e.g., transportation company), and wherein storing the transactions data (e.g., offline transactions data) in the database 312 of the server computer system 124 may be rejected by the processing module 310 if the authentication is not successful. In some embodiments, the processing module 310 may be configured to authenticate the one or more users 102, and/or the partner of the partners 104 (e.g., an employee of a partner) prior to storing transactions data (e.g., offline transactions data) in the database 312 of the server computer system 124, the authentication may be done according to one-factor, two-factor, three-factor, or four-factor authentication methods.

In embodiments where one or more point of service systems 118 of one or more partners 104 (e.g., transportation company) may be installed in one or more vehicles (e.g., electric vehicles) of the one or more partners 104, the processing module 310 may be configured to verify using one or more algorithms, machine learning, and/or a trained neural network by means of deep learning the geographical location of one or more users 102 and the one or more point of service systems 118 while the one or more users 102 carrying out an environmental activity (e.g., transportation service) offered by the one or more partners 104 (e.g., transportation company), wherein the processing module 310 may not credit the accounts of the one or more users 102 with environmental activities, credits, points, currency, cryptocurrency and/or any rewards if the one or more users 102 are not located at the location of the point of service systems 118 or within a pre-defined distance from the location of the point of service systems 118. In some embodiments, the processing module 310 may be configured to verify the geographical location of the one or more users 102 and the one or more point of service systems 118 according to the method described herein.

In some embodiments, the processing module 310 may be configured to enable offline transactions and to propagate the transactions once the server computer system 124, point of service systems 118, computing nodes 122, site devices 129, user devices 110, partner devices 112, distributer devices 114, verifier devices 116, and/or advertisement service provider devices 127 reconnect to the network 120, wherein the network 120 may comprise Wireless Mesh Network (WMN).

In some embodiments, the processing module 310 may be configured to enable one or more verifiers 108 to submit a request to deactivate the one or more site device 129 and/or change the location and orientation of one or more site devices 129 (e.g., installing the same site device in a new location, changing the orientation of the site device). In such a case, the processing module 310 may be configured to authenticate verifiers 108 and to enable the one or more verifiers 108 to submit the request after the successful authentication, wherein the authentication may be performed according to one-factor, two-factor, three-factor, or four-factor authentication methods, wherein the request may be sent from the one or more site devices 129 or the one or more verifier devices 116.

In some embodiments, the processing module 310 may be configured to authenticate a site of the sites 128, a partner of the partners 104, and/or one or more verifiers 108 prior to storing the site activity data or data records in the database of the server computer system 124, wherein the authentication may be performed according to one-factor, two-factor, three-factor, or four-factor authentication methods described herein. In some embodiments, the processing module 310 may be configured to authenticate a site of the sites 128, a partner of the partners 104, and/or one or more verifiers 108 prior to storing the site activity data or data records in the database of the server computer system 124, wherein the authentication may be performed according to one-factor, two-factor, three-factor, or four-factor authentication methods described herein.

In some embodiments, the processing module 310 may be configured to verify the geographical location data of one or more site devices 129 prior to storing the site activity data or data records in the database 312 of the server computer system 124 by comparing using one or more algorithms the received real time geographical location data of the one or more site devices 129 acquired by their associated GPS/AGPS to the geographical location data obtained from the wireless or mobile carriers, or wireless service providers, and/or geographical location data determined by the server computer system 124 to determine if their current geographical location data acquired by their associated GPS/AGPS sensors matches or substantially matches the geographical location data obtained from the wireless or mobile carriers, or wireless service providers, and/or the geographical location data determined by the server computer system 124, wherein the site devices 129 may be configured to communicate with the wireless or mobile carriers, or wireless service providers and communicate with each other via short range wireless network that may be one of a Bluetooth wireless, Bluetooth low energy and/or near-field communication network, wherein the devices are located within the network coverage area of one or more registered devices with synchronized time, wherein the verification may be performed continuously, periodically, and/or based on a request from one or more verifiers 108. In some embodiments, the geographical location of the site devices 129 may be verified if the geographical location data determined by the server computer system 124, and/or the geographical location data obtained from the wireless or mobile carriers, or wireless service providers match or substantially match the real time geographical location data of the site devices 129 acquired by its associated GPS/AGPS sensors or if the three geographical locations data are within a pre-defined distance from each other. In some embodiments, the processing module 310 may be configured to deactivate one or more site devices 129 if the one or more site devices 129 are not located at the partner's location (e.g., partner's address) stored in the database of the server computer system 124 or within a pre-defined distance from partner's location (e.g., partner's address) stored in the database of the server computer system 124.

In some embodiments, the processing module 310 may be configured to verify the geographical location data of one or more users 102 at the time of carrying out (e.g., participating in, purchasing, using, or completing) environmental activities (e.g., products and/or services) of one or more partners 104 according to a method described herein, where the processing module 310 may not credit the accounts of the one or more users 102 with environmental activities, credits, points, currency, cryptocurrency and/or any rewards if the one or more users 102 are not located at the geographical location of the partners (e.g., partners' addresses) stored in the database of the server computer system 124, or if they are not located at the geographical location of the point of service systems 118 of the partners 104, or are not located within a pre-defined distance from the geographical location of the point of service systems 118. In some embodiments, the processing module 310 may be configured to verify the geographical location of the one or more users 102 and the one or more point of service systems 118 according to the method described herein.

In some embodiments, the processing module 310 may be configured to enable one or more partners 104, distributors 106, verifiers 108, and/or advertisement service providers 126 to create one or more employee accounts with limited privileges and administrator accounts with the same privileges of the main administrator account (the first account created during the registration of the distributors 106, verifiers 108, and advertisement service providers 126 with the server computer system 124). The processing module 310 may also be configured to enable the partners 104, distributors 106, verifiers 108, and/or advertisement service providers 126 to submit a request to deactivate one or more employee accounts and administrator accounts, where one or more administrator accounts may be required to agree on a request to deactivate the one or more employee accounts and/or administrator accounts, where the processing module 310 may also be configured to verify the identification data comprising biometric data of the one or more administrator account holders prior to deactivating the one or more employee accounts and/or administrator accounts. In some embodiments, the processing module 310 may be configured to authenticate one or more administrator account holders prior to deactivating the one or more employee accounts and/or administrator accounts.

In some embodiments, the processing module 310 may be configured to enable one or more verifiers 108 to submit a registration request to the server computer system 124 for registering one or more sites 128 of one or more partners 104 with the server computer system 124 using a site device of the site devices 129. As an example, the processing module 310 may be configured to enable a verifier of the verifiers 108 to create a profile for one or more sites 128 of a partner of the partners 104 using a site device of the site devices 129 and to submit the profile as a registration request to the server computer system 124. The profile of each site may include but not limited to information indicating a site name, identification information of a partner of the partners 104 (e.g., name, account identifier, blockchain identifier, public key), a partner address, partner type (e.g., university, company, organization, governmental entity), identification information of one or more site devices 129 (e.g., unique site device identifier that may be printed on the site device and/or provided to the verifier by the server computer system 124, the unique site device identifier may be in a human and machine-readable form), and/or any other information that may be required to register the one or more sites 128 with the server computer system 124. In some embodiments, the processing module 310 may be configured to enable one or more verifiers 108 to scan RFID and/or NFC tags associated with the site devices 129 to register a site 128 with the server computer system 124.

In some embodiments, the processing module 310 may be configured to enable one or more verifiers 108 to submit the registration request of the one or more sites 128 at the locations of the one or more partners 104 using a site device of the site devices 129. The data of each registration request of one or more sites 128 submitted by the one or more verifiers 108 to the server computer system 124 using a site device of the site devices 129 may include but not limited to time, geographical location data (e.g., GPS/AGPS coordinates) of a partner of the partners 104, one or more verifiers 108, and one or more site devices 129, identification data (e.g., biometric data, blockchain identifier, public keys) of a partner of the partners 104, and/or one or more verifiers 108, and/or identification data of one or more sites 128 (e.g., images, videos, and/or live videos, unique site device identifier), where the images, videos, and/or live videos may be acquired by the one or more imaging devices of the one or more site devices 129 during the registration of the site and during the installation of site device may be stored in the database 312 of the server computer system 124 to be used by one or more algorithms, machine learning, and/or a trained neural network by means of deep learning (e.g., image or video recognition algorithms) to extract the image features of the one or more sites 128 that may be used for the authentication of the one or more sites 128, the identification the one or more sites 128, and/or the verification of the identification data of the one or more sites 128.

In some embodiments, the processing module 310 may be configured to create a plurality of request identifiers for a plurality of combinations of the sites 128, users 102, partners 104, distributors 106, verifiers 108, and/or advertisement service providers 126, their associated devices (site devices 129, point of service systems 118, user devices 110, partner devices 112, distributor devices 114, verifier devices 116, and/or advertisement service provider devices 127) that may be used to access the server computer system 124, and the geolocation data or the geographical location data (e.g., GPS/AGPS coordinates) of the devices. Each request identifier may be binded with a combination. Each combination may represent an authentication method.

129). The server computer system 124 may store each of the created request identifiers in the database 312, wherein each of the created request identifiers may be provided or presented to the server computer system 124 to access the server computer system 124.

In some embodiments, the processing module 310 may be configured to collect device identification information from the one or more site devices 129, point of service systems 118, user devices 110, partner devices 112, distributor devices 114, verifier devices 116, and/or advertisement service provider devices 127. The device identification information may be one or more pieces of information that uniquely identify each of the devices. The device identification information may include but are not limited to operating system version, operating system manufacturer, information about the communications interface 408, a memory 404, a processor 406, a storage component 402, an input component 414, an output component 412, and a communications infrastructure 410 of the site devices 129, point of service systems 118, user devices 110, partner devices 112, distributor devices 114, verifier devices 116, and/or advertisement service provider devices 127, and operating system name. Those of ordinary skill in the art will recognize that other forms of device identification information may be substituted herein as part of the provision of the device identification information to the server computer system 124.

In some embodiments, the processing module 310 may be configured to enable one or more users 102, partners 104, distributors 106, verifiers 108, and/or advertisement service providers 126 to collect and transmit images and/or videos to the server computer system 124 using one or more imaging devices of the site devices 129, point of service systems 118, user devices 110, partner devices 112, distributor devices 114, verifier devices 116, and/or advertisement service provider devices 127.

In some embodiments, the processing module 310 may be configured to extract using one or more algorithms biometric (e.g., face image) feature of each of the users 102, partners 104, distributors 106, verifiers 108, and/or advertisement service providers 126, wherein the biometric feature data (e.g., mean, feature dimensionality) may be stored in the database 312 of the server computer system 124 as a model; and extract using one or more algorithms, the feature of site images, videos, and/or live videos of each of the sites 128, wherein the feature data (e.g., mean, feature dimensionality) may be stored in the database 312 of the server computer system 124 as a model. The biometric data of each of the users 102, partners 104, distributors 106, verifiers 108, and/or advertisement service providers 126, and the site images, videos, and/or live videos data of each of the sites 128 may be acquired by the one or more sensors (e.g., CMOS and CCD image sensors, biometric sensors) of the one or more site devices 129, user devices 110, partner devices 112, distributor devices 114, verifier devices 116, point of service systems 118, and/or advertisement service provider devices 127.

In embodiments where the five-factor authentication method is used, the processing module 310 may be configured to integrate using one or more algorithms (e.g., Bio-Hashing algorithms) two or more factors of the five factors (user, user credential information, device PUF, device identification information, and the geographical location data) based on a plurality of combinations, wherein the templates generated as a result from the integration may be stored in the database 312 of the server computer system 124, and wherein the geographical location data may be verified. In some embodiments the server computer system 124 may store the five factors (user, user credential information, device PUF, device identification information, and the geographical location data) based on a plurality of combinations without performing the integration (the integration using one or more algorithms), wherein the templates generated as a result from each of the combinations may be stored in the database 312 of the server computer system 124, and wherein the geographical location data may be verified.

In some embodiments where user credential information is used as a factor, the one or more site devices 128 and point of service systems 118 may transmit data to the server computer system 124. In such case, the processing module 310 may be configured to generate and transmit one or more partners' 104 credential information (e.g., user name, password, personal identification number (PIN), key, and the like) to the one or more partners 104 for enabling the one or more point of service systems 118 to access the server computer system 124 after requesting to enable the one or more point of service systems 118 to access the server computer system 124, wherein the credential information may be sent to the one or more partner devices 112. The processing module 310 may also be configured to generate and transmit one or more verifiers' 108 credential information (e.g., user name, password, personal identification number (PIN), key, and the like) to the one or more verifiers 108 for enabling the one or more site device 129 to access the server computer system 124 during the installation or maintenance of the one or more site device 129, or based on a request from the one or more verifiers 108, wherein the credential information may be sent to the one or more verifier devices 116.

In some embodiments, the processing module 310 may be configured to enable each of the users 102, partners 104, distributors 106, verifiers 108, and/or advertisement service providers 126 to request access permission to the server computer system 124, wherein each access request may be accompanied with a request identifier; to enable one or more partners 104 to submit one or more requests to enable one or more point of service systems 118 to request access permission to the server computer system 124 to transmit data to the server computer system 124, wherein each access request may also be accompanied with a request identifier; to enable one or more verifiers 108 to submit one or more requests to enable site devices 129 to request access permission to the server computer system 124 to transmit data to the server computer system 124; to verify each request identifier received from each of the site devices 129, point of service systems 118, user devices 110, partner devices 112, distributor devices 114, verifier devices 116, and/or advertisement service provider devices 127 to access the server computer system 124 by comparing it with the request identifiers created and stored in the database of the server computer system 124; and to generate or issue and to transmit a challenge upon accepting each of the received request identifiers from each of the site devices 129, point of service systems 118, user devices 110, partner devices 112, distributor devices 114, verifier devices 116, and/or advertisement service provider devices 127.

In some embodiments, the processing module 310 may be configured to extract using one or more algorithms biometric (e.g., face image) feature and/or site's images, videos, and/or live videos feature according to the models stored in the database 312 of the server computer system 124, wherein the feature extraction may be performed during the authentication.

In some embodiments, the one or more site devices 129, point of service systems 118, user devices 110, partner devices 112, distributor devices 114, verifier devices 116, and/or advertisement service provider devices 127 may be configured to generate using one or more algorithms a key using the generated output of a PUF of the one or more devices upon receiving a challenge and transmit the key to the server computer system 124. The output of the PUF is generated as a response to receiving the challenge transmitted by the server computer system.

In some embodiments, the processing module 310 may be configured to apply one or more algorithms (e.g., BioHashing algorithms) to the biometric (e.g., face image) feature, site's images, videos, and/or live videos feature, unique device identifier (e.g., CMOS sensor physical unclonable function), and/or the GPS/AGPS coordinates to create a template to be used for comparison, wherein the template may be created during the authentication. In embodiments where the integration may not be performed, applying one or more algorithms (e.g., BioHashing algorithms) by the processing module 310 to the biometric feature, site's images, videos, and/or live videos feature, unique device identifier, and/or the geographical location data may not be required.

In some embodiments, the processing module 310 may be configured to retrieve the initial template created and stored in the database 312 of the server computer system 124 during the registration, wherein the request identifier received from each of the devices may be used to retrieve the initial template stored in the database.

In some embodiments, the processing module 310 may be configured to compare using one or more algorithms the template created during the authentication to the initial template created and stored in the database 312 of the server computer system 124 during the registration or enrollment to determine if the templates match or substantially match, wherein the authentication may be rejected if the unique device identifier stored in the database 312 of the server computer system 124 and the unique device identifier obtained during the authentication does not match, wherein the authentication may be successful if data variations (e.g., hamming distance, verified geographical location data) between the template created during the authentication and the initial template created and stored during the registration are within a pre-defined threshold, and wherein the pre-defined threshold relating to the data variations of the verified geographical location data of the one or more site devices 129, point of service systems 118, user devices 110, partner devices 112, distributor devices 114, verifier devices 116, and/or advertisement service provider devices 127 may be adjusted by the server computer system 124 to limit the access of the one or more users 102, partners 104, distributors 106, verifiers 108, sites 128, advertisement service providers 126, and/or their associated devices to the server computer system 124 to a specific geographical location, specific area, a specific city, and/or specific country. In some embodiments, the authentication of each of the sites 128 and each of the site devices 129 may not be successful if the data variations of the verified geographical location of each of the site devices 129 between the template created during the authentication and the initial template created and stored during the registration of each of the sites 128 with the server computer system 124 are within a pre-defined threshold.

In embodiments where the integration of the biometric feature, site's images, videos, and/or live videos feature, unique device identifier (e.g., CMOS sensor physical unclonable function), and/or the geographical location using one or more algorithms (e.g., BioHashing algorithms) data may not be performed, the processing module 310 may be configured to compare using one or more algorithms the template created during the authentication to the initial template created and stored in the database 312 of the server computer system 124 during the registration or enrollment to determine if the templates match or substantially match, wherein the authentication may be rejected if the unique device identifier stored in the database 312 of the server computer system 124 and the unique device identifier obtained during the authentication does not match, wherein the authentication may be successful if data variations between the template created during the authentication and the initial template created and stored during the registration are within a pre-defined threshold, wherein the pre-defined threshold relating to the data variations of the verified geographical location data of the one or more site devices 129, point of service systems 118, user devices 110, partner devices 112, distributor devices 114, verifier devices 116, and/or advertisement service provider devices 127 may be adjusted by the server computer system 124 to limit the access of the one or more users 102, partners 104, distributors 106, verifiers 108, sites 128, advertisement service providers 126, and/or their associated devices to the server computer system 124 to a specific geographical location, specific area, a specific city, and/or specific country. In some embodiments, the authentication of each of the site devices 129 and/or each of the point of service systems 118 may not be successful if the data variations of the verified geographical location of each of the site devices 129 and/or each of the point of service systems 118 between the templates created during the authentication and the initial templates created and stored during the registration are within a pre-defined threshold.

In some embodiments, the processing module 310 may be configured to compare using one or more algorithms the device identification information of the site devices 129, point of service systems 118, user devices 110, partner devices 112, distributor devices 114, verifier devices 116, and/or advertisement service provider devices 127, and the user credential information of the users 102, partners 104, distributors 106, verifiers 108, and/or advertisement service providers 126 to the device identification information and user credential information stored in the database 312 of the server computer system 124 to determine if the the device identification information and user credential information obtained during the authentication match the device identification information and user credential information obtained during the registration, wherein the authentication may be rejected if the user credential information stored in the database 312 of the server computer system 124 and the user credential information obtained during the authentication does not match, and wherein the authentication may be rejected if the device identification information stored in the database 312 of the server computer system 124 and the device identification information obtained during the authentication does not match or does not substantially match.

In some embodiments, the processing module 310 may be configured to authenticate the site devices 129, point of service systems 118, user devices 110, partner devices 112, distributor devices 114, verifier devices 116, and/or advertisement service provider devices 127 based on the type of combination. The type of combinations may comprise the one-factor authentication method, two-factor authentication, three-factor authentication, four-factor authentication, and five-factor authentication.

In some embodiments, the processing module 310 may be configured to enable service and/or a process of one or more partners 104 or one or more unregistered entities to request to authenticate one or more users 102, partners 104, distributors 106, verifiers 108, and/or advertisement service providers 126. In such case, the processing module 310 may be configured to receive a request to authenticate one or more users 102, partners 104, distributors 106, verifiers 108, and/or advertisement service providers 126 from one or more partners 104 and/or one ore unregistered entities; the processing module 310 may be configured to authenticate the one or more users 102, partners 104, distributors 106, verifiers 108, and/or advertisement service providers 126 and provide the service and/or the process with the status or result of the authentication and may notify the one or more partners 104 and/or one ore unregistered entities. In some embodiments, the processing module 310 may be configured to bind credentials (One Time Password token, public key, private key, password, RSA signature, and the like.) with the successful authentication of the one or more users 102, partners 104, distributors 106, verifiers 108, and/or advertisement service providers 126, wherein the processing module 310 may be configured to release the credentials to a service or a process of the one or more partners 104 or the one ore unregistered entities after the successful authentication of the one or more users 102, partners 104, distributors 106, verifiers 108, and/or advertisement service providers 126. In some embodiments, the processing module 310 may be configured to enable the one or more partners 104 and/or one ore unregistered entities to determine authentication options such as location-based verification, device physical unclonable function based verification, user credential based verification, device identification information based verification, and/or biometric information based verification of the one or more users 102, partners 104, distributors 106, verifiers 108, and/or advertisement service providers 126. In such case, the processing module 310 may be configured to consider the options selected by the one or more partners 104 and/or one ore unregistered entities to authenticate the one or more users 102, partners 104, distributors 106, verifiers 108, and/or advertisement service providers 126.

In some embodiments, the processing module 310 may be configured to enable the one or more users 102, partners 104, distributors 106, verifiers 108, and/or advertisement service providers 126 to request to change or use one or more of their associated devices, wherein the processing module 310 may be configured to enable the one or more users 102, partners 104, distributors 106, verifiers 108, and/or advertisement service providers 126 after successfully authenticating them to submit a request from their associated verified devices registered with the server computer system 124 to change or use one or more devices, wherein the processing module 310 may be configured to exclude verifying the new one or more devices during the enrollment or registration of the new devices with server computer system 124. In embodiments where the verified devices of the one or more users 102, partners 104, distributors 106, verifiers 108, and/or advertisement service providers 126 are lost, damaged, or not available to be used to submit the request, the processing module 310 may be configured to deactivate or block the lost, damaged, or unavailable devices and enable one or more partners 104 to submit the request on their behave from partners devices 112, and/or partners' point of service systems 118, wherein the processing module 310 may be configured to authenticate the one or more users 102, partners 104, distributors 106, verifiers 108, and/or advertisement service providers 126 and exclude verifying their associated devices before submitting the request to the server computer system 124. After the server computer system 124 accepts the request, the processing module 310 may be configured to enable the users 102, partners 104, distributors 106, verifiers 108, and/or advertisement service providers 126 to register the new one or more devices to be used to communicate with the server computer system 124, the processing module 310 may be configured to exclude verifying the new one or more devices during the enrollment or registration of the new devices with server computer system 124.

In some embodiments, the processing module 310 may be configured to authenticate one or more users 102, partners 104, distributors 106, verifiers 108, and advertisement service providers 126 prior to enabling the one or more users 102, partners 104, distributors 106, verifiers 108, and/or advertisement service providers 126 to perform one or more functions of the users 102, partners 104, distributors 106, verifiers 108, and advertisement service providers 126 described herein.

In some embodiments, the processing module 310 may be configured to authenticate one or more verifiers, and/or a partner of the partners 104 prior to registering the sites 128 with the server computer system 124, prior to registering the one or more site devices 129 with the server computer system 124, and/or prior to enabling the one or more site devices 129 to access the server computer system 124 to perform one or more functions of the site devices 129 described herein, wherein in some embodiments. In some embodiments, the processing module 310 may also be configured to authenticate each of the sites 128 and site devices 129 prior to storing the sites activity data or data records in the database of the server computer system 124.

In some embodiments, the processing module 310 may be configured to extract using one or more algorithms distinctive biometric (e.g., iris, face, voice, fingerprints) features from the one or more users 102, partners 104, distributors 106, verifiers 108, and/or advertisement service providers 126 during the registration with the server computer system 124 to form a biometric template of each of the users 102, partners 104, distributors 106, verifiers 108, and/or advertisement service providers 126; and extract using one or more algorithms distinctive site images, videos, and/or live videos features from the one or more sites 128 during the registration of the one or more sites 128 with the server computer system 124 by one or more verifiers 108 using a site device from the site devices 129 to form the site images, videos, and/or live videos template, wherein the biometric and site images, videos, and/or live videos templates may be stored in the database 312 of the server computer system 124, and wherein the biometric and site images, videos, and/or live videos data may be acquired by the one or more sensors (e.g., CMOS and CCD image sensors, biometric sensors) of the one or more site devices 129, user devices 110, partner devices 112, distributor devices 114, verifier devices 116, point of service systems 118, and/or advertisement service provider devices 127.

In some embodiments, the processing module 310 may be configured to authenticate each of the site devices 129, point of service systems 118, user devices 110, partner devices 112, distributor devices 114, verifier devices 116, advertisement service provider devices 127, sites 128, users 102, partners 104, distributors 106, verifiers 108, and/or advertisement service providers 126 prior to being enabled to perform one or more of the functions of the site devices 129, point of service systems 118, user devices 110, partner devices 112, distributor devices 114, verifier devices 116, advertisement service provider devices 127, sites 128, users 102, partners 104, distributors 106, verifiers 108, and/or advertisement service providers 126 described herein.

The publication module 314 may be configured to publish the environmental credit scores of the users 102, partners 104, and distributors 106 and notify the users 102, partners 104, and distributors 106.

In embodiments where a blockchain may be utilized, the processing module 310 be configured to generate new blocks, data values, and block headers to be validated by other nodes in the blockchain network and to be added to the associated blockchain.

The publication module 314 may be configured to publish the environmental credit score data of the users 102, partners 104, and distributors 106 under the environmental activity records of the users 102, partners 104, and/or distributors 106 respectively, and, may notify the users 102, partners 104 and/or distributors 106.

In some embodiments, the publication module 314 may be configured to enable or allow one or more advertisement service providers 126 to send or transmit to one or more users 102 at least one advertisement service data record. The data for each advertisement service may include, but not limited to users' 102, partners' 104, distributors' 106, verifiers' 108, and/or advertisement service providers' 126 identification data (e.g., unique user identifiers, account identifiers, biometric data, blockchain identifier, public keys) and information on the advertisement activities data (e.g., information on the advertisement service requests or orders, information on the time, type, number, cost, and/or content details of advertisements). In some embodiments, the users 102 may get credits, currency, and/or points credited or deposited in their accounts by the server computer system 124 for accepting to receive the recommendations, suggestions, and/or promotions of the environmental activities (e.g., products and/or services).

In some embodiments, publication module 314 may be configured to enable or allow one or more program operators to track and monitor the verification activities of an environmental product declaration performed by a verifier of the verifiers 108. In some embodiments, the publication module 314 may be configured to enable or allow one or more program operators to allow or prevent the publication (making it available for the public on the blockchain network) of verified environmental product declaration and to track and monitor the verification activities of an environmental product declaration performed by a verifier of the verifiers 108.

In embodiments where the server computer system 124 may be a computing node in a blockchain network, the processing module 310 may be configured to generate new blocks, data values, and block headers to be validated by other nodes in the blockchain network and to be added to the associated blockchain.

In some embodiments, the processing module 310 may be configured to identify one or more sites, partners, and verifiers associated with the site activity data or data records; extract data indicating a real-time data related to an environmental product declaration of at least one of the plurality of partners for each site device; generate a display of a sensor listing for each site device, wherein each of the sensors is listed with its associated real-time data related to the environmental product declaration, wherein the generated display further comprises site identification information and partners identification information for each of the sensors of each of the site devices, wherein the generated display further comprises historical data over a period of time, wherein the generated display comprises graphical data; define one or more alarm levels based on collected real-time data related to the environmental product declaration of an environmental activity offered by the at least one of the plurality of partners, wherein the processing module may enable one or more verifiers to define the one or more alarm levels based on collected real-time data related to the environmental product declaration; and determine whether the collected data by the ore or more sensors of the one or more site devices includes real-time data that meet any of the defined alarm levels, wherein at least one of the defined alarm levels is met, and further comprising generating an alarm notification and notify the one or more partners and one or more verifiers. In some embodiments, the processing module 310 may be configured to assign one or more verifiers to reverify the environmental product declaration when at least one of the defined alarm levels is met. In some embodiments, the processing module 310 may be configured to make an environmental activity offered by a partner of the partners 104 unavailable to be carried out (e.g., purchased, used, or completed) by one or more users 102 when at least one of the defined alarm levels is met.

The database 312 may be configured to store personal information and environmental activities information of the registered users 102, registered partners 104, and registered distributors 106. In some embodiments, the database 312 may be further configured to store at least one environmental activity record of partners 104, users 102, and distributors 106, and list the data in the distributors', partners', and users' environmental activity records based on the category of each environmental activity. Further, database 312 may maintain a plurality of environmental activity records associated with identification data (e.g., request identifiers, GPS/AGPS coordinates, unique device identifiers, unique user identifiers, biometric information, credential information, geographical location data, device PUF, device identification information, blockchain identifier, public keys, name, address, and/or other identification data) of the plurality of users 102, partners 104, and distributors 106. Each of the plurality of the environmental activity records including but not limited to information about the environmental activities and environmental law violations. Each of the registered distributors 106 may monitor and track the environmental activities comprising products and/or services distributed to the partners 104 and stored in the distributors' environmental activity record. Each of the partners 104 may monitor and track the environmental activities comprising products and/or services offered and/or reported by the partner and stored in the partner's environmental activity records. Each of the users 102 may monitor and track the environmental activities comprising products and/or services carried out by the user and stored in the user's environmental activity records.

In some embodiments, the database 312 may be further configured to store a plurality of transaction data records associated with the points, credits, currency, and/or cryptocurrency of the users 102, partners 104, distributors 106, verifiers 108, and/advertisement service providers 126 and list the transaction data records under the respective account profiles of the users 102, partners 104, distributors 106, verifiers 108, and/advertisement service providers 126. Further, database 312 may maintain a plurality of transaction data records associated with identification data (e.g., request identifiers, GPS/AGPS coordinates, unique device identifiers, biometric information, credential information, geographical location data, device PUF, device identification information, unique user identifiers, biometric data, blockchain identifier, public keys, name, address, and/or other identification data) of the plurality of users 102, partners 104, distributors 106, verifiers 108, and/advertisement service providers 126. Each of the transaction data records may include but limited to data relating to the transfer and/or exchange of credits, points, cryptocurrency, and/or currency relating to users 102, partners 104, distributors 106, verifiers 108, and/advertisement service providers 126. Each of the users 102, partners 104, distributors 106, verifiers 108, and/advertisement service providers 126 may monitor and track the transaction data records.

The database 312 may be configured to store personal information, verification activity records, and other activity information of each of the registered verifiers 108. In some embodiments, the database 312 may be further configured to store at least one verification activity record of each of the verifiers 108, and list the data in the verifiers' activity records based on the category of each activity. Further, the database 312 may maintain a plurality of activity records associated with identification data (e.g., request identifiers, GPS/AGPS coordinates, unique device identifiers, biometric information, credential information, geographical location data, device PUF, device identification information, unique user identifiers, biometric data, blockchain identifier, public keys, name, address, and/or other identification data) of the plurality of verifiers 108. Each of the plurality of the verification activity records may include data relating to one or more verification activities (e.g., verification and/or creation of environmental product declarations, determination of the environmental impact of environmental activities, and/or environmental impact of environmental law violations) carried out by the one or more registered verifiers 108, and/or other information. Each of the verifiers 108 may monitor and track the verifier's activities stored in the verifier's activity records.

The database 312 may be configured to store personal information, advertisement service data records, and other activity information of each of the registered advertisement service providers 126. In some embodiments, the database 312 may be further configured to store at least one advertisement service data record, and list the data in the records of one or more advertisement service providers 126 based on the category of each data record. Further, the database 312 may maintain a plurality of advertisement service data records associated with identification data (e.g., request identifiers, GPS/AGPS coordinates, unique device identifiers, biometric information, credential information, geographical location data, device PUF, device identification information, unique user identifiers, biometric data, blockchain identifier, public keys, name, address, and/or other identification data) of the advertisement service providers 126. Each of the plurality of the advertisement service data records may include, but not limited to users' 102, partners' 104, distributors' 106, verifiers' 108, and/or advertisement service providers' 126 identification data (e.g., request identifiers, GPS/AGPS coordinates, unique device identifiers, unique device identifiers based on sensor physical unclonable function (e.g., CMOS sensor physical unclonable function), unique user identifiers, account identifiers, biometric data, blockchain identifier, public keys) and information on the advertisement activities data (e.g., information on the advertisement service requests or orders, information on the time, type, number, cost, and/or content details of advertisements). Each of the advertisement service providers 126 may monitor and track the advertisement service data records stored in the advertisement service providers' 126 records.

The database 312 may be configured to store identification data (e.g., request identifiers, geographical location data (e.g., GPS/AGPS coordinates), unique device identifiers, biometric information, credential information, geographical location data, device PUF, device identification information, site images, videos, and/or live videos, blockchain identifier, public key), site activity data records, and other activity information of each of the sites 128. In some embodiments, the database 312 may be further configured to store at least one site activity data record of each of the sites 128, and list the data in the sites' activity records based on the category of each activity. Further, database 312 may maintain a plurality of activity records associated with identification data (e.g., request identifiers, geographical location data (e.g., GPS/AGPS coordinates), unique device identifiers, site images, videos and or live videos information, credential information, geographical location data, device PUFs, device identification information, site images, videos, and/or live videos, blockchain identifier, public key) of the plurality of sites 128. Each of the plurality of the site activity data records may include, but not limited to identification data (e.g., request identifiers, geographical location data (e.g., GPS/AGPS coordinates), unique device identifiers site images, videos and or live videos information, credential information, geographical location data, device PUF, device identification information, biometric data, blockchain identifiers, public keys) of a partner of the partners 104, and/or one or more verifiers 108, identification data (e.g., site images, videos, and/or live videos, blockchain identifier, public keys) of a site of the sites 128, data (e.g., life cycle inventory data) including but not limited to onsite operations data, onsite material consumption data, onsite emissions data, onsite energy consumption data, and/or onsite waste data of one or more products and/or services of a partner of the partners 104 acquired by one or more sensors and/or devices of the site device of the site devices 129, geographical location data (e.g., GPS/AGPS coordinates) of a site of the sites 128 of the site device of the site devices 129, and/or other data. Each of the verifiers 108 may monitor and track the activities of each of the sites 128 stored in the sites' activity records.

In embodiments where a blockchain may be used to store sites' activity records, users' environmental activity records, partners' verification activity records, distributors activity records, advertisement service providers' data records, and transaction data records, and other information, the database 312 may be a blockchain, where the data entries of the environmental activity records, verification activity records, transaction data records, advertisement service data records, and other information may be included as the data values stored in blocks included in the blockchain.

The environmental credit score of the users 102 may be used by entities including, but not limited to, private sector organizations, public sector organizations, voluntary sectors, and/or by other entities in areas including but not limited to, employment decisions, university admission decisions, and landlord-tenant decisions, decisions of the government towards individuals, companies and any other entities. Further, the environmental credit score of users 102 may be used in other areas that may impact consumer's lives such as determining whether a service, an award, a credit, a scholarship should be offered or granted to users 102.

The processes described above executing in the server computer system 124, user devices 110, partner devices 112, distributor devices 114, verifier devices 116, point of service systems 118, computing nodes 122, advertisement service provider devices 127, and/or site devices 129, may be implemented in firmware, hardware, software, or any combination thereof. The processes may be implemented in a computer program or multiple computer programs executing on a programmable computer including a storage medium readable by the processor (including, e.g., volatile and non-volatile memory and/or storage elements), input and output devices, and a processor. Each computer program may be a set of instructions (program code) in a code module resident in the random-access memory of the computer. Until required by the computer, the set of instructions may be stored in another computer memory (e.g., in a hard disk drive, or a removable memory such as an optical disk, external hard drive, memory card, or flash drive) or stored on another computer system and downloaded via the Internet or other network 120.

The server computer system 124 may comprise a physical machine or multiple physical machines, or virtual machines running on a physical machine or multiple physical machines. In addition, the server computer system 124 may comprise a cluster of computers or multiple distributed computers that are connected by the network 120 or the Internet.

In addition, methods and functions described herein are not limited to any particular sequence, and the acts or blocks relating thereto may be performed in other sequences that are appropriate. For example, described acts or blocks may be performed in an order other than that specifically disclosed, or multiple acts or blocks may be combined in a single act or block.

While the invention has been described in connection with what is presently considered to be the most practical and various embodiments, it is to be understood that the invention is not to be limited to the disclosed embodiments, but on the contrary, is intended to cover various modifications and equivalent arrangements.

The invention claimed is:

1. A system, comprising:
   at least one hardware processor;
   and one or more memories storing instructions which, when executed by the at least one hardware processor, cause the at least one hardware processor to:
      receive, data from a point of service system, wherein the point of service system is part of a blockchain network that has access to a distributed ledger, and wherein the data comprises any or a combination of:
         i) data relating to one or more environmental activities carried out by one or more users and offered by one or more partners that are associated with the one or more point of service systems,
         ii) data relating to one or more environmental product declarations that are associated with the one or more environmental activities;
      receive, data from at least one of one or more site computing devices that are located at one or more sites associated with the one or more partners, wherein the at least one of the one or more site computing devices is part of the blockchain network that has access to a distributed ledger, and wherein the data comprises life cycle inventory data;
      assign, one or more verifiers that are associated with one or more verifier computing devices, to verify the one or more environmental product declarations utilizing the life cycle inventory data, and wherein the one or more verifier computing devices are part of the blockchain network that has access to a distributed ledger;
      receive, data from one or more verifier computing devices, wherein the data comprises any or a combination of:
         i) data relating to verification of the one or more environmental product declarations,
         ii) data relating to creation of the one or more environmental product declarations;
         and
      determine, the validity of data relating to the verification of the one or more environmental product declarations conducted by the one or more verifiers.

2. The system of claim 1, wherein the life cycle inventory data is collected by one or more sensors associated with the at least one of the one or more site computing devices that are located at the one or more sites associated with the one or more partners, and wherein the life cycle inventory data comprises any or a combination of onsite operations data, onsite material consumption data, onsite emissions data, onsite energy consumption data, and onsite waste data.

3. The system of claim 1, wherein the instructions further cause the at least one hardware processor to:
   define, one or more alarm levels based on collected real-time data related to the one or more environmental product declarations that are associated with the one or more environmental activities;
   determine, whether the collected data by the one or more sensors include real-time data that meet any of a defined one or more alarm levels;
   send, a notification to at least one of the one or more verifiers comprising information about an alarm level that has been reached;
   assign, the at least one of the one or more verifiers to reverify the one or more environmental product declarations when at least one of the defined one or more alarm levels is met; and
make, the one or more environmental activities unavailable to be carried out by the one or more users when the alarm level is reached.

4. The system of claim 1, wherein the instructions further cause the at least one hardware processor to:
   recommend, to the one or more users, at least one environmental activity from the one or more environmental activities to be performed by the one or more users, wherein each environmental activity from the one or more environmental activities is associated with a verified environmental product declaration; and
   compute, an environmental credit score for the one or users based at least on a response of the one or more users to the recommended at least one environmental activity.

5. The system of claim 4, wherein compute, an environmental credit score for the one or users based at least on a response of the one or more users to the recommended at least one environmental activity comprises:
   compute, a score for at least one environmental law violation from the one or more environmental law violations based on environmental impact of that environmental law violation, and wherein the environmental impact of the at least one environmental law violation is determined by the one or more verifiers that are associated with the one or more verifier computing devices.

6. The system of claim 1, wherein the one or more environmental product declarations are further verified by a consensus of a majority of the one or more verifiers that are associated with the one or more verifier computing devices, wherein
the one or more verifiers comprised in the majority of the one or more verifiers are rewarded, and wherein the one or more verifiers not comprised in the majority of the one or more verifiers are penalized.

7. The system of claim 1, wherein the verification of an environmental product declaration of the one or more environmental product declarations by the one or more verifiers using the one or more verifier computing devices comprises any or a combination of:
  i) collecting data relating to onsite emissions, and energy consumptions,
  ii) collecting samples,
  iii) analyzing samples,
  iv) determining the chemical composition of the collected samples,
  v) measuring temperature.

8. The system of claim 1, wherein the instructions further cause the at least one hardware processor to:
  conduct, an examination to examine the one or more verifiers, wherein the examination comprises any or a combination of conducting chemical analysis, and sample collection using the one or more verifier computing devices by utilizing one or more sensors and devices associated with the one or more verifier computing devices; and
  determine, the examination performance of the one or more verifiers.

9. The system of claim 1, wherein the instructions further cause the at least one hardware processor to:
  generate, a plurality of request identifiers based on a plurality of combinations, wherein each request identifier from the plurality of request identifiers is binded with a combination from the plurality of combinations, and wherein each combination from the plurality of combinations represents an authentication method that comprises at least one of a one-factor, a two-factor, a three-factor, a four-factor, and a five-factor authentication method;
  store, the generated plurality of request identifiers along with its associated combination in a memory;
  execute, the authentication method to authenticate any or a combination of the one or more users, the one or more partners, the one or more verifiers, the one or more sites, and at least one computing device from the set of computing devices, wherein the set of computing devices comprises any or a combination of one or more user computing devices, one or more partner computing devices, the one or more verifier computing devices, the one or more site computing devices, and the one or more point of service systems, wherein the set of computing devices forms a part of the blockchain network that has access to a distributed ledger, and wherein the authentication method is executed prior to installing one or more install records onto the at least one computing device from the set of computing devices and one or more sensors associated with the at least one of the one or more site computing devices that are located at the one or more sites associated with the one or more partners.

10. The system of claim 9, wherein the instructions further cause the at least one hardware processor to:
  generate, asymmetric cryptographic key pair comprises public key and private key;
  send, a challenge value, a helper data, and an encryption value to at least one computing device from the set of computing devices, wherein the encryption value is generated by encrypting by the at least one hardware processor, the public key with a unique device identifier of the at least one computing device from the set of computing devices that is generated during the enrollment of the at least one computing device from the set of computing devices with a server computer system;
  recover, by the at least one computing device from the set of computing devices, the unique device identifier using the generated output of a physical unclonable function associated with the at least one computing device from the set of computing devices;
  execute, by the at least one computing device from the set of computing devices, a cryptographic operation to recover the public key using a recovered unique device identifier;
  encrypt, by the at least one computing device from the set of computing devices, data using the public key, wherein the data is relating to one or more factors of the authentication method; and
  decrypt, by the at least one hardware processor, data received from the at least one computing device from the set of computing devices using the private key.

11. The system of claim 9, wherein the instructions further cause the at least one hardware processor to:
  verify, a geographical location data of the at least one computing device from the set of computing devices,
  wherein the geographical location data verification comprises a result of a comparison between a real-time geographical location data received from the at least one computing device from the set of computing devices, a geographical location data obtained from at least one of wireless carriers, mobile carriers, wireless service providers, and a geographical location data determined by the at least one hardware processor, and
  wherein the real-time geographical location data is acquired by at least one of a global positioning system and an assisted global positioning system associated with the at least one computing device from the set of computing devices;
  identify, a match between the real-time geographical location data, the geographical location data obtained from the at least one of wireless carriers, mobile carriers, wireless service providers, and the geographical location data determined by the at least one hardware processor when a distance between the real-time geographical location data, the obtained geographical location data, and the geographical location data determined by the at least one hardware processor is within a limit established by a pre-defined threshold; and
  determine, a geographical location of the set of computing devices, wherein a determination of the geographical location comprises:
  determining, by the at least one hardware processor a distance between at least one registered computing device from the set of computing devices and one or more registered computing devices from the set of computing devices, wherein the one or more registered computing devices comprise any or a combination of one or more static registered computing devices and one or more dynamic registered computing devices with synchronized time, and wherein a determination of the distance by the at least one hardware processor comprises:

determining, by the at least one hardware processor a time taken by the one or more registered computing devices to receive a request for a geographical location from the at least one registered computing device, wherein the geographical location of the at least one registered computing device is stored in the memory, and the geographical location of the at least one registered computing device is located within a network coverage area of the one or more registered computing devices with synchronized time, wherein the at least one registered computing device and the one or more registered computing devices with synchronized time are configured to communicate via short range wireless network.

12. The system of claim 9, wherein the instructions further cause the at least one hardware processor to:

integrate, two-factor, three-factor, four-factor, or five-factor authentication methods, wherein the integration is based on the plurality of combinations of the factors of the two-factor, three-factor, four-factor, or five-factor authentication methods;

retrieve, an initial template created as a result from the integration during the enrollment of the at least one computing device from the set of computing devices with the server computer system and stored in the memory;

compare, a template created during the authentication to the initial template to determine if templates match or substantially match, wherein the authentication is successful if data variations between the template created during the authentication and the initial template are within a pre-defined threshold;

and install, one or more sets of instructions onto the at least one computing device from the set of computing devices and the one or more sensors associated with the at least one of the one or more site computing devices, wherein the one or more sets of instructions dictate the operation of the at least one computing device from the set of computing devices and the one or more sensors.

13. The system of claim 9, wherein a combination from the plurality of combinations comprises any of:

I. at least one of: a) a biometric feature associated with a user, wherein the biometric feature is acquired by one or more sensors in communication with at least one user computing device, b) user credential information, c) physical unclonable functions associated with the at least one user computing device, d) identification information of the at least one user computing device, and e) a verified geographical location data of the at least one user computing device, II. at least one of: a) a biometric feature associated with a partner, wherein the biometric feature is acquired by one or more sensors in communication with at least one partner computing device, b) partner credential information, c) physical unclonable functions associated with the at least one partner computing device, d) identification information of the at least one partner computing device, and e) a verified geographical location data of the at least one partner computing device, III. at least one of: a) a biometric feature associated with the partner, wherein the biometric feature is acquired by one or more sensors in communication with at least one point of service system, b) partner credential information, c) physical unclonable functions associated with the at least one point of service system, d) identification information of the at least one point of service system, and e) a verified geographical location data of the at least one point of service system, IV. at least one of: a) a biometric feature associated with a verifier, wherein the biometric feature is acquired by one or more sensors in communication with at least one verifier computing device, b) verifier credential information, c) physical unclonable functions associated with the at least one verifier computing device, d) identification information of the at least one verifier computing device, and e) a verified geographical location data of the at least one verifier computing device, V. at least one of: a) a biometric feature associated with a verifier, wherein the biometric feature is acquired by one or more sensors in communication with at least one site computing device, b) site images, c) site videos, d) site live videos feature, e) verifier credential information, f) physical unclonable functions associated with the at least one site computing device, g) identification information of the at least one site computing device, and h) a verified geographical location data of the at least one site computing device.

14. The system of claim 9, wherein the instructions further cause the at least one hardware processor to:

execute, the authentication method to authenticate one or more registered verifiers, and a registered partner prior to registering the one or more sites associated with the partner and prior to registering the one or more site computing devices associated with the one or more sites; and execute, the authentication method to authenticate, the one or more users, and at least one partner from the one or more partners prior to storing offline transactions data in the memory.

15. The system of claim 9, wherein, the distributed ledger is shared between the set of computing devices, wherein the set of computing devices provide processing power for updating and verifying the distributed ledger, and wherein the distributed ledger is collectively updated and verified by the set of computing devices.

16. The system of claim 9, wherein, the distributed ledger is stored on the set of computing devices, wherein the one or more point of service systems are configured to enable offline transactions when the one or more point of service systems are not connected to a network, wherein the one or more point of service systems communicate with the server computer system and the set of computing devices via the network, wherein the transactions of the one or more point of service systems are propagated once the one or more point of service systems are reconnected to the network, and wherein a blockchain is used to store activities data of the one or more verifiers, wherein each data value included in each block in the blockchain comprises identification data of at least one verifier from the one or more verifiers and a partner from the one or more partners and activity data associated therewith for each environmental product declaration from the one or more environmental product declarations verified by the at least one verifier, and wherein new blocks are added when each environmental product declaration from the one or more environmental product declarations is updated, added, or verified.

17. The system of claim 11, wherein identify, a match between the real-time geographical location data, the geographical location data obtained from the at least one of wireless carriers, mobile carriers, wireless service providers, and the geographical location data determined by the at least one hardware processor comprises adjusting by the at least one hardware processor, the pre-defined threshold to limit access of any or a combination of the one or more users, the one or more partners, the one or more verifiers, the one or more sites and the at least one computing device from the set of computing devices to the server computer system to a specific geographical location.

18. The system of claim 11, wherein verify, the geographical location data of the at least one computing device from the set of computing devices comprises:
   verifying, by the at least one hardware processor, the geographical location data of the at least one of the one or more site computing devices prior to storing site activity data in the memory; and
   deactivating, by the at least one hardware processor the at least one of the one or more site computing devices if the at least one of the one or more site computing devices is not located within a pre-defined distance from a location of a partner from the one or more partners stored in the memory.

19. A computer-implemented method comprising:
   receiving, by a server computer system, data transmitted from one or more point of service systems, wherein the data comprises any or a combination of:
      i) data relating to one or more environmental activities carried out by one or more users and offered by one or more partners that are associated with the one or more point of service systems,
      ii) data relating to one or more environmental product declarations that are associated with the one or more environmental activities;
   receiving, by the server computer system, data from at least one of one or more site computing devices that are located at one or more sites associated with the one or more partners, wherein the data comprises life cycle inventory data;
   receiving, by the server computer system, data from one or more verifier computing devices, wherein the data comprises any or a combination of:
      i) data relating to verification of the one or more environmental product declarations,
      ii) data relating to creation of the one or more environmental product declarations;
   assigning, by the server computer system, one or more verifiers that are associated with the one or more verifier computing devices, to verify the one or more environmental product declarations utilizing the life cycle inventory data; and
   determining, by the server computer system, the validity of data relating to the verification of the one or more environmental product declarations conducted by the one or more verifiers.

20. A non-transitory computer-readable medium storing instructions, the instructions comprising: one or more instructions that, when executed by one or more processors, cause the one or more processors to:
   receive, data from a point of service system, wherein the data comprises any or a combination of:
      i) data relating to one or more environmental activities carried out by one or more users and offered by one or more partners that are associated with the one or more point of service systems,
      ii) data relating to one or more environmental product declarations that are associated with the one or more environmental activities;
   receive, data from at least one of one or more site computing devices that are located at one or more sites associated with the one or more partners, wherein the data comprises life cycle inventory data;
   receive, data from one or more verifier computing devices, wherein the data comprises any or a combination of:
      i) data relating to verification of the one or more environmental product declarations,
      ii) data relating to creation of the one or more environmental product declarations;
   assign, one or more verifiers that are associated with the one or more verifier computing devices, to verify the one or more environmental product declarations by utilizing the life cycle inventory data; and
   determine, the validity of data relating to the verification of the one or more environmental product declarations conducted by the one or more verifiers.

* * * * *